(12) United States Patent
Abdelghaffar et al.

(10) Patent No.: US 12,425,163 B2
(45) Date of Patent: Sep. 23, 2025

(54) TECHNIQUES FOR SOUNDING REFERENCE SIGNAL PHASE COHERENCY

(71) Applicant: QUALCOMM INCORPORATED, San Diego, CA (US)

(72) Inventors: Muhammad Sayed Khairy Abdelghaffar, San Jose, CA (US); Hung Dinh Ly, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 18/245,577

(22) PCT Filed: Nov. 19, 2021

(86) PCT No.: PCT/US2021/072507
§ 371 (c)(1),
(2) Date: Mar. 16, 2023

(87) PCT Pub. No.: WO2022/109597
PCT Pub. Date: May 27, 2022

(65) Prior Publication Data
US 2023/0370231 A1 Nov. 16, 2023

(30) Foreign Application Priority Data
Nov. 20, 2020 (GR) .............................. 20200100692

(51) Int. Cl.
*H04L 5/00* (2006.01)
(52) U.S. Cl.
CPC .......... *H04L 5/0051* (2013.01); *H04L 5/0094* (2013.01)

(58) Field of Classification Search
CPC ... H04L 5/0051; H04L 5/0094; H04L 5/0087; H04L 5/0023
See application file for complete search history.

(56) References Cited

U.S. PATENT DOCUMENTS

2023/0188398 A1* 6/2023 Alawieh ............. H04L 27/2613
375/262
2023/0314547 A1* 10/2023 Alawieh ................. G01S 5/021
455/456.1

OTHER PUBLICATIONS

International Search Report and Written Opinion—PCT/US2021/072507—ISA/EPO—Mar. 25, 2022 (2100763WO).
(Continued)

*Primary Examiner* — Hashim S Bhatti
(74) *Attorney, Agent, or Firm* — QUALCOMM Incorporated

(57) ABSTRACT

Methods, systems, and devices for wireless communications are described. A user equipment (UE) may be configured to receive, from a base station, an indication of a set of resources for transmitting a set of phase-coherent sounding reference signals (SRSs). The UE may receive, from the base station, a control message indicating a cancellation of an allocation of a first portion of the set of resources. The UE may determine a phase coherency configuration associated with a second portion of the set of resources based on receiving the control message indicating the cancellation. The UE may then be configured to transmit one or more SRSs within the second portion of the set of resources in accordance with the determined phase coherency configuration.

20 Claims, 19 Drawing Sheets

(56) References Cited

OTHER PUBLICATIONS

Qualcomm Incorporated: "Discussion on SRS Enhancement", 3GPP TSG-RAN WG1 Meeting #103-e, R1-2009255, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020, XP051946918, 32 Pages.

Qualcomm Incorporated: "Enhancements on SRS Flexibility, Switching, Coverage and Capacity", 3GPP TSG-RAN WG1 Meeting #102-e, R1-2006795, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020, XP051918245, 27 Pages, Section 2, Sections 2.1.2, 2.1.1, 2 .1.3, Sections 2.1.3 and 4.2.2, Sect. 2. 2.1 Sect. 2.2.2, paragraph [4.2.8].

Vivo: "Discussion on SRS Enhancement", 3GPP TSG RAN WG1 #103-e, 3GPP Draft, R1-2007649, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, 22 Pages, Oct. 24, 2020 (Oct. 24, 2020), XP051946458, paragraph [05.3]-paragraph [05.4].

\* cited by examiner

Usable SRS Resources

Canceled/Released SRS Resources

TECHNIQUES FOR SOUNDING REFERENCE SIGNAL PHASE COHERENCY

CROSS REFERENCES

The present Application is a 371 national stage filing of International PCT Application No. PCT/US2021/072507 by Abdelghaffar et al. entitled "TECHNIQUES FOR SOUNDING REFERENCE SIGNAL PHASE COHERENCY," filed Nov. 19, 2021; and claims priority to International Patent Application No. 20200100692 by ABDELGHAFFAR et al. entitled "TECHNIQUES FOR SOUNDING REFERENCE SIGNAL PHASE COHERENCY," filed Nov. 20, 2020, each of which is assigned to the assignee hereof, and each of which is expressly incorporated by reference in its entirety herein.

FIELD OF TECHNOLOGY

The following relates to wireless communications, including techniques for sounding reference signal (SRS) phase coherency.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may perform channel estimation of a wireless channel between the base station and a UE based on sounding reference signals (SRSs) received from the UE. The base station may allocate sets of resources for the UE to transmit the SRSs. The set of resources may be contiguous in the time domain and/or in the frequency domain such that the UE may transmit a set of phase-coherent SRSs within the set of resources (i.e. the SRS transmissions are each transmitted with the same phase). However, conventional phase coherency techniques are deficient.

SUMMARY

The described techniques relate to improved methods, systems, devices, and apparatuses that support techniques for sounding reference signal (SRS) phase coherency. Generally, the present disclosure is directed to techniques for a user equipment (UE) to determine its phase coherency behavior for SRS transmissions when a portion of an allocated set of SRS resources is canceled causing a time or frequency gap in the allocated set of SRS resources. In particular, techniques described herein may enable SRS transmissions with varying degrees of phase coherency in cases where at least a portion of SRS resources within a bundled set of SRS resources has been canceled or released. For example, a base station may allocate a set of resources usable by a UE to transmit a set of phase-coherent SRSs. Subsequently, the base station may transmit a control message (e.g., uplink cancellation information (ULCI)) which cancels an allocation of at least a portion of the set of resources usable for transmitting the SRSs. In this example, the UE may be configured to determine a phase coherency configuration the UE is to apply for the non-canceled SRS resources, and may transmit one or more SRSs within the non-canceled SRS resources according to the determined phase coherency configuration.

A method for wireless communication at a UE is described. The method may include receiving, from a base station, an indication of a set of resources for transmitting a set of multiple phase-coherent SRSs, receiving, from the base station, a control message indicating a cancellation of an allocation of a first portion of the set of resources, determining a phase coherency configuration associated with a second portion of the set of resources based on receiving the control message indicating the cancellation, and transmitting one or more SRSs within the second portion of the set of resources in accordance with the determined phase coherency configuration.

An apparatus for wireless communication at a UE is described. The apparatus may include a processor, memory in electronic communication with the processor, and instructions stored in the memory. The instructions may be executable by the processor to cause the apparatus to receive, from a base station, an indication of a set of resources for transmitting a set of multiple phase-coherent SRSs, receive, from the base station, a control message indicating a cancellation of an allocation of a first portion of the set of resources, determine a phase coherency configuration associated with a second portion of the set of resources based on receiving the control message indicating the cancellation, and transmit one or more SRSs within the second portion of the set of resources in accordance with the determined phase coherency configuration.

Another apparatus for wireless communication at a UE is described. The apparatus may include means for receiving, from a base station, an indication of a set of resources for transmitting a set of multiple phase-coherent SRSs, means for receiving, from the base station, a control message indicating a cancellation of an allocation of a first portion of the set of resources, means for determining a phase coherency configuration associated with a second portion of the set of resources based on receiving the control message indicating the cancellation, and means for transmitting one or more SRSs within the second portion of the set of resources in accordance with the determined phase coherency configuration.

A non-transitory computer-readable medium storing code for wireless communication at a UE is described. The code may include instructions executable by a processor to receive, from a base station, an indication of a set of resources for transmitting a set of multiple phase-coherent SRSs, receive, from the base station, a control message indicating a cancellation of an allocation of a first portion of the set of resources, determine a phase coherency configuration associated with a second portion of the set of resources based on receiving the control message indicating the cancellation, and transmit one or more SRSs within the second portion of the set of resources in accordance with the determined phase coherency configuration.

In some examples of the method, apparatuses, and non-transitory computer-readable medium described herein, transmitting the one or more SRSs within the second portion of the set of resources may include operations, features, means, or instructions for transmitting a first set of phase-coherent SRSs and transmitting a second set of phase-coherent SRSs different from the first set of phase-coherent SRSs.

Some examples of the method, apparatuses, and non-transitory computer-readable medium described herein may further include operations, features, means, or instructions for transmitting the first set of phase-coherent SRSs prior to the first portion of the set of resources associated with the cancellation in the time domain and transmitting the second set of phase-coherent SRSs subsequent to the first portion of the set of resources associated with the cancellation in the time domain.

Some examples of the method, apparatuses, and non-transitory computer-readable medium described herein may further include operations, features, means, or instructions for transmitting the first set of phase-coherent SRSs associated with a first phase and transmitting the second set of phase-coherent SRSs associated with a second phase different from the first phase.

In some examples of the method, apparatuses, and non-transitory computer-readable medium described herein, transmitting the one or more SRSs within the second portion of the set of resources may include operations, features, means, or instructions for transmitting a first set of SRSs and a second set of SRSs different from the first set of SRSs with a common phase coherency based on a time interval of the first portion of the set of resources associated with the cancellation satisfying a time interval threshold.

In some examples of the method, apparatuses, and non-transitory computer-readable medium described herein, the time interval of the first portion of the set of resources associated with the cancellation satisfies the time interval threshold if the time interval may be less than the time interval threshold.

Some examples of the method, apparatuses, and non-transitory computer-readable medium described herein may further include operations, features, means, or instructions for receiving, from the base station, a second control message including an indication of the time interval threshold, where transmitting the first set of SRSs and the second set of SRSs with the common phase coherency may be based on receiving the second control message.

Some examples of the method, apparatuses, and non-transitory computer-readable medium described herein may further include operations, features, means, or instructions for transmitting the first set of SRSs and the second set of SRSs different from the first set of SRSs with the common phase coherency based on identifying an absence of an uplink transmission scheduled within the first portion of the set of resources associated with the cancellation.

In some examples of the method, apparatuses, and non-transitory computer-readable medium described herein, transmitting the one or more SRSs within the second portion of the set of resources may include operations, features, means, or instructions for transmitting a first set of SRSs and a second set of SRSs different from the first set of SRSs with a common phase coherency based on identifying an absence of an uplink transmission scheduled within the first portion of the set of resources associated with the cancellation.

In some examples of the method, apparatuses, and non-transitory computer-readable medium described herein, the set of multiple phase-coherent SRSs may include operations, features, means, or instructions for a first set of SRSs associated with a first component carrier, and a second set of SRSs associated with a second component carrier, where the first set of SRSs and the second set of SRSs may be associated with a common phase coherency.

In some examples of the method, apparatuses, and non-transitory computer-readable medium described herein, transmitting the one or more SRSs may include operations, features, means, or instructions for transmitting at least a subset of the first set of SRSs with a first phase and transmitting at least a subset of the second set of SRSs with a second phase different from the first phase based on the first portion of the set of resources associated with the cancellation being positioned within the second set of SRSs.

In some examples of the method, apparatuses, and non-transitory computer-readable medium described herein, the first component carrier and the second component carrier include a set of frequency-contiguous component carriers.

In some examples of the method, apparatuses, and non-transitory computer-readable medium described herein, the set of multiple phase-coherent SRSs further include a third set of SRSs associated with a third component carrier, and the third set of SRSs may be associated with the common phase coherency associated with the first set of SRSs and the second set of SRSs.

In some examples of the method, apparatuses, and non-transitory computer-readable medium described herein, transmitting the one or more SRSs may include operations, features, means, or instructions for transmitting at least a subset of the first set of SRSs with a first phase and transmitting at least a subset of the third set of SRSs with a second phase different from the first phase based on the first portion of the set of resources associated with the cancellation being positioned within the second set of SRSs.

In some examples of the method, apparatuses, and non-transitory computer-readable medium described herein, transmitting the one or more SRSs within the second portion of the set of resources may include operations, features, means, or instructions for transmitting a first set of phase-coherent SRSs with a first phase and transmitting a second set of phase-coherent SRSs with a second phase different from the first phase, where a phase difference between the first phase and the second phase satisfies a phase threshold.

In some examples of the method, apparatuses, and non-transitory computer-readable medium described herein, the phase difference between the first phase and the second phase satisfies the phase threshold if the phase difference may be less than the phase threshold.

Some examples of the method, apparatuses, and non-transitory computer-readable medium described herein may further include operations, features, means, or instructions for transmitting, to the base station, a UE capability report including an indication of the phase threshold, where transmitting the first set of phase-coherent SRSs and the second set of phase-coherent SRSs may be based on transmitting the UE capability report.

Some examples of the method, apparatuses, and non-transitory computer-readable medium described herein may further include operations, features, means, or instructions for transmitting, to the base station, a UE capability report including an indication of one or more phase coherency configurations supported by the UE, where transmitting the one or more SRSs may be based on transmitting the UE capability report.

In some examples of the method, apparatuses, and non-transitory computer-readable medium described herein, the control message includes a ULCI message.

In some examples of the method, apparatuses, and non-transitory computer-readable medium described herein, the first portion of the set of resources associated with the cancellation is associated with a time division orthogonal cover code (TD-OCC), and transmitting the one or more SRSs may include operations, features, means, or instructions for transmitting the one or more SRSs based on the one or more SRSs not being associated with the TD-OCC.

In some examples of the method, apparatuses, and non-transitory computer-readable medium described herein, and the method, apparatuses, and non-transitory computer-readable medium may include further operations, features, means, or instructions for refraining from transmitting one or more additional SRSs associated with the second portion of the set of resources based on the one or more additional SRSs being associated with the TD-OCC.

In some examples of the method, apparatuses, and non-transitory computer-readable medium described herein, the set of multiple phase-coherent SRSs include periodic SRSs, semi-periodic SRSs, aperiodic SRSs, or any combination thereof.

Some examples of the method, apparatuses, and non-transitory computer-readable medium described herein may further include operations, features, means, or instructions for receiving, from the base station, a unicast downlink control information (DCI) message, a group-common DCI message, or both, where the indication of the set of resources for transmitting the set of multiple phase-coherent SRSs may be received via the unicast DCI message, the group-common DCI message, or both.

A method for wireless communication at a base station is described. The method may include transmitting, to a UE, an indication of a set of resources for transmitting a set of multiple phase-coherent SRSs, transmitting, to the UE, a control message indicating a cancellation of an allocation of a first portion of the set of resources, determining a phase coherency configuration associated with a second portion of the set of resources based on transmitting the control message indicating the cancellation, and receiving, from the UE, one or more SRSs within the second portion of the set of resources in accordance with the determined phase coherency configuration.

An apparatus for wireless communication at a base station is described. The apparatus may include a processor, memory in electronic communication with the processor, and instructions stored in the memory. The instructions may be executable by the processor to cause the apparatus to transmit, to a UE, an indication of a set of resources for transmitting a set of multiple phase-coherent SRSs, transmit, to the UE, a control message indicating a cancellation of an allocation of a first portion of the set of resources, determine a phase coherency configuration associated with a second portion of the set of resources based on transmitting the control message indicating the cancellation, and receive, from the UE, one or more SRSs within the second portion of the set of resources in accordance with the determined phase coherency configuration.

Another apparatus for wireless communication at a base station is described. The apparatus may include means for transmitting, to a UE, an indication of a set of resources for transmitting a set of multiple phase-coherent SRSs, means for transmitting, to the UE, a control message indicating a cancellation of an allocation of a first portion of the set of resources, means for determining a phase coherency configuration associated with a second portion of the set of resources based on transmitting the control message indicating the cancellation, and means for receiving, from the UE, one or more SRSs within the second portion of the set of resources in accordance with the determined phase coherency configuration.

A non-transitory computer-readable medium storing code for wireless communication at a base station is described. The code may include instructions executable by a processor to transmit, to a UE, an indication of a set of resources for transmitting a set of multiple phase-coherent SRSs, transmit, to the UE, a control message indicating a cancellation of an allocation of a first portion of the set of resources, determine a phase coherency configuration associated with a second portion of the set of resources based on transmitting the control message indicating the cancellation, and receive, from the UE, one or more SRSs within the second portion of the set of resources in accordance with the determined phase coherency configuration.

In some examples of the method, apparatuses, and non-transitory computer-readable medium described herein, receiving the one or more SRSs within the second portion of the set of resources may include operations, features, means, or instructions for receiving a first set of phase-coherent SRSs and receiving a second set of phase-coherent SRSs different from the first set of phase-coherent SRSs.

Some examples of the method, apparatuses, and non-transitory computer-readable medium described herein may further include operations, features, means, or instructions for receiving the first set of phase-coherent SRSs prior to the first portion of the set of resources associated with the cancellation in the time domain and receiving the second set of phase-coherent SRSs subsequent to the first portion of the set of resources associated with the cancellation in the time domain.

Some examples of the method, apparatuses, and non-transitory computer-readable medium described herein may further include operations, features, means, or instructions for receiving the first set of phase-coherent SRSs associated with a first phase and receiving the second set of phase-coherent SRSs associated with a second phase different from the first phase.

In some examples of the method, apparatuses, and non-transitory computer-readable medium described herein, receiving the one or more SRSs within the second portion of the set of resources may include operations, features, means, or instructions for receiving a first set of SRSs and a second set of SRSs different from the first set of SRSs with a common phase coherency based on a time interval of the first portion of the set of resources associated with the cancellation satisfying a time interval threshold.

In some examples of the method, apparatuses, and non-transitory computer-readable medium described herein, the time interval of the first portion of the set of resources associated with the cancellation satisfies the time interval threshold if the time interval may be less than the time interval threshold.

Some examples of the method, apparatuses, and non-transitory computer-readable medium described herein may further include operations, features, means, or instructions for transmitting, to the UE, a second control message including an indication of the time interval threshold, where receiving the first set of SRSs and the second set of SRSs with the common phase coherency may be based on transmitting the second control message.

Some examples of the method, apparatuses, and non-transitory computer-readable medium described herein may further include operations, features, means, or instructions for receiving the first set of SRSs and the second set of SRSs different from the first set of SRSs with the common phase coherency based on identifying an absence of an uplink transmission scheduled within the first portion of the set of resources associated with the cancellation.

In some examples of the method, apparatuses, and non-transitory computer-readable medium described herein, receiving the one or more SRSs within the second portion of the set of resources may include operations, features, means, or instructions for receiving a first set of SRSs and a second set of SRSs different from the first set of SRSs with a common phase coherency based on identifying an absence of an uplink transmission scheduled within the first portion of the set of resources associated with the cancellation.

In some examples of the method, apparatuses, and non-transitory computer-readable medium described herein, the set of multiple phase-coherent SRSs may include operations, features, means, or instructions for a first set of SRSs associated with a first component carrier, and a second set of SRSs associated with a second component carrier, where the first set of SRSs and the second set of SRSs may be associated with a common phase coherency.

In some examples of the method, apparatuses, and non-transitory computer-readable medium described herein, receiving the one or more SRSs may include operations, features, means, or instructions for receiving at least a subset of the first set of SRSs with a first phase and transmitting at least a subset of the second set of SRSs with a second phase different from the first phase based on the first portion of the set of resources associated with the cancellation being positioned within the second set of SRSs.

In some examples of the method, apparatuses, and non-transitory computer-readable medium described herein, the first component carrier and the second component carrier include a set of frequency-contiguous component carriers.

In some examples of the method, apparatuses, and non-transitory computer-readable medium described herein, the set of multiple phase-coherent SRSs further include a third set of SRSs associated with a third component carrier, and the third set of SRSs may be associated with the common phase coherency associated with the first set of SRSs and the second set of SRSs.

In some examples of the method, apparatuses, and non-transitory computer-readable medium described herein, receiving the one or more SRSs may include operations, features, means, or instructions for receiving at least a subset of the first set of SRSs with a first phase and receiving at least a subset of the third set of SRSs with a second phase different from the first phase based on the first portion of the set of resources associated with the cancellation being positioned within the second set of SRSs.

In some examples of the method, apparatuses, and non-transitory computer-readable medium described herein, receiving the one or more SRSs within the second portion of the set of resources may include operations, features, means, or instructions for receiving a first set of phase-coherent SRSs with a first phase and receiving a second set of phase-coherent SRSs with a second phase different from the first phase, where a phase difference between the first phase and the second phase satisfies a phase threshold.

In some examples of the method, apparatuses, and non-transitory computer-readable medium described herein, the phase difference between the first phase and the second phase satisfies the phase threshold if the phase difference may be less than the phase threshold.

Some examples of the method, apparatuses, and non-transitory computer-readable medium described herein may further include operations, features, means, or instructions for receiving, from the UE, a UE capability report including an indication of the phase threshold, where receiving the first set of phase-coherent SRSs and the second set of phase-coherent SRSs may be based on receiving the UE capability report.

Some examples of the method, apparatuses, and non-transitory computer-readable medium described herein may further include operations, features, means, or instructions for receiving, from the UE, a UE capability report including an indication of one or more phase coherency configurations supported by the UE, where receiving the one or more SRSs may be based on receiving the UE capability report.

In some examples of the method, apparatuses, and non-transitory computer-readable medium described herein, the control message includes a ULCI message.

In some examples of the method, apparatuses, and non-transitory computer-readable medium described herein, receiving the one or more SRSs may include operations, features, means, or instructions for receiving the one or more SRSs based on the one or more SRSs not being associated with the TD-OCC.

In some examples of the method, apparatuses, and non-transitory computer-readable medium described herein, and the method, apparatuses, and non-transitory computer-readable medium may include further operations, features, means, or instructions for refraining from receiving one or more additional SRSs associated with the second portion of the set of resources based on the one or more additional SRSs being associated with the TD-OCC.

In some examples of the method, apparatuses, and non-transitory computer-readable medium described herein, the set of multiple phase-coherent SRSs include periodic SRSs, semi-periodic SRSs, aperiodic SRSs, or any combination thereof.

Some examples of the method, apparatuses, and non-transitory computer-readable medium described herein may further include operations, features, means, or instructions for transmitting, to the UE, a unicast DCI message, a group-common DCI message, or both, where the indication of the set of resources for transmitting the set of multiple phase-coherent SRSs may be transmitted via the unicast DCI message, the group-common DCI message, or both.

Some examples of the method, apparatuses, and non-transitory computer-readable medium described herein may further include operations, features, means, or instructions for determining a channel estimate associated with a channel between the UE and the base station based on receiving the one or more SRSs.

In some examples of the method, apparatuses, and non-transitory computer-readable medium described herein, receiving the one or more SRSs within the second portion of the set of resources may include operations, features, means, or instructions for receiving a first set of phase-coherent SRSs and receiving a second set of phase-coherent SRSs different from the first set of phase-coherent SRSs, where determining the channel estimate may be based on the first set of phase-coherent SRSs, the second set of phase-coherent SRSs, or both.

Some examples of the method, apparatuses, and non-transitory computer-readable medium described herein may further include operations, features, means, or instructions for receiving an uplink transmission from the UE and demodulating the uplink transmission based on the determined channel estimate.

Some examples of the method, apparatuses, and non-transitory computer-readable medium described herein may further include operations, features, means, or instructions for determining a precoder associated with downlink transmissions based on the determined channel estimate and transmitting, to the UE, a downlink transmission based on the determined precoder.

DETAILED DESCRIPTION

Figure 1:
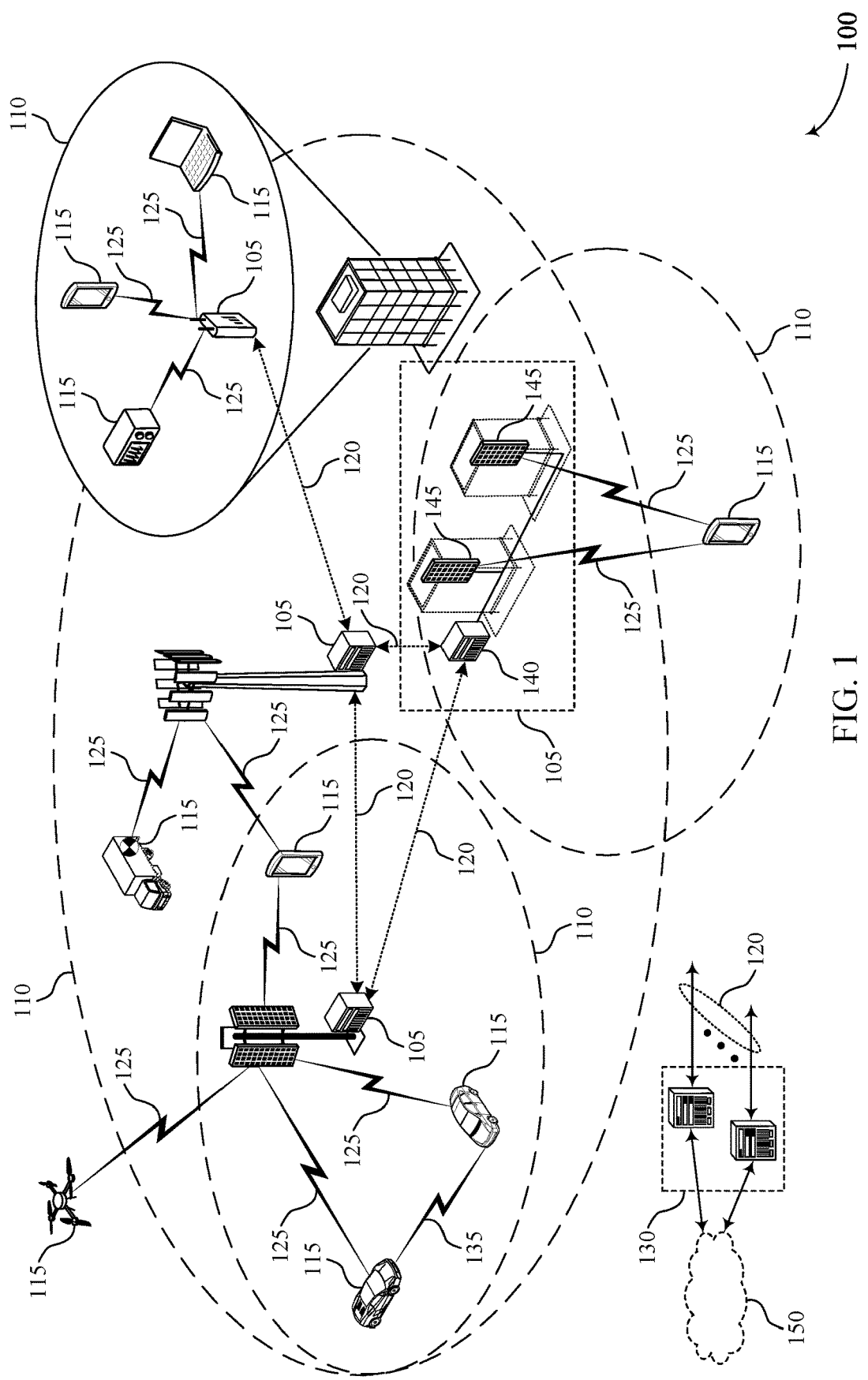
FIG. 1 illustrates an example of a wireless communications system that supports techniques for sounding reference signal (SRS) phase coherency in accordance with aspects of the present disclosure.

In some wireless communications systems, a base station may perform channel estimation of a wireless channel between the base station and a user equipment (UE) based on sounding reference signals (SRSs) received from the UE. The base station may allocate sets of resources for the UE to transmit the SRSs. In some aspects, the set of resources may be contiguous in the time domain, the frequency domain, or both, such that the UE may transmit a set of phase-coherent SRSs within the set of resources (i.e. the SRS transmissions are each transmitted with the same phase). In some cases, after allocating the set of resources for SRSs, a base station may cancel at least a portion of allocated SRS resources so that the resources may be used for other, higher-priority wireless transmissions, causing a gap in the bundled set of SRS resources. The base station may cancel or release allocations of previously-allocated SRS resources via one or more control messages, such as uplink cancelation information (ULCI) messages. In some cases, a UE may not be able to maintain phase coherency across the gap in SRS resources resulting from the cancellation. Moreover, some conventional wireless communications systems do not define UE phase coherency behavior when a portion of an allocated set of SRS resources is canceled.

Accordingly, techniques for improved SRS phase coherency configurations are disclosed. Techniques described herein are directed to a UE determining its phase coherency behavior for SRS transmissions when a portion of an allocated set of SRS resources is canceled causing a time or frequency gap in the allocated set of SRS resources. In particular, techniques described herein may enable SRS transmissions with varying degrees of phase coherency in cases where at least a portion of SRS resources within a bundled set of SRS resources has been canceled or released. For example, a base station may allocate a set of resources usable by a UE to transmit a set of phase-coherent SRSs. Subsequently, the base station may transmit a control message (e.g., ULCI) which cancels an allocation of at least a portion of the set of resources usable for transmitting the SRSs. In this example, the UE may be configured to determine a phase coherency configuration the UE is to apply associated with the non-canceled SRS resources, and may transmit one or more SRSs within the non-canceled SRS resources according to the determined phase coherency configuration.

In some aspects, a UE may be configured to indicate, to a base station, one or more phase coherency configurations which are supported by the UE. Various phase coherency configurations may be associated with varying degrees of phase coherency in cases where at least a subset of SRS resources are canceled or released. For example, according to one phase coherency configuration, the cancelation of a subset of the SRS resources may result in a loss of phase coherency such that the UE transmits multiple sets of SRSs using different phases within the non-canceled SRS resources. According to another phase coherency configuration, the UE may be configured to maintain phase coherency within some predefined threshold. For example, in cases where at least a subset of SRS resources is canceled, the UE may be configured to transmit a first set of SRSs with a first phase, and a second set of SRSs with a second phase, where a difference between the first phase and the second phase satisfies some predefined threshold. In yet another phase coherency configuration, the UE may be configured to maintain phase coherency within the non-canceled SRS resources if certain conditions or parameters are met. For example, the UE may be configured to maintain phase coherency across the non-canceled SRS resources if a time interval of a gap caused by the cancellation is less than a predefined time threshold, if there are no other uplink transmissions scheduled in the time period of the canceled SRS resources, or both.

Techniques described herein may enable SRS transmissions with varying degrees of phase coherency in cases where at least a portion of SRS resources within a bundled set of SRS resources has been canceled or released. In particular, by supporting multiple different phase coherency configurations, techniques described herein may enable wireless communications systems to maintain some degree of phase coherency based on respective capabilities of UEs within the wireless communications system. Furthermore, by supporting defined phase coherency configurations, techniques described herein may improve phase coherency of SRS signals in cases where at least a subset of SRS resources are canceled or released, thereby enabling more accurate channel estimation and improving the efficiency and reliability of wireless communications.

Aspects of the disclosure are initially described in the context of wireless communications systems. Additional aspects of the disclosure are described in the context of example resource allocation schemes and an example process flow. Aspects of the disclosure are further illustrated by and described with reference to apparatus diagrams, system diagrams, and flowcharts that relate to techniques for SRS phase coherency.

FIG. 1 illustrates an example of a wireless communications system 100 that supports techniques for SRS phase coherency in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-plus-noise ratio (SINR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, the UEs 115 and the base stations 105 of the wireless communications system 100 may support techniques for improved SRS phase coherency configurations. In particular, techniques described herein may enable SRS transmissions with varying degrees of phase coherency in cases where at least a portion of SRS resources within a bundled set of SRS resources has been canceled or released.

For example, a base station 105 of the wireless communications system 100 may allocate a set of resources usable by a UE 115 to transmit a set of phase-coherent SRSs to the base station 105. Subsequently, the base station 105 may transmit a control message (e.g., ULCI) which cancels an allocation of at least a portion of the set of resources usable for transmitting the SRSs. In this example, the UE 115 may be configured to determine a phase coherency configuration the UE 115 is to apply associated with the non-canceled SRS resources, and may transmit one or more SRSs within the non-canceled SRS resources according to the determined phase coherency configuration.

In some aspects, the UE 115 may be configured to indicate, to a base station 105, one or more phase coherency configurations which are supported by the UE 115. Various phase coherency configurations may be associated with varying degrees of phase coherency in cases where at least a subset of SRS resources are canceled or released. For example, according to one phase coherency configuration, the cancelation of a subset of the SRS resources may result in a loss of phase coherency such that the UE 115 transmits multiple sets of SRSs using different phases within the non-canceled SRS resources. According to another phase coherency configuration, the UE 115 may be configured to maintain phase coherency within some predefined threshold. For example, in cases where at least a subset of SRS resources is canceled, the UE 115 may be configured to transmit a first set of SRSs with a first phase, and a second set of SRSs with a second phase, where a difference between the first phase and the second phase satisfies some predefined threshold. In yet another phase coherency configuration, the UE 115 may be configured to maintain phase coherency within the non-canceled SRS resources if certain conditions or parameters are met. For example, the UE 115 may be configured to maintain phase coherency across the non-canceled SRS resources if a time interval of a gap caused by the cancellation is less than a predefined time threshold, if there are no other uplink transmissions scheduled in the time period of the canceled SRS resources, or both.

Techniques described herein may enable SRS transmissions with varying degrees of phase coherency in cases where at least a portion of SRS resources within a bundled set of SRS resources has been canceled or released. In particular, by supporting multiple different phase coherency configurations, techniques described herein may enable the wireless communications system 100 to maintain some degree of phase coherency based on respective capabilities of UEs 115 within the wireless communications system 100. Furthermore, by supporting defined phase coherency configurations, techniques described herein may improve phase coherency of SRS signals in cases where at least a subset of SRS resources are canceled or released, thereby enabling more accurate channel estimation and improving the efficiency and reliability of wireless communications within the wireless communications system 100.

Figure 2:
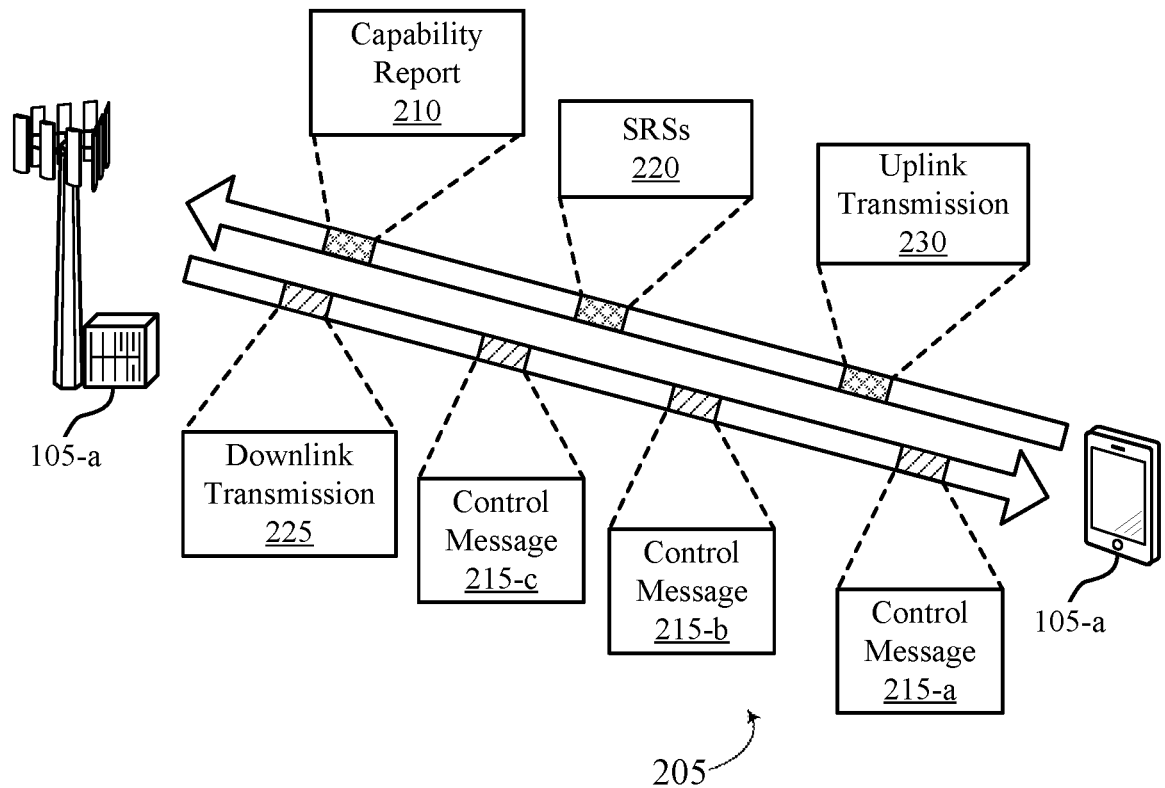
FIG. 2 illustrates an example of a wireless communications system that supports techniques for SRS phase coherency in accordance with aspects of the present disclosure.

FIG. 2 illustrates an example of a wireless communications system 200 that supports techniques for SRS phase coherency in accordance with aspects of the present disclosure. In some examples, wireless communications system 200 may implement aspects of wireless communications system 100. The wireless communications system 200 may include a UE 115-a and a base station 105-a, which may be examples of UEs 115 and base stations 105, as described with reference to FIG. 1.

In some aspects, the UE 115-a and the base station 105-a may communicate with one another using one or more beams, one or more carriers, one or more communications links, or any combination thereof. In some aspects, the UE 115-a and the base station 105-a may communicate with one another via a beam pair links including uplink beams and a downlink beams. In some aspects, the UE 115-a and the base station 105-a may communicate with one another via a communication link 205. In some aspects, the communication link 205 may include an example of an access link (e.g., Uu link). The communication link 205 may include a bi-directional link that can include both uplink and downlink communication. For example, the UE 115-a may transmit uplink transmissions, such as uplink control signals or uplink data signals, to the base station 105-a using the communication link 205, and the base station 105-a may transmit downlink transmissions, such as downlink control signals or downlink data signals, to the UE 115-a using the communication link 205. In some aspects, the wireless communications system 200 may support wireless communications with wireless devices (e.g., UE 115-a) via one or more serving cells of the wireless communications system 200. Each serving cell may be supported by one or more base stations 105 of the wireless communications system 200.

As noted previously herein, in some cases, the base station 105-a may perform channel estimation of a wireless channel between the base station 105-a and the UE 115-a based on SRSs 220 received from the UE 115-a. The base station 105-a may allocate sets of resources for the UE 115-a to transmit the SRSs 220. In some aspects, the set of resources may be contiguous in the time domain, the frequency domain, or both, such that the UE 115-a may transmit a set of phase-coherent SRSs 220 within the set of resources (i.e. the SRS 220 transmissions are each transmitted with the same phase). In some cases, after allocating the set of resources for SRSs 220, the base station 105-a may cancel at least a portion of allocated SRS resources so that the resources may be used for other, higher-priority wireless transmissions, causing a gap in the bundled set of SRS resources. The base station 105-a may cancel or release allocations of previously-allocated SRS resources via one or more control messages, such as ULCI messages. In some cases, the UE 115-a may not be able to maintain phase coherency across the gap in SRS resources resulting from the cancellation. Moreover, some conventional wireless communications systems do not define UE phase coherency behavior when a portion of an allocated set of SRS resources is canceled.

Accordingly, the wireless communications system 200 may be configured to support techniques for improved SRS phase coherency configurations. Specifically, the wireless communications system 200 may support techniques which enable the UE 115-a to determine its phase coherency behavior for SRS transmissions when a portion of an allocated set of SRS resources is canceled or released, thereby causing a time and/or frequency gap in the allocated set of SRS resources. In some aspects, the UE 115-a may be configured to support one or more phase coherency configurations, where each phase coherency configuration may enable SRS transmissions with varying degrees of phase coherency in cases where at least a portion of SRS resources within a bundled set of SRS resources has been canceled or released. By supporting multiple different phase coherency configurations, techniques described herein may provide for improved phase coherency in transmitted SRSs, which may result in more efficient channel estimation, thereby improving the efficiency and reliability of wireless communications within the wireless communications system 200.

For example, the UE 115-*a* may transmit a capability report 210 (e.g., UE capability report 210) to the base station 105-*a*. The capability report 210 may indicate one or more parameters associated with SRS phase coherency at the UE 115-*a*. In some cases, the capability report 210 may include an indication of one or more phase coherency configurations supported by the UE 115-*a* in cases where at least a subset of SRS resources are canceled. As will be described in further detail herein, the term "phase coherency configuration" may be used to describe various configurations, formats, or rules for how the UE 115-*a* is to maintain (or not maintain) phase coherency with respect to SRSs 220 transmitted in a set of resources in cases where at least a portion of the set of resources is canceled or released.

For example, the capability report 210 may indicate whether the UE 115-*a* is or is not capable of maintaining SRS phase coherency in cases where a subset of SRS resources are canceled (e.g., strict phase coherency where phase coherency is either maintained or not). For instance, as will be described in further detail with respect to resource allocation 405-*b* illustrated in FIG. 4, the capability report 210 may include an indication of a phase coherency configuration indicating whether the UE 115-*a* is or is not capable of maintaining phase coherency in between a first set of SRSs 220 transmitted prior to canceled resources within the set of resources 415-*c* and a second set of SRSs 220 transmitted subsequent to canceled resources within the set of resources 415-*c*.

By way of another example, the capability report 210 may include an indication of a phase coherency configuration indicating whether the UE 115-*a* is capable of maintaining SRS phase coherency when certain conditions are met. For instance, as will be described in further detail with respect to resource allocation 405-*b* illustrated in FIG. 4, the capability report 210 may indicate whether the UE 115-*a* is or is not capable of maintaining phase coherency in between a first set of SRSs 220 transmitted prior to canceled resources within the set of resources 415-*c* and a second set of SRSs 220 transmitted subsequent to canceled resources within the set of resources 415-*c* based on a time duration of the canceled resources, based on whether another transmission (e.g., uplink transmission) is scheduled within the canceled resources, or both.

By way of another example, the capability report 210 may include an indication of a phase coherency configuration indicating whether the UE 115-*a* is capable of maintaining SRS phase coherency with relaxed requirements (e.g., relaxed phase coherency). For instance, as will be described in further detail with respect to resource allocation 405-*b* illustrated in FIG. 4, the capability report 210 may indicate that the UE 115-*a* is or is not capable of maintaining a phase coherency within some phase threshold (e.g., within 10 degrees or another phase threshold) between a first set of SRSs 220 transmitted prior to canceled resources within the set of resources 415-*c* and a second set of SRSs 220 transmitted subsequent to canceled resources within the set of resources 415-*c*.

Furthermore, the capability report 210 may indicate whether the UE 115-*a* is or is not capable of maintaining phase coherency with respect to SRSs 220 transmitted on different component carriers in the frequency domain in the event a subset of resources are canceled in a component carrier, as will be described in further detail herein with respect to FIG. 5.

The capability report 210 may additionally or alternatively indicate other parameters used for SRS phase coherency at the UE 115-*a*. For example, the capability report 210 may indicate one or more conditions which must be met in order for the UE 115-*a* to maintain phase coherency across SRSs 220 transmitted by the UE 115-*a*. For instance, the capability report 210 may indicate that the UE 115-*a* is able or unable to maintain phase coherency in different subsets of SRSs 220 in cases where other uplink transmissions are scheduled within a gap of SRS resources resulting from a cancellation. By way of another example, the capability report 210 may indicate that the UE 115-*a* is able or unable to maintain phase coherency in different subsets of SRSs 220 when a time interval of a gap of SRS resources resulting from a cancellation is larger or smaller than a particular time interval threshold. In this example, the capability report 210 may indicate the time interval threshold. By way of another example, the capability report 210 may indicate a phase threshold indicating that the UE 115-*a* is capable of maintaining SRS phase coherency within the indicated phase threshold for relaxed phase coherency.

In some aspects, the base station 105-*a* may transmit a control message 215-*a* to the UE 115-*a*. In some aspects, the base station 105-*a* may transmit the control message 215-*a* based on receiving the capability report 210. The control message 215-*a* may include an RRC message, a downlink control information (DCI) message, a MAC control element (MAC-CE) message, or any combination thereof. In some aspects, the control message 215-*a* may include an indication of which phase coherency configuration the UE 115-*a* is to utilize. For example, in cases where the UE 115-*a* indicates that it is capable of applying multiple phase coherency configurations via the capability report 210, the base station 105-*a* may indicate which phase coherency configuration the UE 115-*a* is to apply via the control message 215-*a*. By way of another example, the control message 215-*a* may indicate one or more parameters or characteristics associated with SRS phase coherency at the UE 115-*a*, including a time interval threshold of a gap of SRS resources caused by a cancellation, a phase threshold for relaxed phase coherency, or any combination thereof.

In some aspects, the base station 105-*a* may transmit, to the UE 115-*a*, a control message 215-*b* including an indication of a set of resources for transmitting a set of phase-coherent SRSs 220. In this regard, the base station 105-*a* may indicate a set of time resources, a set of frequency resources, a set of spatial resources, or any combination thereof, which are usable by the UE 115-*a* to transmit a set of phase-coherent SRSs 220. The set of SRS resources indicated by the control message 215-*b* may be associated with periodic SRSs 220, semi-periodic SRSs 220, aperiodic SRSs 220, or any combination thereof. In some aspects, the control message 215-*b* including the indication of the set of SRS resources may include a DCI message. For example, the control message 215-*a* including the indication of the set of SRS resources may include a unicast DCI message, a group-common DCI message, or both. In some cases, the control message 215-*b* including the indication of the set of SRS resources may additionally indicate that at least a subset of the set of SRS resources are associated with a time division orthogonal cover code (TD-OCC) (e.g., time domain orthogonal cover code). The base station 105-*a* may transmit the control message 215-*b* including the indication of the set of SRS resources based on receiving the capability report 210, transmitting the control message 215-*a* (e.g., RRC message), or both.

Subsequently, the base station 105-*a* may transmit a control message 215-*c* indicating a cancellation of an allocation of a first portion of the set of SRS resources indicated in the control message 215-*b*. In some cases, the control message 215-*c* indicating the cancellation may include a ULCI message. The base station 105-*a* may transmit the control message 215-*c* indicating the cancellation based on receiving the capability report 210, transmitting the control message 215-*a* (e.g., RRC message), transmitting the control message 215-*b* (e.g., DCI message) including the indication of the set of SRS resources, or any combination thereof. For example, the capability report 210 may indicate that the UE 115-*a* may maintain phase coherency in cases where a time interval of a gap of SRS resources caused by a cancellation is less than a time interval threshold. In this example, the base station 105-*a* may transmit the control message 215-*c* indicating the cancellation such that a time interval of the first portion (e.g., canceled portion) of the set of SRS resources is less than the time interval threshold so that the UE 115-*a* may be able to maintain phase coherency across transmitted SRSs 220.

In some cases, indications or parameters which were previously described as being indicated in the control message 215-*a* (e.g., RRC message) may additionally or alternatively be indicated via the control message 215-*b* (e.g., DCI message) including the indication of the SRS resources, the control message 215-*c* (e.g., ULCI) indicating the cancellation, or both. For example, in some cases, the base station 105-*a* may additionally indicate which phase coherency configuration the UE 115-*a* is to utilize along with the control message 215-*b* indicating the set of SRS resources and/or the control message 215-*c* indicating the cancellation. Additionally or alternatively, the control message 215-*b* indicating the set of SRS resources and/or the control message 215-*c* indicating the cancellation may include an indication of one or more parameters associated with SRS phase coherency, including a time interval threshold for maintaining phase coherency, a phase threshold for relaxed phase coherency, or any combination thereof.

In some aspects, the UE 115-*a*, the base station 105-*a*, or both, may determine a phase coherency configuration associated with a second portion (e.g., non-canceled portion) of the set of SRS resources. In this regard, the UE 115-*a* and/or the base station 105-*a* may be configured to determine whether phase coherency is to be fully maintained, maintained if certain conditions are met, maintained with relaxed requirements (e.g., SRSs 220 transmitted with phases within some phase threshold), or lost (e.g., not maintained) within SRSs 220 transmitted within the second portion (e.g., non-canceled portion) of the set of SRS resources. In some aspects, the UE 115-*a* and/or the base station 105-*a* may determine the phase coherency configuration based on the capability report 210, the control message 215-*a* (e.g., RRC message), the control message 215-*b* indicating of the set of SRS resources, the control message 215-*c* (e.g., ULCI message) indicating the cancellation of the allocation of the first portion, or any combination thereof.

In some aspects, the UE 115-*a* may transmit one or more SRSs 220 within the second portion (e.g., non-canceled portion) of the set of SRS resources indicated via the control message 215-*b*. The one or more SRSs 220 may include, but are not limited to, periodic SRSs, semi-periodic SRSs, aperiodic SRSs, or any combination thereof. In some aspects, the UE 115-*a* may transmit (and the base station 105-*a* may receive) the one or more SRSs 220 in accordance with the determined phase coherency configuration. Accordingly, the UE 115-*a* may transmit, and the base station 105-*a* may receive, the one or more SRSs 220 based on the capability report 210, the control message 215-*a* (e.g., RRC message), the control message 215-*b* (e.g., DCI message) indicating of the set of SRS resources, the control message 215-*c* (e.g., ULCI) indicating of the cancellation, the determined phase coherency configuration, or any combination thereof.

For example, the UE 115-*a* may transmit a first set of phase-coherent SRSs 220 and a second set of phase-coherent SRSs 220 different from the first set of phase-coherent SRSs 220. In some cases, the first set of phase-coherent SRSs 220 may be transmitted prior to the first portion of the set of SRS resources associated with the cancellation in the time domain, and the second set of phase-coherent SRSs 220 may be transmitted subsequent to the first portion of the set of SRS resources associated with the cancellation in the time domain. In some cases, the first set of phase-coherent SRSs 220 and the second set of phase-coherent SRSs 220 may be transmitted with a common phase coherency (e.g., phase coherency is maintained), or a different phase coherency (e.g., phase coherency is not maintained, or phase coherency is maintained within a certain phase threshold). For instance, phase coherency may be maintained if the first set of phase-coherent SRSs 220 and the second set of phase-coherent SRSs 220 are associated with a common phase. Conversely, phase coherency may be not be maintained if the first set of phase-coherent SRSs 220 are associated with a first phase, and the second set of phase-coherent SRSs 220 are transmitted with a second phase which is different from the first phase.

By way of another example, phase coherency may be maintained with relaxed requirements if the first set of phase-coherent SRSs 220 are transmitted with a first phase, and the second set of phase-coherent SRSs 220 are transmitted with a second phase which is different from the first phase, but where a phase difference between the first phase and the second phase satisfies a phase threshold. In some cases, the phase difference between the first phase and the second phase satisfies the phase threshold if the phase difference is less than the phase threshold. In this regard, the first and second sets of phase-coherent SRSs 220 may be transmitted with different phases, but where the respective phases are within a pre-defined phase threshold of one another (e.g., phase difference less than 10 degrees). In some aspects, the phase threshold may be indicated via the capability report 210, the control message 215-*a*, control message 215-*b* (e.g., DCI message) indicating the set of SRS resources, the control message 215-*c* indicating the cancellation, or any combination thereof.

In some cases, the UE 115-*a* may transmit the one or more SRSs 220 with a common phase coherency (e.g., phase coherency is maintained) if certain conditions are met. For example, the UE 115-*a* may transmit a first set of SRSs 220 and a second set of SRSs 220 within the second portion of the set of SRS resources with a common phase coherency if a time interval of the first portion of the set of SRS resources associated with the cancellation satisfies a time interval threshold, if there are no other transmissions (e.g., uplink transmissions) scheduled within the first portion of the set of SRS resources associated with the cancellation, or both. For instance, the UE 115-*a* may transmit the first and second sets of SRSs 220 if a time interval of the first portion of the set of SRS resources associated with the cancellation is less than the time interval threshold. In this example, the time interval threshold may be indicated via the capability report 210, the control messages 215-*a*, 215-*b*, 215-*c*, or any combination thereof. By way of another example, the UE 115-*a* may transmit the first and second sets of SRSs 220 with a common phase coherency based on identifying an absence of an uplink transmission scheduled within the first portion of the set of SRS resources associated with the cancellation.

In some aspects, the UE 115-*a* may transmit (or refrain from transmitting) SRSs 220 within the second portion of the set of SRS resources based on portions of the set of SRS resources being associated with a TD-OCC. In particular, in cases where the first portion of the set of SRS resources associated with the cancellation is associated with a TD-OCC, the UE 115-*a* may refrain from transmitting SRSs 220 within other SRS resources associated with the TD-OCC, and may transmit SRSs 220 within other SRS resources which are not associated with the TD-OCC. For example, in some cases, the first portion of the set of SRS resources associated with the cancellation may be associated with a TD-OCC. In this example, the UE 115-*a* may transmit the one or more SRSs 220 based on the one or more SRSs 220 not being associated with the TD-OCC, and may refrain from transmitting one or more additional SRSs 220 based on the one or more additional SRSs 220 being associated with the TD-OCC.

In some cases, the UE 115-*a* may transmit the one or more SRSs 220 with phase coherency maintained or lost (e.g., not maintained) across the one or more SRSs 220 within the frequency domain. In particular, phase coherency may be maintained or not with respect to the frequency domain based on the relative positioning of the first portion of the set of SRS resources in the frequency domain. For example, the first set of SRS resources indicated via the control message 215-*b* may include a first set of SRS resources associated with a first component carrier, a second set of SRS resources associated with a second component carrier, and a third set of SRS resources associated with a third component carrier. In this example, the first set of SRS resources, the second set of SRS resources, and/or the third set of SRS resources may be associated with a common phase coherency. Moreover, the first component carrier, the second component carrier, and/or the third component carrier may include a set of frequency-contiguous component carriers. For example, the first, second, and third component carriers, may include a set of frequency-contiguous component carriers, where the second component carrier is positioned between the first component carrier and the third component carrier in the frequency domain.

Continuing with reference to the same example, the first portion of the set of SRS resources associated with the cancellation may be positioned within the second set of SRS resources in the second component carrier. In this example, the UE 115-*a* may transmit at least a subset of the first set of SRSs 220 within the first component carrier with a first phase, and may transmit at least a subset of the second set of SRSs 220 within the second component carrier with a second phase different from the first phase based on the first portion of the set of SRS resources associated with the cancellation being positioned within the second set of SRS resources. In other words, phase coherency between at least portions of the first and second sets of SRSs 220 may not be maintained as a result of the cancellation of at least a subset of the resources associated with the second set of SRS resources. Similarly, the UE 115-*a* may transmit at least a subset of the first set of SRSs 220 within the first component carrier with a first phase, and transmit at least a subset of the third set of SRSs 220 within the third component carrier with a phase different from the first phase based on the first portion of the set of SRS resources associated with the cancellation being positioned within the second set of SRS resources. In other words, phase coherency between at least portions of the first and third sets of SRSs 220 may not be maintained as a result of the cancellation of at least a subset of the resources associated with the second set of SRSs 220.

In some aspects, the base station 105-*a* may determine a channel estimate associated with a channel between the UE 115-*a* and the base station 105-*a*. In some aspects, the base station 105-*a* may determine the channel estimate based on receiving the one or more SRSs 220 from the UE 115-*a*. For example, the base station 105-*a* may perform one or more measurements (e.g., received signal strength indicator (RSSI) measurements, reference signal received power (RSRP) measurements, reference signal received quality (RSRQ) measurements, SNR measurements, SINR measurements) on the one or more received SRSs 220, and may determine the channel estimate based on the performed measurements.

In some aspects, the base station 105-*a* may be configured to employ different channel estimation techniques based on the relative phase coherency of the received SRSs 220. For example, the base station 105-*a* may receive a first set of phase-coherent SRSs 220, and a second set of phase-coherent SRSs 220 different from the first set of phase-coherent SRSs 220. In cases where the first set of phase-coherent SRSs 220 are associated with a first phase, and the second set of phase-coherent SRSs 220 are associated with a second phase different from the first phase, the base station 105-*a* may be configured to perform channel estimation by performing additive combining within the respective sets of phase-coherent SRSs 220. However, in such cases, additive combining may not be performed across the first and second sets of phase-coherent SRSs 220 due to the different phases associated with the first and second sets of phase-coherent SRSs 220. Conversely, in cases where the first and second sets of phase-coherent SRSs 220 are transmitted/received with a common phase (and/or phases within a certain phase threshold), the base station 105-*a* may be configured to perform channel estimation by performing additive combining within and/or across the respective sets of phase-coherent SRSs 220 due to the same and/or similar phases associated with the respective sets of phase-coherent SRSs 220.

In some aspects, the base station 105-*a* may determine a precoder associated with downlink transmissions 225 perfumed by the base station 105-*b*. In this regard, the base station 105-*a* may determine a precoder which may be used to transmit downlink transmissions 225 to the UE 115-*a*. In some aspects, the base station 105-*a* may determine the precoder based on the determined channel estimate, and may transmit a downlink transmission 225 to the UE 115-*a* based on (e.g., in accordance with) the determined precoder. In this regard, the base station 105-*a* may transmit the downlink transmission 225 based on the determined channel estimate.

Moreover, in some cases, the UE 115-*a* may transmit an uplink transmission 230 to the base station 105-*a*. In some aspects, the base station 105-*a* may demodulate the uplink transmission 230 based on the determined channel estimate.

Techniques described herein may enable SRS transmissions with varying degrees of phase coherency in cases where at least a portion of SRS resources within a bundled set of SRS resources has been canceled or released. In particular, by supporting multiple different phase coherency configurations, techniques described herein may enable wireless devices (e.g., UE 115-*a*, base station 105-*a*) within a wireless communications system (e.g., wireless communications systems 100, 200) to maintain some degree of phase coherency based on respective capabilities of UEs 115 within the wireless communications system. Furthermore, by supporting defined phase coherency configurations, techniques described herein may improve phase coherency of SRS signals in cases where at least a subset of SRS resources are canceled or released, thereby enabling more accurate channel estimation and improving the efficiency and reliability of wireless communications within the wireless communications system.

Figure 3:
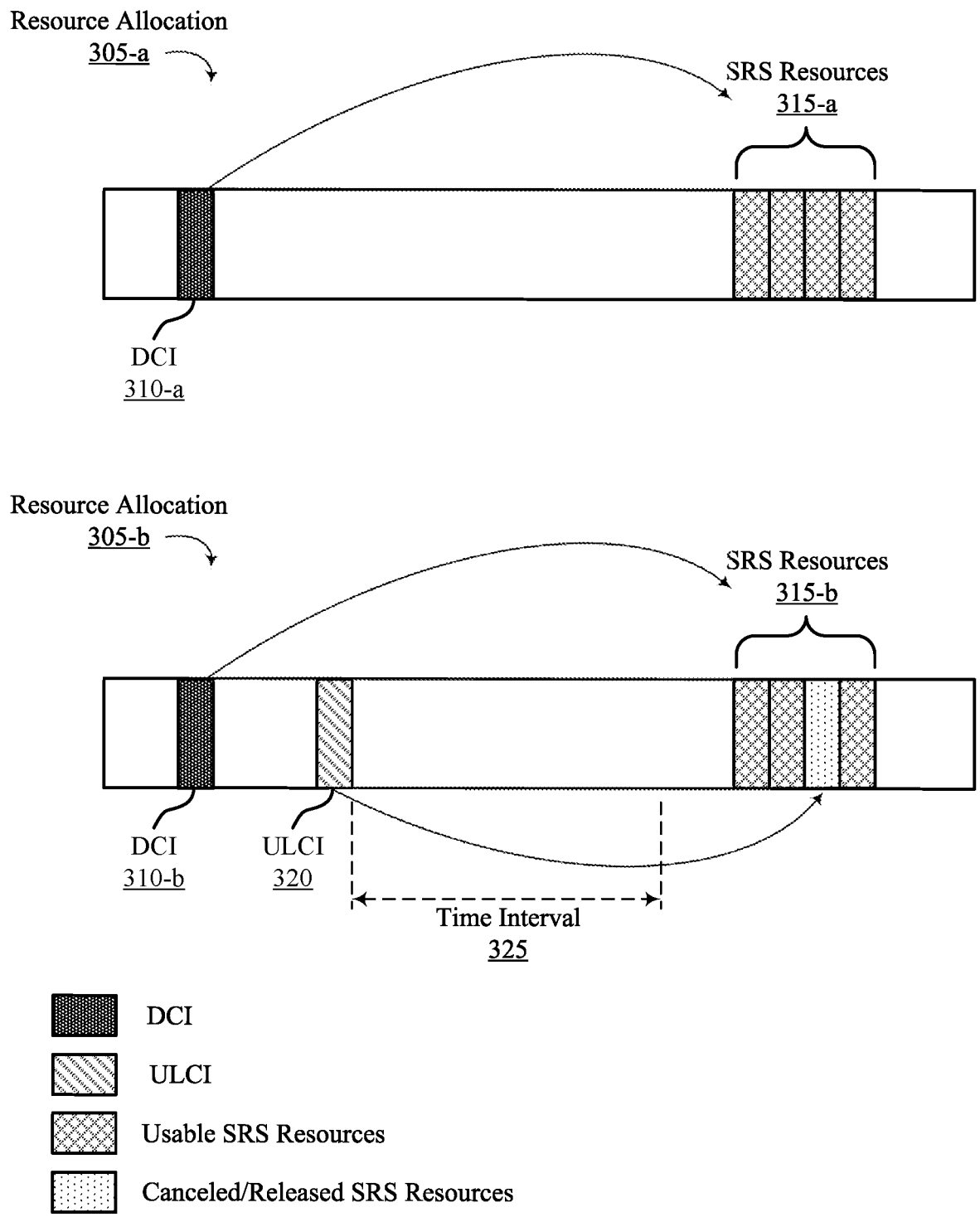
FIG. 3 illustrates an example of a resource allocation scheme that supports techniques for SRS phase coherency in accordance with aspects of the present disclosure.

FIG. 3 illustrates an example of a resource allocation scheme 300 that supports techniques for SRS phase coherency in accordance with aspects of the present disclosure. In some examples, resource allocation scheme 300 may implement, or be implemented by, aspects of wireless communications system 100, wireless communications system 200, or both. In some aspects, the resource allocation scheme 300 illustrates a first resource allocation 305-a illustrating the allocation of SRS resources, and a second resource allocation 305-b illustrating a cancellation of an allocation of SRS resources.

As noted previously herein, a base station 105 may be configured to perform channel estimation for a channel between the base station 105 and a UE 115 by performing measurements on SRSs received from a UE 115. In this regard, the base station 105 may be configured to allocate a set of resources usable by the UE 115 to transmit SRSs. For example, as shown in the resource allocation 305-a, the base station 105 may transmit a control message (e.g., DCI 310-a) which allocates a set of resources 315-a usable by the UE 115 to transmit SRSs. In some aspects, the base station 105 may be configured to increase coverage and capacity by allocating a set of consecutive resources for SRS transmission. For example, the set of resources 315-a may span multiple consecutive (e.g., contiguous) symbols such that the UE 115 may transmit a set of consecutive SRSs within the set of resources 315-a. In some aspects, the base station 105 may be configured to increase coverage, increase capacity, and/or compensate for capacity loss by allocating the set of resources such that at least a portion of the set of resources is associated with a TD-OCC. For example, SRS repetition may be improved by allocating the set of resources 315-a such that at least a portion of the set of resources 315-a is associated with a TD-OCC. The TD-OCC associated with the set of resources may be associated with multiple ports.

In some cases, the set of resources 315-a may be contiguous in the time domain, the frequency domain, or both. In some cases, the allocation of consecutive (e.g., contiguous) sets of resources 315 for SRS transmission may be referred to as "SRS bundling." As will be discussed in further detail herein with respect to FIG. 4, the set of resources 315-a may be positioned within a single slot (e.g., inter-slot SRS time bundling), across two or more slots (e.g., intra-slot SRS time bundling), or both. Moreover, in some aspects, the base station 105 may bundle different SRS resources (e.g., codebook and/or antenna switching).

In some aspects, the UE 115 may be configured to transmit SRSs to the base station 105 within the set of resources 315-a. In particular, the UE 115 may be configured to transmit a set of phase-coherent SRSs within the set of resources 315-a. For example, in cases where the set of resources 315-a spans four separate symbols, the UE 115 may be configured to transmit an SRS within each symbol (e.g., four separate SRSs), where each respective SRS is transmitted with a common phase. As compared to SRSs which are transmitted without phase coherency (e.g., different phases), maintaining phase coherency among consecutive SRSs may enable the base station 105 to improve an accuracy of a channel estimation based on the received phase-coherent SRSs.

Some wireless communications systems may support one or more coverage/capacity enhancement schemes in the context of SRS transmission. Coverage enhancement schemes may include a "Class 1" coverage enhancement scheme which utilizes time bundling, a "Class 2" coverage enhancement scheme which increases SRS repetition, and a "Class 3" coverage enhancement scheme which is based on partial frequency sounding. Under the Class 1 coverage enhancement scheme, a wireless communications system may utilize a relationship of SRS resources across one or more slots to enable joint processing of SRSs in the time domain. Phase discontinuity, interruptions of SRS transmission by other uplink signals, and other characteristics or parameters may affect the efficiency of the Class 1 coverage enhancement scheme. Under the Class 2 coverage enhancement scheme, a wireless communications system may change a legacy SRS pattern in one resource and/or one SRS transmission occasion by increasing a quantity of SRS symbols used for repetition. In some aspects, SRS resources may be associated with a TD-OCC to compensate for a negative impact on SRS capacity. Parameters which may affect the utility of the Class 2 coverage enhancement scheme may include inter-cell interference randomization, and whether SRS resources are bundled according to inter-slot or intra-slot SRS time bundling. Lastly, under the Class 3 coverage enhancement scheme, a wireless communications system may support improved flexibility of SRS frequency resources in order to allow for SRS transmission on partial frequency resources within a legacy set of SRS frequency resources. Parameters which may affect the utility of the Class 3 coverage enhancement scheme may include whether the partial frequency resources are allocated on a resource block level or subcarrier level (e.g., larger comb, partial bandwidth), peak-to-average power ratio (PAPR) issues, and the like.

As noted previously herein, some wireless communications systems may enable the cancellation (e.g., release) of an allocation associated with previously-allocated resources. Some wireless communications systems may support the cancellation of an allocation of SRS resources (e.g., set of resources 315-b), physical uplink shared channel (PUSCH) resources, or both. For example, as shown in resource allocation 305-b, a base station 105 may transmit a control message (e.g., DCI 310-b) to a UE 115 which allocates a ser of resources 315-b usable by the UE 115 to transmit SRSs. Subsequently, the base station 105 may transmit an additional control message (e.g., ULCI 320) which cancels an allocation of at least a portion of the set of resources 315-b. In some aspects, the ULCI 320 may include a DCI format 2_4. In some aspects, the ULCI 320 illustrated in FIG. 3 may be an example of the control message 215-b shown and described in FIG. 1.

In this regard, the ULCI 320 may indicate that the canceled portion of the set of resources 315-b is no longer allocated for the UE 115 to perform SRS transmission. In some aspects, the base station 105 may cancel the allocation of at least a portion of the set of resources 315-b so that the canceled portion of the set of resources 315-b may be used for other, higher priority transmissions (e.g., higher priority URLLC transmissions). In some aspects, transmission occasions for ULCI 320 transmissions may be configured via control signaling (e.g., RRC signaling), where a slot may include one or more ULCI 320 transmission occasions. In this regard, upon receiving the DCI 310-b scheduling/allocating the set of resources 315-b, the UE 115 may be configured to monitor one or more ULCI 320 transmission occasions which are positioned between the DCI 310-b and the set of resources 315-*b* in order to monitor for a potential cancellation of at least a portion of the set of resources 315-*b*.

In some aspects, the ULCI 320 which cancels an allocation of at least a portion of the set of resources 315-*b* may be transmitted and/or received at the UE 115 some time interval 325 prior to the allocation of the set of resources 315-*b* which is canceled by the ULCI 320. In some aspects, the time interval 325 may be associated with some processing time at the UE 115 in which the UE 115 receives the ULCI 320 and processes the cancelation indicated by the ULCI 320. In other words, the time interval 325 may indicate a duration of time following reception of the ULCI 320 in which the UE 115 may not be able to effectively process and implement a cancelation of an allocation of resources canceled by the ULCI 320. In some aspects, the time interval 325 may be indicated to the base station 105 by the UE 115 via UE capability signaling, may be configured via RRC signaling, or both.

The cancelation of at least a portion of the set of resources 315-*b* may result in some processing complexities at the UE 115. For example, in cases where other uplink transmissions (e.g., PUSCH transmissions) are scheduled within the canceled portion of the set of resources 315-*b*, the UE 115 may be required to re-tune radio frequency components in order to transmit the other uplink transmission with varying parameters (e.g., different frequency, different modulation scheme, different power), and subsequently re-tune the radio frequency components back to handle remaining SRS transmissions. Such retuning may make it harder for the UE 115 to maintain phase coherency with respect to SRSs transmitted in the non-canceled resources of the set of resources 315-*b*. Moreover, a time duration of the canceled portion of the set of resources 315-*b* may further affect the ability of the UE 115 to maintain SRS phase coherency. For example, if a time duration of the canceled portion (e.g., gap) of the set of resources 315-*b* is greater than some threshold, the UE 115 may power off radio frequency components to conserve power, which may make it more difficult to maintain phase coherency. Conversely, if a time duration of the canceled portion (e.g., gap) of the set of resources 315-*b* is less than some threshold, the UE 115 may not power off radio frequency components, which may improve the ability to maintain phase coherency.

As noted previously herein, some wireless communications systems do not define how the UE 115 is to handle SRS transmission with respect to phase coherency when a portion of the set of resources 315-*b* allocated for SRS transmission is canceled. That is, some wireless communications systems do not define whether the UE 115 is to maintain phase coherency with SRSs transmitted in the non-canceled resources of the set of resources 315-*b*, or whether phase coherency is lost (e.g., not maintained) upon cancelation indicated by the ULCI 320. Furthermore, some UEs 115 may be unable to maintain phase coherency in cases where a portion of the set of resources 315-*b* allocated for SRS transmission are canceled. For example, some UEs 115 may be unable to maintain phase coherency for SRSs transmitted in the non-canceled resources of the set of resources in cases where the gap in allocated resources resulting from the cancelation is less than some threshold time duration in the time domain.

Accordingly, techniques of the present disclosure are directed to improved SRS phase coherency configurations. Specifically, techniques described herein may enable UEs 115 to determine their phase coherency behavior for SRS transmissions when a portion of an allocated set of SRS resources (e.g., set of resources 315-*b*) is canceled or released, thereby causing a time and/or frequency gap in the allocated set of SRS resources. Attendant advantages of the present disclosure are further shown and described with reference to FIGS. 4-6.

Figure 4:
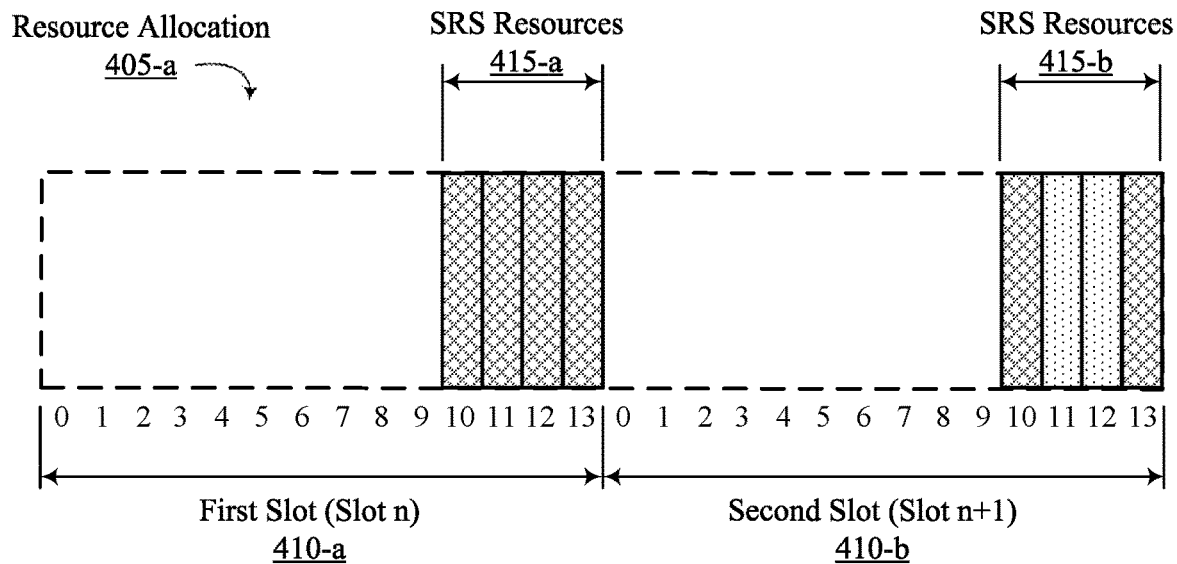
FIG. 4 illustrates an example of a resource allocation scheme that supports techniques for SRS phase coherency in accordance with aspects of the present disclosure.
Figure 4:
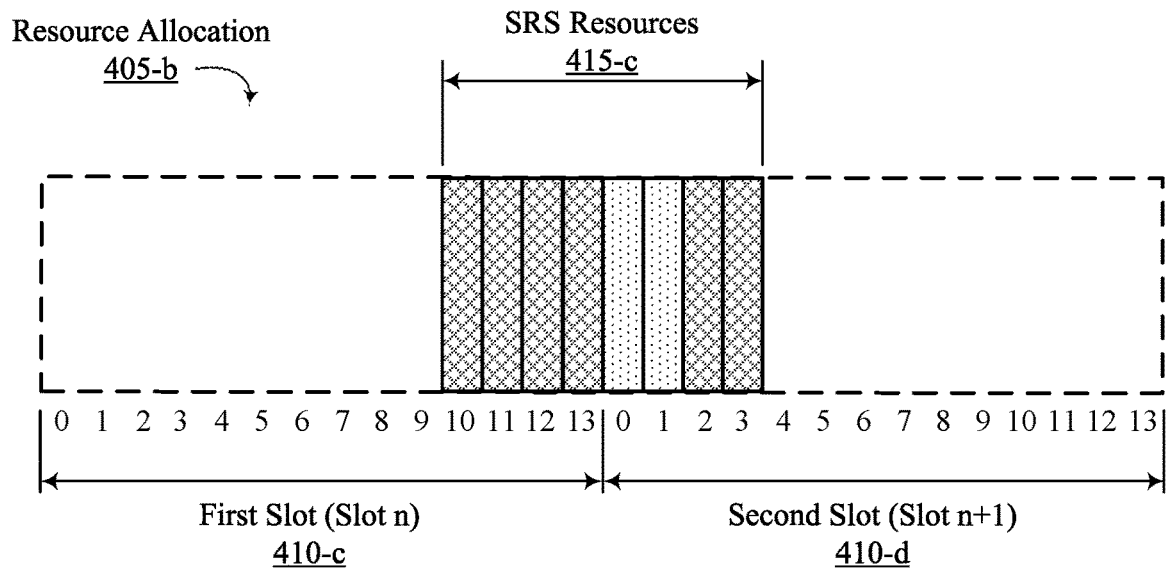
Figure 4:
Figure 4:

FIG. 4 illustrates an example of a resource allocation scheme 400 that supports techniques for SRS phase coherency in accordance with aspects of the present disclosure. In some examples, resource allocation scheme 400 may implement, or be implemented by, aspects of wireless communications system 100, wireless communications system 200, or any combination thereof. In some aspects, the resource allocation scheme 400 illustrates a first resource allocation 405-*a* and a second resource allocation 405-*b* which illustrate SRS bundling, and cancellation of portions of allocated SRS resources.

In some aspects, the resource allocation 405-*a* illustrates inter-slot SRS time bundling in which sets of resources 415 allocated for SRS transmission are bundled within respective transmission time intervals (e.g., slots 410). For example, a base station 105 may allocate a first set of resources 415-*a* for SRS transmission in a first slot 410-*a* (e.g., slot n), and a second set of resources 415-*b* for SRS transmission in a second slot 410-*b* (e.g., slot n+1). In some cases, the first slot 410-*a* and the second slot 410-*b* may include adjacent (e.g., consecutive) slots 410.

In some aspects, each of the first and second set of resources 415-*a* and 415-*b* may span a set of symbols within each respective slot 410. Moreover, each of the first and second set of resources 415-*a* and 415-*b* be contiguous in the time domain. For example, the first set of resources 415-*a* may span symbols 10-13 of the first slot 410-*a*, and the second set of resources 415-*b* may span symbols 10-13 of the second slot 410-*b*. In some aspects, the such that sets of resources 415-*a* and 415-*b* may be configured for transmission of phase-coherent SRSs. In this regard, the UE 115 may be configured to transmit sets of phase-coherent SRSs within the respective sets of resources 415-*a* and 415-*b*. For example, the first set of resources 415-*a* may be allocated for the UE 115 to transmit a first set of phase-coherent SRSs, and the second set of resources 415-*b* may be allocated for the UE 115 to transmit a second set of phase-coherent SRSs. In some aspects, phase coherency may or may not be maintained between the respective sets of phase-coherent SRSs transmitted within the first set of resources 415-*a* and the second set of resources 415-*b*, respectively.

Comparatively, the resource allocation 405-*b* illustrates intra-slot SRS time bundling in which a set of resources 415-*c* allocated for SRS transmission are bundled across multiple transmission time intervals (e.g., multiple slots 410). For example, a base station 105 may allocate a set of resources 415-*c* for SRS transmission, where the set of resources 415-*c* includes one or more symbols in a first slot 410-*c* (e.g., slot n) and one or more symbols in a second slot 410-*d* (e.g., slot n+1). As described with respect to resource allocation 405-*a*, the set of resources 415-*c* illustrated in resource allocation 405-*b* may span a set of consecutive symbols across the first and second slots 410-*c* and 410-*d*. For example, as shown in FIG. 4, the set of resources 415-*c* may span symbols 10-13 of the first slot 410-*c*, and symbols 0-3 of the second slot 410-*d*. Moreover, the set of resources 415-*c* may be contiguous in the time domain such that the UE 115 is configured to transmit a set of phase-coherent SRSs within the set of resources 415-*c*.

In some cases, a phase coherency configuration may specify the phase coherency behavior between bundled resources (SRS repetition). For example, a phase coherency configuration may specify that phase coherence of SRSs is not maintained across all symbols if one or more symbols within the set of bundled SRS symbols (e.g., within the set of resources 415-a, 415-b, 415-c) are canceled due to ULCI. Thus, phase coherency may be kept across consecutive symbols within the sets of resources 415-a, 415-b, 415-c, but may not maintained across non-consecutive symbols. For example, referring to resource allocation 405-b, ULCI may indicate a cancellation of an allocation of resources in symbols 0 and 1 of the second slot 410-d. In this example, the UE 115 may maintain phase coherency across symbols 10-13 of slot 410-c, and may maintain phase coherency across symbols 2 to 3 of slot 410-d. However, the phase coherency maintained across symbols 10-13 of slot 410-c may differ from the phase coherency across symbols 2-3 of slot 410-d.

As noted previously herein, a base station 105 may subsequently cancel (e.g., release) at least a portion of a set of resources 415 allocated for SRS transmission. For example, referring to resource allocation 405-a, the base station 105 may transmit a control message (e.g., ULCI) to the UE 115, where the ULCI indicates a cancelation of a first portion of the set of resources 415-b. By way of another example, referring to resource allocation 405-b, the base station 105 may transmit a control message (e.g., ULCI) to the UE 115, where the ULCI indicates a cancelation of a first portion of the set of resources 415-c. In these examples, the cancelation of respective portions of the sets of resources 415-b and 415-c effectively results in a "gap" in the respective sets of resources 415-b and 415-c in the time domain. Some wireless communications systems do not define how UEs 115 are to handle phase coherency associated with SRS transmission in bundled sets of SRS resources which include gaps attributable to a cancelation (e.g., sets of resources 415-b and 415-c). In other words, some wireless communications systems do not specify whether a UE 115 is expected to maintain phase coherency for SRS transmission across the sets of resources 415-b and 415-c when the respective sets of resources 415-b and 415-c include canceled resources. Furthermore, some UEs 115 may be unable to maintain phase coherency for SRS transmission within the sets of resources 415-b and 415-c dependent upon certain characteristics of parameters of the gap caused by the canceled resources.

Accordingly, techniques described herein may enable a UE 115 to determining its phase coherency behavior for SRS transmissions when a portion of an allocated set of SRS resources (e.g., sets of resources 415-b and 415-c) is canceled causing a time or frequency gap in the allocated set of SRS resources. In particular, techniques described herein may enable SRS transmissions with varying degrees of phase coherency in cases where at least a portion of SRS resources within a bundled set of SRS resources has been canceled or released.

For example, upon identifying a cancelation of an allocation of a first portion of the set of resources 415-b, the UE 115 may determine a phase coherency configuration associated with a second portion (e.g., non-canceled portion) of the set of resources 415-b, and may transmit one or more SRSs in accordance with the determined phase coherency configuration.

For instance, referring to resource allocation 405-a, a UE 115 may receive an indication of the set of resources 415-b for transmitting a set of phase-coherent SRSs. Subsequently, the UE 115 may receive a control message (e.g., ULCI) indicating a cancellation of an allocation of a first portion of the set of resources 415-b. As shown in FIG. 4, the first portion of the set of resources 415-b associated with the cancellation may include symbols 11 and 12 within the second slot 410-b. In effect, the cancellation may result in a second portion of the set of resources 415-b before (e.g., symbol 10) and after (e.g., symbol 13) the first portion associated with the cancellation in the time domain. Similarly, the referring to resource allocation 405-b, a UE 115 may receive an indication of the set of resources 415-c for transmitting a set of phase-coherent SRSs. Subsequently, the UE 115 may receive a control message (e.g., ULCI) indicating a cancellation of an allocation of a first portion of the set of resources 415-c. As shown in FIG. 4, the first portion of the set of resources 415-c associated with the cancellation may include symbols 0 and 1 within the second slot 410-d. In effect, the cancellation may result in a second portion of the set of resources 415-c before (e.g., symbols 10-13 in the first slot 410-c) and after (e.g., symbols 2 and 3 in the second slot 410-d) the first portion associated with the cancellation in the time domain.

Upon identifying the cancellation of the first portion of the set of resources (e.g., symbols 11 and 12 in resource allocation 405-a, and/or symbols 0 and 1 in resource allocation 405-b), the UE 115 may determine a phase coherency configuration associated with the second portion (e.g., non-canceled portion) of the respective sets of resources 415-b, 415-c, and may transmit one or more SRSs within the second portion (e.g., non-canceled portion) in accordance with the determined phase coherency configuration.

For example, referring to resource allocation 405-b, the UE 115 may transmit a first set of phase-coherent SRSs and a second set of phase-coherent SRSs different from the first set of phase-coherent SRSs within the second portion (e.g., non-canceled portion) of the set of resources 415-c according to the determined phase coherency configuration. In some cases, the first set of phase-coherent SRSs may be transmitted prior to the first portion of the set of resources 415-c associated with the cancellation in the time domain, and the second set of phase-coherent SRSs may be transmitted subsequent to the first portion of the set of resources 415-c associated with the cancellation in the time domain. For instance, the first set of phase-coherent SRSs may be transmitted in symbols 10-13 of the first slot 410-c, and the second set of phase-coherent SRSs may be transmitted in symbols 2 and 3 of the second slot 410-d.

The phase coherency between the first and second sets of phase-coherent SRSs transmitted before and after the canceled resources in the set of resources 415-c may depend on the determined phase coherency configuration. For example, according to a first phase coherency configuration, the first set of phase-coherent SRSs (e.g., SRSs transmitted in symbols 10-13 of the first slot 410-c) and the second set of phase-coherent SRSs (e.g., SRSs transmitted in symbols 2-3 of the second slot 410-d) may be transmitted with a common phase coherency (e.g., phase coherency is maintained). By way of another example, according to a second phase coherency configuration, the first set of phase-coherent SRSs (e.g., SRSs transmitted in symbols 10-13 of the first slot 410-c) and the second set of phase-coherent SRSs (e.g., SRSs transmitted in symbols 2-3 of the second slot 410-d) may be transmitted with different phase coherencies (e.g., phase coherency is not maintained). For instance, according to the second phase coherency configuration, the first set of phase-coherent SRSs (e.g., SRSs transmitted in symbols 10-13 of the first slot 410-c) may be transmitted with a first phase (e.g., first phase coherency), and the second set of phase-coherent SRSs (e.g., SRSs transmitted in symbols 2-3 of the second slot 410-*d*) may be transmitted with a second phase (e.g., second phase coherency) different from the first phase.

By way of another example, according to a third phase coherency configuration, phase coherency may be maintained with relaxed requirements by transmitting the first set of phase-coherent SRSs (e.g., SRSs transmitted in symbols 10-13 of the first slot 410-*c*) with a first phase, and transmitting the second set of phase-coherent SRSs (e.g., SRSs transmitted in symbols 2-3 of the second slot 410-*d*) with a second phase which is different from the first phase, where a phase difference between the first phase and the second phase satisfies a phase threshold. In some cases, the phase difference between the first phase and the second phase satisfies the phase threshold if the phase difference is less than the phase threshold. In this regard, the first and second sets of phase-coherent SRSs may be transmitted with different phases, but where the respective phases are within a pre-defined phase threshold of one another (e.g., phase difference less than 10 degrees, or some other phase threshold).

According to some additional phase coherency configurations, the UE 115-*a* may transmit the one or more SRSs with a common phase coherency (e.g., phase coherency is maintained) if certain conditions are met. For example, according to one or more additional phase coherency configurations, the UE 115-*a* may transmit a first set of SRSs (e.g., SRSs transmitted in symbols 10-13 of the first slot 410-*c*) and a second set of SRSs (e.g., SRSs transmitted in symbols 2-3 of the second slot 410-*d*) within the second portion of the set of resources 415-*c* with a common phase coherency if a time interval of the first portion of the set of resources 415-*c* associated with the cancellation (e.g., first portion including symbols 0 and 1 of the second slot 410-*d*) satisfies a time interval threshold, if there are no other transmissions (e.g., uplink transmissions) scheduled within the first portion of the set of resources 415-*c* associated with the cancellation, or both.

For example, according to a fourth phase coherency configuration, the UE 115-*a* may transmit the first and second sets of SRSs (e.g., sets of SRSs transmitted before and after the canceled symbols of the first portion) if a time interval of the first portion of the set of resources 415-*c* associated with the cancellation is less than or equal to the time interval threshold (e.g., if the first portion associated with the cancellation is less than or equal to two symbols periods). In an example, UE 115 may maintain phase coherency if a gap between SRS transmissions before the canceled resources and SRS transmissions after the canceled resources is less than or equal to a threshold (e.g., less than or equal to a two symbol period gap between SRS transmissions). In this example, in some cases, the UE 115 may maintain phase coherency across the set of resources 415-*c* even though SRS transmission in symbol periods 0 and 1 of the second slot 410-*d* has been canceled. For example, the UE 115-*a* may transmit SRSs in symbol periods 10-13 of the first slot 410-*c* that have substantially the same phase (e.g., phase difference that satisfies a threshold) as the SRSs transmitted in symbol periods 2-3 of the second slot 410-*d*.

By way of another example, according to a fifth phase coherency configuration, the UE 115-*a* may transmit the first and second sets of SRSs (e.g., sets of SRSs transmitted before and after the canceled symbols of the first portion) with a common phase coherency based on identifying an absence of an uplink transmission scheduled within the first portion of the set of SRS resources associated with the cancellation. For instance, the UE 115 may transmit the first and second sets of SRSs (e.g., sets of SRSs transmitted before and after the canceled symbols of the first portion) with a common phase coherency if it identifies that there have been no other uplink transmissions (or other transmissions) scheduled within symbols 0 or 1 of the second slot 410-*d*.

In some aspects, according to additional phase coherency configurations, the UE 115 may transmit (or refrain from transmitting) SRSs within the second portion of the set of resources 415-*b*, 415-*c* based on portions of the set of SRS resources being associated with a TD-OCC. In particular, in cases where the first portion of the set of resources 415-*b*, 415-*c* associated with the cancellation is associated with a TD-OCC, the UE 115 may refrain from transmitting SRSs 220 within other SRS resources associated with the TD-OCC, and may transmit SRSs 220 within other SRS resources which are not associated with the TD-OCC. For example, referring to resource allocation 405-*a*, the first portion of the set of resources 415-*b* associated with the cancellation (e.g., symbols 11 and 12) may be associated with a TD-OCC. In this example, the UE 115-*a* may determine that resources associated with symbol 10 are associated with the TD-OCC, and may determine that the resources associate with symbol 13 are not associated with the TD-OCC. In this example, and according to an additional phase coherency configuration, the UE 115 may transmit the one or more SRSs within symbol 13 of the set of resources 415-*b* based on the symbol 13 (and SRSs transmitted within symbol 13) not being associated with the TD-OCC. Conversely, the UE 115 may refrain from transmitting one or more additional SRSs within symbol 10 of the set of resources 415-*b* based on the symbol 10 (and SRSs transmitted within symbol 10) being associated with the TD-OCC.

Figure 5:
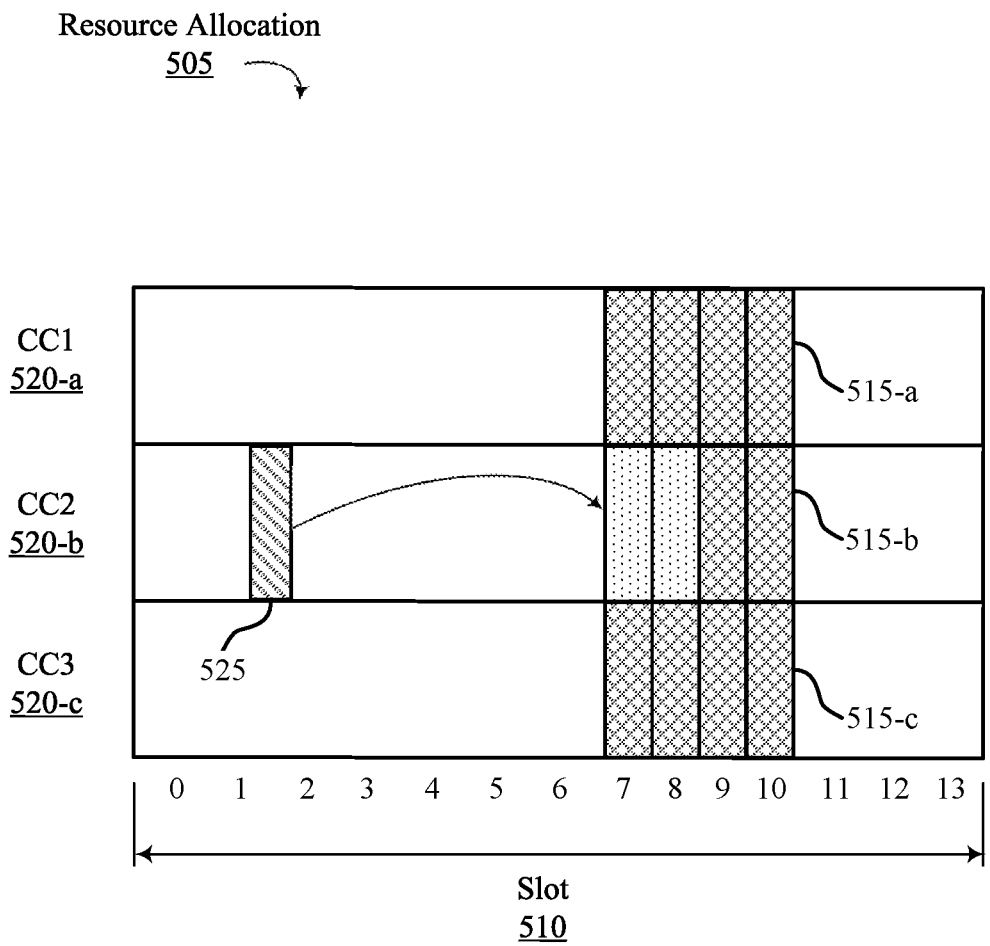
FIG. 5 illustrates an example of a resource allocation scheme that supports techniques for SRS phase coherency in accordance with aspects of the present disclosure.

FIG. 5 illustrates an example of a resource allocation scheme 500 that supports techniques for SRS phase coherency in accordance with aspects of the present disclosure. In some examples, resource allocation scheme 500 may implement, or be implemented by, aspects of wireless communications system 100, wireless communications system 200, resource allocation scheme 300, resource allocation scheme 400, or any combination thereof.

In some aspects, sets of SRS resources be frequency aggregated across multiple component carriers (e.g., carrier aggregation). In this regard, sets of SRS resources may be bundled in the time domain (e.g., SRS time bundling), in the frequency domain (e.g., SRS frequency bundling), or both. For example, as shown in FIG. 5, a resource allocation 505 may include SRS resources aggregated across multiple component carriers 520. In particular, the resource allocation 505 may include a first set of resources 515-*a* associated with a first component carrier 520-*a* (CC1), a second set of resources 515-*b* associated with a second component carrier 520-*b* (CC2), and a third set of resources 515-*c* associated with a third component carrier 520-*c* (CC3). In some aspects, the first component carrier 520-*a*, the second component carrier 520-*b*, and the third component carrier 520-*c* may include a set of frequency-contiguous component carriers. In other words, the component carriers 520 illustrated in FIG. 5 may be contiguous in the frequency domain.

In some aspects, each set of resources 515 may span one or more symbols across one or more slots within each of the respective component carriers 520. In some aspects, each of the respective sets of resources 515 may be contiguous in the time domain such that the UE 115 is configured to transmit phase-coherent SRSs within each of the respective sets of resources 515-*a*, 515-*b*, and 515-*c*. Furthermore, the first set of resources 515-*a*, the second set of resources 515-*b*, and the third set of resources 515-*c* may be associated with a common phase coherency. For example, the UE 115 may be configured to transmit a first set of SRSs within the first set of resources 515-*a*, a second set of SRSs within the second set of resources 515-*b*, and a third set of SRSs within the third set of resources 515-*c*. In this example, each of the first set of SRSs, the second set of SRSs, and the third SRSs may be associated with a common phase coherency. In this regard, each of the first set of SRSs, the second set of SRSs, and the third set of SRSs may be transmitted with a common phase.

As noted previously herein with respect to SRS time bundling, cancelation of SRS resources may additionally or alternatively result in gaps of SRS resources in the frequency domain in the case of SRS frequency bundling. For example, as shown in FIG. 5, after allocating the respective sets of resources 515 for SRS transmission, a base station 105 may subsequently transmit a control message (e.g., ULCI 525), where the control message indicates a cancelation of a first portion of the second set of resources 515-*b* within the second component carrier 520-*b*. In some aspects, the ULCI 525 indicating the cancelation may be transmitted within the same component carrier 520 associated with the canceled resources (e.g., second component carrier 520-*b*) and/or a different component carrier (e.g., first component carrier 520-*a*, third component carrier 520-*c*).

In this example illustrated in FIG. 5, the cancelation of the allocation associated with the second set of resources 515-*b* effectively results in a gap in allocated SRS resources in the frequency domain. Some wireless communications systems do not specify whether the UE 115 is expected to maintain phase coherency for SRS transmission across the first set of resources 515-*a* and the third set of resources 515-*c* when the second set of resources 515-*b* has been canceled.

Accordingly, techniques described herein may enable a UE 115 to determining its phase coherency behavior for SRS transmissions when a portion of an allocated set of SRS resources (e.g., sets of resources 415-*b* and 415-*c*) is canceled causing a time or frequency gap in the allocated set of SRS resources. In particular, techniques described herein may enable SRS transmissions with varying degrees of phase coherency in cases where at least a portion of SRS resources within a bundled set of SRS resources has been canceled or released.

For example, referring to resource allocation 505, a UE 115 may receive an indication of the sets of resources 515 within a slot 510 across the respective component carriers 520 for transmitting a set of phase-coherent SRSs. For instance, the UE 115 may be configured with a first set of resources 515-*a* associated with the first component carrier 520-*a*, a second set of resources 515-*b* associated with the second component carrier 520-*b*, and a third set of resources 515-*c* associated with the third component carrier 520-*c*. In this example, the first set of resources 515-*a*, the second set of resources 515-*b*, and/or the third set of resources 515-*c* may be associated with a common phase coherency. Moreover, the first component carrier 520-*a*, the second component carrier 520-*b*, and/or the third component carrier 520-*c* may include a set of frequency-contiguous component carriers 520. For example, the first, second, and third component carriers 520, may include a set of frequency-contiguous component carriers 520, where the second component carrier 520-*b* is positioned between the first component carrier 520-*a* and the third component carrier 520-*c* in the frequency domain.

Subsequently, the UE 115 may receive a control message 525 (e.g., ULCI 525) indicating a cancellation of an allocation of a first portion of the set of resources 515. As shown in FIG. 5, the first portion of the set of resources 515 associated with the cancellation may be positioned within the second set of resources 515-*b* in the second component carrier 520-*b*. Specifically, the first portion of the set of resources 515 associated with the cancellation may include the resources associated with symbols 7 and 8 within the slot 510.

In this example, the UE 115 may determine a phase coherency configuration which is to be applied for transmitting SRSs within the non-canceled SRS resources of the resource allocation 505. For instance, in accordance with a determined phase coherency configuration, the UE 115 may transmit at least a subset of the first set of SRSs within the first component carrier 520-*a* with a first phase, and may transmit at least a subset of the second set of SRSs within the second component carrier 520-*b* with a second phase different from the first phase based on the first portion of the set of resources 515 associated with the cancellation being positioned within the second set of resources 515-*b*. For instance, the UE 115 may transmit SRSs within the first set of resources 515-*a* with a first phase (e.g., first phase coherency), and may transmit SRSs within symbols 9 and 10 of the second set of resources 515-*b* with a second phase (e.g., second phase coherency) different from the first phase. In other words, in accordance with this example phase coherency configuration, the UE 115 does not maintain phase coherency between at least portions of the first set of resources 515-*a* and the second set of resources 515-*b* as a result of the cancellation of at least a subset of the resources associated with the second set of resources 515-*b* within the second component carrier 520-*b*.

Similarly, in accordance with a determined phase coherency configuration, the UE 115 may transmit at least a subset of the first set of SRSs within the first component carrier 520-*a* with a first phase, and transmit at least a subset of the third set of SRSs within the third component carrier 520-*c* with a phase different from the first phase based on the first portion of the set of resources 515 associated with the cancellation being positioned within the second set of resources 515-*b* of the second component carrier 520-*b*. For instance, the UE 115 may transmit SRSs within the first set of resources 515-*a* with a first phase (e.g., first phase coherency), and may transmit SRSs within the third set of resources 515-*c* with a third phase (e.g., third phase coherency) different from the first phase. In other words, phase coherency between at least portions of the first set of resources 515-*a* and the third set of resources 515-*c* may not be maintained as a result of the cancellation of at least a subset of the resources associated with the second set of resources 515-*b* within the second component carrier 520-*b*.

Accordingly, in some aspects, techniques described herein may be configured to maintain some level of phase coherency within SRSs transmitted across component carriers 520 in the frequency domain depending on the relative positioning of the resources associate with the cancellation.

Figure 6:
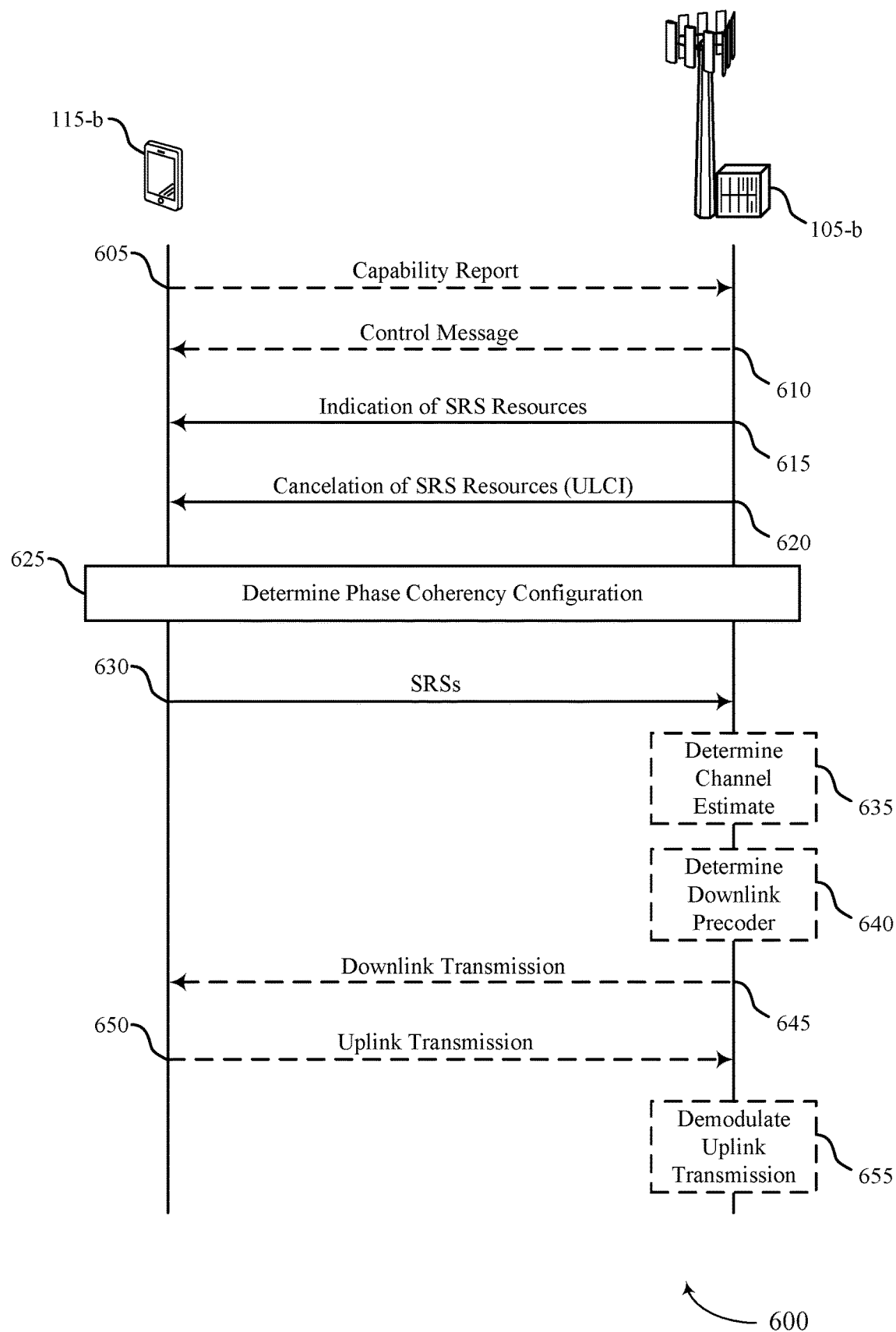
FIG. 6 illustrates an example of a process flow that supports techniques for SRS phase coherency in accordance with aspects of the present disclosure.

FIG. 6 illustrates an example of a process flow 600 that supports techniques for SRS phase coherency in accordance with aspects of the present disclosure. In some examples, process flow 600 may implement, or be implemented by, aspects of wireless communications system 100, wireless communications system 200, resource allocation schemes 300, 400, or 500, or any combination thereof. For example, the process flow 600 may illustrate a UE 115-*b* receiving an indication of a set of resources allocated for SRS transmission, receiving a cancelation of an allocation of at least a first portion of the set of resources, determining a phase coherency configuration associated with a second portion of the set of resources, and transmitting one or more SRSs in accordance with the determined phase coherency configuration, as described with reference to FIGS. 1-5, among other aspects. In some aspects, the process flow 600 may include a UE 115-*b* and a base station 105-*b*, which may include examples of UEs 115 and base stations 105 as described with reference to FIGS. 1-5.

In some examples, the operations illustrated in process flow 600 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 605, the UE 115-*b* may transmit a capability report (e.g., UE capability report) to the base station 105-*b*. The capability report may indicate one or more parameters associated with SRS phase coherency at the UE 115-*b*. For example, in some cases, the capability report may include an indication of one or more phase coherency configurations supported by the UE 115-*b* in cases where at least a subset of SRS resources are canceled. For instance, the capability report may indicate whether the UE 115-*b* is or is not capable of maintaining SRS phase coherency in cases where a subset of SRS resources are canceled (e.g., strict phase coherency where phase coherency is either maintained or not), if the UE 115-*b* is capable of maintaining SRS phase coherency when certain conditions are met, if the UE 115-*b* is capable of maintaining SRS phase coherency with relaxed requirements (e.g., relaxed phase coherency), or any combination thereof.

The capability report may additionally or alternatively indicate other parameters used for SRS phase coherency at the UE 115-*b*. For example, the capability report may indicate one or more conditions which must be met in order for the UE 115-*b* to maintain phase coherency. For instance, the capability report may indicate that it is able or unable to maintain phase coherency in different subsets of SRSs in cases where other uplink transmissions are scheduled within a gap of SRS resources resulting from a cancellation. By way of another example, the capability report may indicate that it is able or unable to maintain phase coherency in different subsets of SRSs when a time interval of a gap of SRS resources resulting from a cancellation is larger or smaller than a particular time interval threshold. In this example, the capability report may indicate the time interval threshold. By way of another example, the capability report may indicate a phase threshold indicating that the UE 115-*b* is capable of maintaining SRS phase coherency within the indicated phase threshold for relaxed phase coherency.

At 610, the base station 105-*b* may transmit a control message (e.g., RRC message, DCI message, MAC-CE message) to the UE 115-*b*. In some aspects, the base station 105-*b* may transmit the control message based on receiving the capability report at 605. In some aspects, the control message may include an indication of which phase coherency configuration the UE 115-*b* is to utilize. For example, in cases where the UE 115-*b* indicates that it is capable of applying multiple phase coherency configurations via the capability report at 605, the base station 105-*b* may indicate which phase coherency configuration the UE 115-*b* is to apply via the control message at 610. By way of another example, the control message at 610 may indicate one or more parameters or characteristics associated with SRS phase coherency at the UE 115-*b*, including a time interval threshold of a gap of SRS resources caused by a cancellation, a phase threshold for relaxed phase coherency, or any combination thereof.

At 615, the base station 105-*b* may transmit, to the UE 115-*b*, an indication of a set of resources for transmitting a set of phase-coherent SRSs. In this regard, the base station 105-*b* may indicate a set of time resources, a set of frequency resources, a set of spatial resources, or any combination thereof, which are usable by the UE 115-*a* to transmit a set of phase-coherent SRSs. The set of SRS resources may be associated with periodic SRSs, semi-periodic SRSs, aperiodic SRSs, or any combination thereof. In some aspects, the indication of the set of SRS resources transmitted at 615 may be transmitted via a control message (e.g., DCI message). For example, the base station 105-*b* may indicate the set of SRS resources at 615 via a unicast DCI message (e.g., UE-specific DCI message), a group-common DCI message (e.g., SRS carrier switching), or both. The base station 105-*b* may transmit the indication of the set of SRS resources at 615 based on receiving the capability report at 605, transmitting the control message at 610, or both.

At 620, the base station 105-*b* may transmit a control message indicating a cancellation of an allocation of a first portion of the set of SRS resources. In some cases, the cancellation of the allocation may be indicated via a ULCI message. The base station 105-*b* may transmit the indication of the cancellation based on receiving the capability report at 605, transmitting the control message (e.g., RRC message) at 610, transmitting the indication of the set of SRS resources at 615, or any combination thereof. For example, the capability message received at 605 may indicate that the UE 115-*b* may maintain phase coherency in cases where a time interval of a gap of SRS resources caused by a cancellation is less than a time interval threshold. In some cases, the indication of the set of SRS resources indicated at 620 may additionally indicate that at least a subset of the set of SRS resources are associated with a TD-OCC. In this example, the base station 105-*b* may indicate the cancellation at 615 such that a time interval of the first portion (e.g., canceled portion) of the set of SRS resources is less than the time interval threshold so that the UE 115-*b* may be able to maintain phase coherency across transmitted SRSs.

In some cases, indications or parameters which were previously described as being indicated in the control message at 610 may additionally or alternatively be indicated with the indication of the SRS resources (e.g., DCI message) at 615, the indication of the cancellation (e.g., ULCI) at 620, or both. For example, in some cases, the base station 105-*b* may additionally indicate which phase coherency configuration the UE 115-*b* is to utilize along with the control message indicating the set of SRS resources at 615 and/or the ULCI at 620. Additionally or alternatively, the control message indicating the set of SRS resources and/or the control message indicating the cancellation may include an indication of one or more parameters associated with SRS phase coherency, including a time interval threshold for maintaining phase coherency, a phase threshold for relaxed phase coherency, or any combination thereof.

At 625, the UE 115-*b*, the base station 105-*b*, or both, may determine a phase coherency configuration associated with a second portion (e.g., non-canceled portion) of the set of SRS resources. Examples of the various phase coherency configurations are discussed herein and with reference to FIGS. 2-5. The UE 115-*b* and/or the base station 105-*b* may be configured to determine, when a portion of an SRS resource allocation has been canceled, whether phase coherency is to be fully maintained, maintained if certain conditions are met, maintained with relaxed requirements, or lost (e.g., not maintained) within SRSs transmitted within the second portion (e.g., non-canceled portion) of the set of SRS resources. In some aspects, the UE 115-*b* and/or the base station 105-*b* may determine the phase coherency configuration based on the capability report at 605, the control message (e.g., RRC message) at 610, the indication of the set of SRS resources at 615, the indication of the cancellation of the allocation of the first portion at 620, or any combination thereof. In some examples, the UE 115-*b* and the base station 105-*b* may each be coded with the same phase coherency configuration, or the base station 105-*b* may signal to the UE 115-*b* which phase coherency configuration to apply.

At 630, the UE 115-*b* may transmit one or more SRSs within the second portion (e.g., non-canceled portion) of the set of SRS resources. The one or more SRSs may include, but are not limited to, periodic SRSs, semi-periodic SRSs, aperiodic SRSs, or any combination thereof. In some aspects, the UE 115-*b* may transmit (and the base station 105-*b* may receive) the one or more SRSs at 630 in accordance with the phase coherency configuration determined at 625. Accordingly, the UE 115-*b* may transmit, and the base station 105-*b* may receive, the one or more SRSs at 630 based on the capability report at 605, the control message at 610, the indication of the set of SRS resources at 615, the indication of the cancellation at 620, the phase coherency configuration determined at 625, or any combination thereof.

For example, the UE 115-*b* may transmit a first set of phase-coherent SRSs and a second set of phase-coherent SRSs different from the first set of phase-coherent SRSs in accordance with the determined phase coherency configuration. In some cases, the first set of phase-coherent SRSs may be transmitted prior to the first portion of the set of SRS resources associated with the cancellation in the time domain, and the second set of phase-coherent SRSs may be transmitted subsequent to the first portion of the set of SRS resources associated with the cancellation in the time domain. The phase coherency behavior of the first and second sets of phase-coherent SRSs may be dependent on the determined phase coherency configuration.

For example, according to a first phase coherency configuration, the first set of phase-coherent SRSs and the second set of phase-coherent SRSs may be transmitted with a common phase coherency (e.g., phase coherency is maintained). By way of another example, according to a second phase coherency configuration, the first set of phase-coherent SRSs and the second set of phase-coherent SRSs may be transmitted with different phase coherencies (e.g., phase coherency is not maintained).

By way of another example, according to a third phase coherency configuration, phase coherency may be maintained with relaxed requirements if the first set of phase-coherent SRSs are transmitted with a first phase, and the second set of phase-coherent SRSs are transmitted with a second phase which is different from the first phase, but where a phase difference between the first phase and the second phase satisfies a phase threshold. In some cases, the phase difference between the first phase and the second phase satisfies the phase threshold if the phase difference is less than the phase threshold. In this regard, the first and second sets of phase-coherent SRSs may be transmitted with different phases, but where the respective phases are within a pre-defined phase threshold of one another (e.g., phase difference less than 10 degrees). In some aspects, the phase threshold may be indicated via the capability report at 605, the control message at 610, the indication of the set of SRS resources (e.g., DCI message) at 610, the cancellation (e.g., ULCI) at 615, or any combination thereof.

In some cases, according to a fourth phase coherency configuration, the UE 115-*b* may transmit the one or more SRSs at 630 with a common phase coherency (e.g., phase coherency is maintained) if certain conditions are met. For example, in accordance with the fourth phase coherency configuration, the UE 115-*b* may transmit a first set of SRSs and a second set of SRSs within the second portion of the set of SRS resources with a common phase coherency if a time interval of the first portion of the set of SRS resources associated with the cancellation satisfies a time interval threshold, if there are no other transmissions (e.g., uplink transmissions) scheduled within the first portion of the set of SRS resources associated with the cancellation, or both. For instance, the UE 115-*b* may transmit the first and second sets of SRSs if a time interval of the first portion of the set of SRS resources associated with the cancellation is less than the time interval threshold. In this example, the time interval threshold may be indicated via the capability report at 605, the control message at 610, the indication of the set of SRS resources (e.g., DCI message) at 610, the cancellation (e.g., ULCI) at 615, or any combination thereof. By way of another example, the UE 115-*b* may transmit the first and second sets of SRSs with a common phase coherency based on identifying an absence of an uplink transmission scheduled within the first portion of the set of SRS resources associated with the cancellation.

According to some additional phase coherency configurations, the UE 115-*b* may transmit (or refrain from transmitting) SRSs within the second portion of the set of SRS resources based on portions of the set of SRS resources being associated with a TD-OCC. In particular, in cases where the first portion of the set of SRS resources associated with the cancellation is associated with a TD-OCC, the UE 115-*b* may refrain from transmitting SRSs within other SRS resources associated with the TD-OCC, and may transmit SRSs within other SRS resources which are not associated with the TD-OCC. For example, in some cases, the first portion of the set of SRS resources associated with the cancellation may be associated with a TD-OCC. In this example, the UE 115-*b* may transmit the one or more SRSs based on the one or more SRSs not being associated with the TD-OCC, and may refrain from transmitting one or more additional SRSs based on the one or more additional SRSs being associated with the TD-OCC.

In some cases, according to additional phase coherency configurations, the UE 115-*b* may transmit the one or more SRSs at 630 with phase coherency maintained or not across the one or more SRSs within the frequency domain. In particular, phase coherency may be maintained or not with respect to the frequency domain based on the relative positioning of the first portion of the set of SRS resources in the frequency domain, as described in further detail herein with respect to FIGS. 2 and 5.

At 635, the base station 105-b may determine a channel estimate associated with a channel between the UE 115-b and the base station 105-b. In some aspects, the base station 105-b may determine the channel estimate at 635 based on receiving the one or more SRSs from the UE 115-b at 630. For example, the base station 105-b may perform one or more measurements (e.g., RSSI measurements, RSRP measurements, RSRQ measurements, SNR measurements, SINR measurements) on the one or more SRSs received at 630, and may determine the channel estimate at 635 based on the performed measurements.

In some aspects, the base station 105-b may be configured to employ different channel estimation techniques based on the relative phase coherency of the SRSs received at 630. For example, the base station 105-b may receive a first set of phase-coherent SRSs, and a second set of phase-coherent SRSs different from the first set of phase-coherent SRSs. In cases where the first set of phase-coherent SRSs are associated with a first phase, and the second set of phase-coherent SRSs are associated with a second phase different from the first phase, the base station 105-b may be configured to perform channel estimation by performing additive combining within the respective sets of phase-coherent SRSs. However, in such cases, additive combining may not be performed across the first and second sets of phase-coherent SRSs due to the different phases associated with the first and second sets of phase-coherent SRSs. Conversely, in cases where the first and second sets of phase-coherent SRSs are transmitted/received with a common phase, the base station 105-b may be configured to perform channel estimation by performing additive combining both within and/or across the respective sets of phase-coherent SRSs.

At 640, the base station 105-b may determine a precoder associated with downlink transmissions. In this regard, the base station 105-b may determine a precoder which may be used to transmit downlink transmissions to the UE 115-b. In some aspects, the base station 105-b may determine the precoder based on the channel estimate determined at 635.

At 645, the base station 105-b may transmit a downlink transmission to the UE 115-b. In some aspects, the base station 105-b may transmit the downlink transmission at 645 based on (e.g., in accordance with) the precoder determined at 640. In this regard, the base station 105-b may transmit the downlink transmission at 645 based on the channel estimate determined at 635.

At 650, the UE 115-b may transmit an uplink transmission to the base station 105-b. At 655, the base station 105-b may demodulate the uplink transmission. In some aspects, the base station 105-b may demodulate the uplink transmission based on the channel estimate determined at 635.

Techniques described herein may enable SRS transmissions with varying degrees of phase coherency in cases where at least a portion of SRS resources within a bundled set of SRS resources has been canceled or released. In particular, by supporting multiple different phase coherency configurations, techniques described herein may enable wireless devices (e.g., UE 115-b, base station 105-b) within a wireless communications system (e.g., wireless communications systems 100, 200) to maintain some degree of phase coherency based on respective capabilities of UEs 115 within the wireless communications system. Furthermore, by supporting defined phase coherency configurations, techniques described herein may improve phase coherency of SRS signals in cases where at least a subset of SRS resources are canceled or released, thereby enabling more accurate channel estimation and improving the efficiency and reliability of wireless communications within the wireless communications system.

Figure 7:
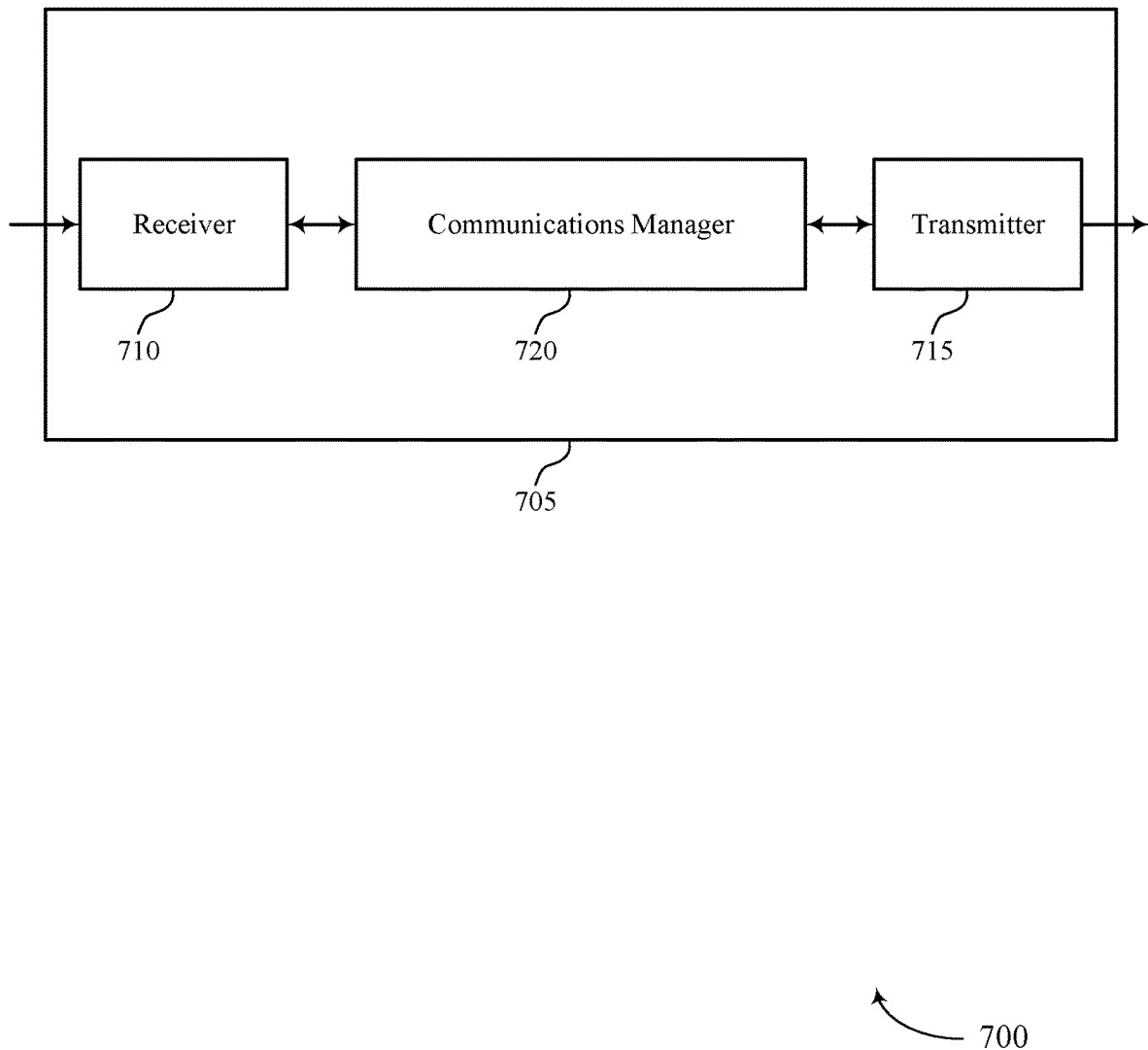
FIGS. 7 and 8 show block diagrams of devices that support techniques for SRS phase coherency in accordance with aspects of the present disclosure.

FIG. 7 shows a block diagram 700 of a device 705 that supports techniques for SRS phase coherency in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for SRS phase coherency). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for SRS phase coherency). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for SRS phase coherency as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving, from a base station, an indication of a set of resources for transmitting a set of multiple phase-coherent SRSs. The communications manager 720 may be configured as or otherwise support a means for receiving, from the base station, a control message indicating a cancellation of an allocation of a first portion of the set of resources. The communications manager 720 may be configured as or otherwise support a means for determining a phase coherency configuration associated with a second portion of the set of resources based on receiving the control message indicating the cancellation. The communications manager 720 may be configured as or otherwise support a means for transmitting one or more SRSs within the second portion of the set of resources in accordance with the determined phase coherency configuration.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for maintaining varying degrees of SRS phase coherency in cases where at least a portion of SRS resources within a bundled set of SRS resources has been canceled or released. By supporting defined phase coherency configurations, techniques described herein may improve phase coherency of SRS signals in cases where at least a subset of SRS resources are canceled or released, thereby enabling more accurate channel estimation. In this regard, by enabling more accurate channel estimation, the efficiency and reliability of wireless communications within a wireless communications system may be improved, thereby reducing a quantity of retransmissions which may be performed, which therefore improves resource utilization, reduces power consumption, and improves battery performance at the UE 115.

Figure 8:
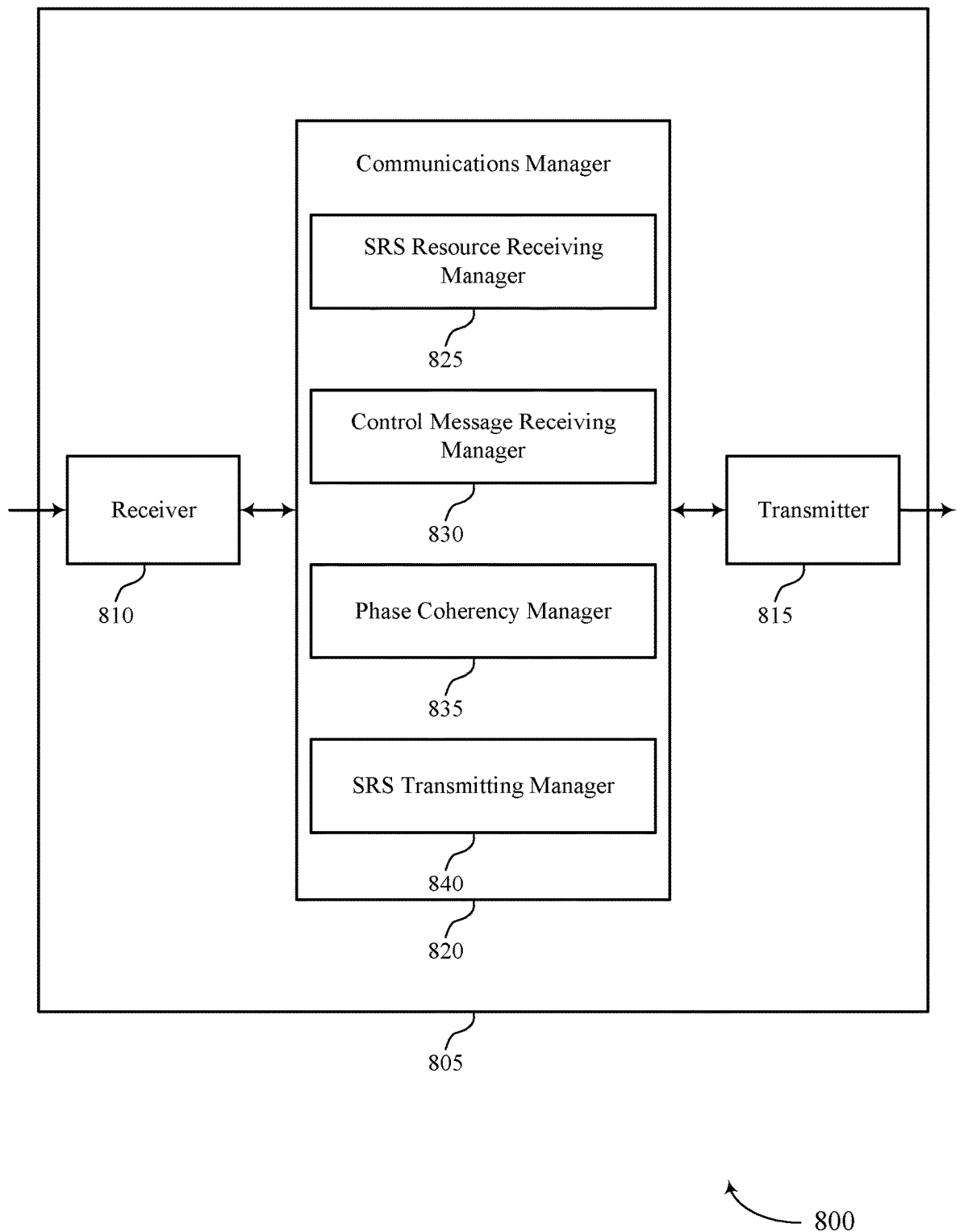

FIG. 8 shows a block diagram 800 of a device 805 that supports techniques for SRS phase coherency in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for SRS phase coherency). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for SRS phase coherency). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for SRS phase coherency as described herein. For example, the communications manager 820 may include an SRS resource receiving manager 825, a control message receiving manager 830, a phase coherency manager 835, an SRS transmitting manager 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The SRS resource receiving manager 825 may be configured as or otherwise support a means for receiving, from a base station, an indication of a set of resources for transmitting a set of multiple phase-coherent SRSs. The control message receiving manager 830 may be configured as or otherwise support a means for receiving, from the base station, a control message indicating a cancellation of an allocation of a first portion of the set of resources. The phase coherency manager 835 may be configured as or otherwise support a means for determining a phase coherency configuration associated with a second portion of the set of resources based on receiving the control message indicating the cancellation. The SRS transmitting manager 840 may be configured as or otherwise support a means for transmitting one or more SRSs within the second portion of the set of resources in accordance with the determined phase coherency configuration.

Figure 9:
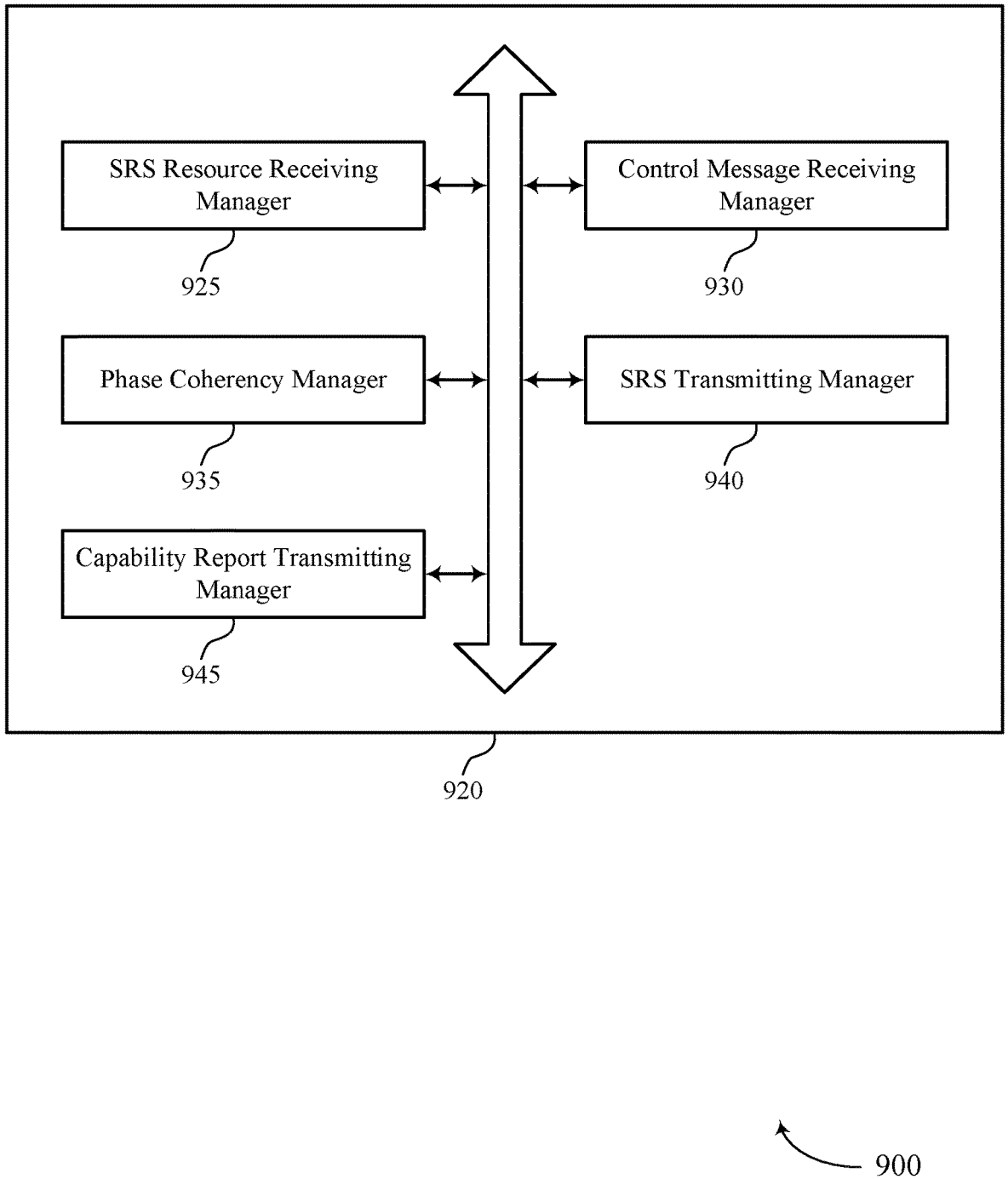
FIG. 9 shows a block diagram of a communications manager that supports techniques for SRS phase coherency in accordance with aspects of the present disclosure.

FIG. 9 shows a block diagram 900 of a communications manager 920 that supports techniques for SRS phase coherency in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for SRS phase coherency as described herein. For example, the communications manager 920 may include an SRS resource receiving manager 925, a control message receiving manager 930, a phase coherency manager 935, an SRS transmitting manager 940, a capability report transmitting manager 945, or any combination thereof. Each of these components may communicate, directly or indirectly, with one another (e.g., via one or more buses).

The communications manager 920 may support wireless communication at a UE in accordance with examples as disclosed herein. The SRS resource receiving manager 925 may be configured as or otherwise support a means for receiving, from a base station, an indication of a set of resources for transmitting a set of multiple phase-coherent SRSs. The control message receiving manager 930 may be configured as or otherwise support a means for receiving, from the base station, a control message indicating a cancellation of an allocation of a first portion of the set of resources. The phase coherency manager 935 may be configured as or otherwise support a means for determining a phase coherency configuration associated with a second portion of the set of resources based on receiving the control message indicating the cancellation. The SRS transmitting manager 940 may be configured as or otherwise support a means for transmitting one or more SRSs within the second portion of the set of resources in accordance with the determined phase coherency configuration.

In some examples, to support transmitting the one or more SRSs within the second portion of the set of resources, the SRS transmitting manager 940 may be configured as or otherwise support a means for transmitting a first set of phase-coherent SRSs. In some examples, to support transmitting the one or more SRSs within the second portion of the set of resources, the SRS transmitting manager 940 may be configured as or otherwise support a means for transmitting a second set of phase-coherent SRSs different from the first set of phase-coherent SRSs.

In some examples, the SRS transmitting manager 940 may be configured as or otherwise support a means for transmitting the first set of phase-coherent SRSs prior to the first portion of the set of resources associated with the cancellation in the time domain. In some examples, the SRS transmitting manager 940 may be configured as or otherwise support a means for transmitting the second set of phase-coherent SRSs subsequent to the first portion of the set of resources associated with the cancellation in the time domain.

In some examples, the SRS transmitting manager 940 may be configured as or otherwise support a means for transmitting the first set of phase-coherent SRSs associated with a first phase. In some examples, the SRS transmitting manager 940 may be configured as or otherwise support a means for transmitting the second set of phase-coherent SRSs associated with a second phase different from the first phase.

In some examples, to support transmitting the one or more SRSs within the second portion of the set of resources, the SRS transmitting manager 940 may be configured as or otherwise support a means for transmitting a first set of SRSs and a second set of SRSs different from the first set of SRSs with a common phase coherency based on a time interval of the first portion of the set of resources associated with the cancellation satisfying a time interval threshold.

In some examples, the time interval of the first portion of the set of resources associated with the cancellation satisfies the time interval threshold if the time interval is less than the time interval threshold.

In some examples, the control message receiving manager 930 may be configured as or otherwise support a means for receiving, from the base station, a second control message including an indication of the time interval threshold, where transmitting the first set of SRSs and the second set of SRSs with the common phase coherency is based on receiving the second control message.

In some examples, the SRS transmitting manager 940 may be configured as or otherwise support a means for transmitting the first set of SRSs and the second set of SRSs different from the first set of SRSs with the common phase coherency based on identifying an absence of an uplink transmission scheduled within the first portion of the set of resources associated with the cancellation.

In some examples, to support transmitting the one or more SRSs within the second portion of the set of resources, the SRS transmitting manager 940 may be configured as or otherwise support a means for transmitting a first set of SRSs and a second set of SRSs different from the first set of SRSs with a common phase coherency based on identifying an absence of an uplink transmission scheduled within the first portion of the set of resources associated with the cancellation.

In some examples, to support set of multiple phase-coherent SRSs, the SRS transmitting manager 940 may be configured as or otherwise support a means for a first set of SRSs associated with a first component carrier, and a second set of SRSs associated with a second component carrier, where the first set of SRSs and the second set of SRSs are associated with a common phase coherency.

In some examples, to support transmitting the one or more SRSs, the SRS transmitting manager 940 may be configured as or otherwise support a means for transmitting at least a subset of the first set of SRSs with a first phase and transmitting at least a subset of the second set of SRSs with a second phase different from the first phase based on the first portion of the set of resources associated with the cancellation being positioned within the second set of SRSs.

In some examples, the first component carrier and the second component carrier include a set of frequency-contiguous component carriers.

In some examples, the set of multiple phase-coherent SRSs further include a third set of SRSs associated with a third component carrier. In some examples, the third set of SRSs is associated with the common phase coherency associated with the first set of SRSs and the second set of SRSs.

In some examples, to support transmitting the one or more SRSs, the SRS transmitting manager 940 may be configured as or otherwise support a means for transmitting at least a subset of the first set of SRSs with a first phase and transmitting at least a subset of the third set of SRSs with a second phase different from the first phase based on the first portion of the set of resources associated with the cancellation being positioned within the second set of SRSs.

In some examples, to support transmitting the one or more SRSs within the second portion of the set of resources, the SRS transmitting manager 940 may be configured as or otherwise support a means for transmitting a first set of phase-coherent SRSs with a first phase. In some examples, to support transmitting the one or more SRSs within the second portion of the set of resources, the SRS transmitting manager 940 may be configured as or otherwise support a means for transmitting a second set of phase-coherent SRSs with a second phase different from the first phase, where a phase difference between the first phase and the second phase satisfies a phase threshold.

In some examples, the phase difference between the first phase and the second phase satisfies the phase threshold if the phase difference is less than the phase threshold.

In some examples, the capability report transmitting manager 945 may be configured as or otherwise support a means for transmitting, to the base station, a UE capability report including an indication of the phase threshold, where transmitting the first set of phase-coherent SRSs and the second set of phase-coherent SRSs is based on transmitting the UE capability report.

In some examples, the capability report transmitting manager 945 may be configured as or otherwise support a means for transmitting, to the base station, a UE capability report including an indication of one or more phase coherency configurations supported by the UE, where transmitting the one or more SRSs is based on transmitting the UE capability report.

In some examples, the control message includes a ULCI message.

In some examples, to support transmitting the one or more SRSs, the SRS transmitting manager 940 may be configured as or otherwise support a means for transmitting the one or more SRSs based on the one or more SRSs not being associated with the TD-OCC.

In some examples, None, and the SRS transmitting manager 940 may be configured as or otherwise support a means for refraining from transmitting one or more additional SRSs associated with the second portion of the set of resources based on the one or more additional SRSs being associated with the TD-OCC.

In some examples, the set of multiple phase-coherent SRSs include periodic SRSs, semi-periodic SRSs, aperiodic SRSs, or any combination thereof.

In some examples, the control message receiving manager 930 may be configured as or otherwise support a means for receiving, from the base station, a unicast DCI message, a group-common DCI message, or both, where the indication of the set of resources for transmitting the set of multiple phase-coherent SRSs is received via the unicast DCI message, the group-common DCI message, or both.

Figure 10:
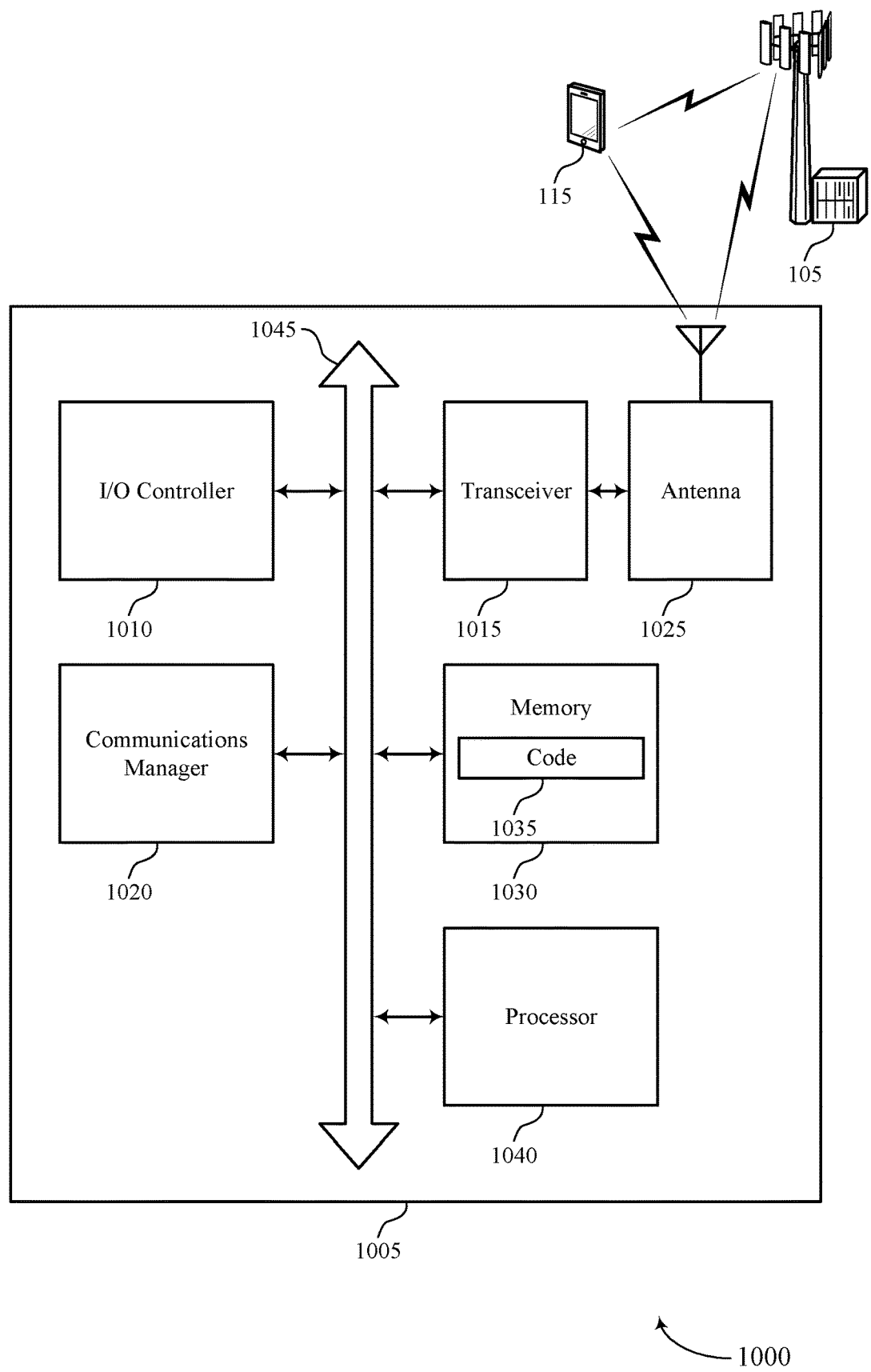
FIG. 10 shows a diagram of a system including a device that supports techniques for SRS phase coherency in accordance with aspects of the present disclosure.

FIG. 10 shows a diagram of a system 1000 including a device 1005 that supports techniques for SRS phase coherency in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for SRS phase coherency). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving, from a base station, an indication of a set of resources for transmitting a set of multiple phase-coherent SRSs. The communications manager 1020 may be configured as or otherwise support a means for receiving, from the base station, a control message indicating a cancellation of an allocation of a first portion of the set of resources. The communications manager 1020 may be configured as or otherwise support a means for determining a phase coherency configuration associated with a second portion of the set of resources based on receiving the control message indicating the cancellation. The communications manager 1020 may be configured as or otherwise support a means for transmitting one or more SRSs within the second portion of the set of resources in accordance with the determined phase coherency configuration.

By including or configuring the communications manager 1020 in accordance with examples as described herein, the device 1005 may support techniques maintaining varying degrees of SRS phase coherency in cases where at least a portion of SRS resources within a bundled set of SRS resources has been canceled or released. By supporting defined phase coherency configurations, techniques described herein may improve phase coherency of SRS signals in cases where at least a subset of SRS resources are canceled or released, thereby enabling more accurate channel estimation. In this regard, by enabling more accurate channel estimation, the efficiency and reliability of wireless communications within a wireless communications system may be improved, thereby reducing a quantity of retransmissions which may be performed, which therefore improves resource utilization, reduces power consumption, and improves battery performance at the UE 115.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for SRS phase coherency as described herein, or the processor 1040 and the memory 1030 may be otherwise configured to perform or support such operations.

Figure 11:
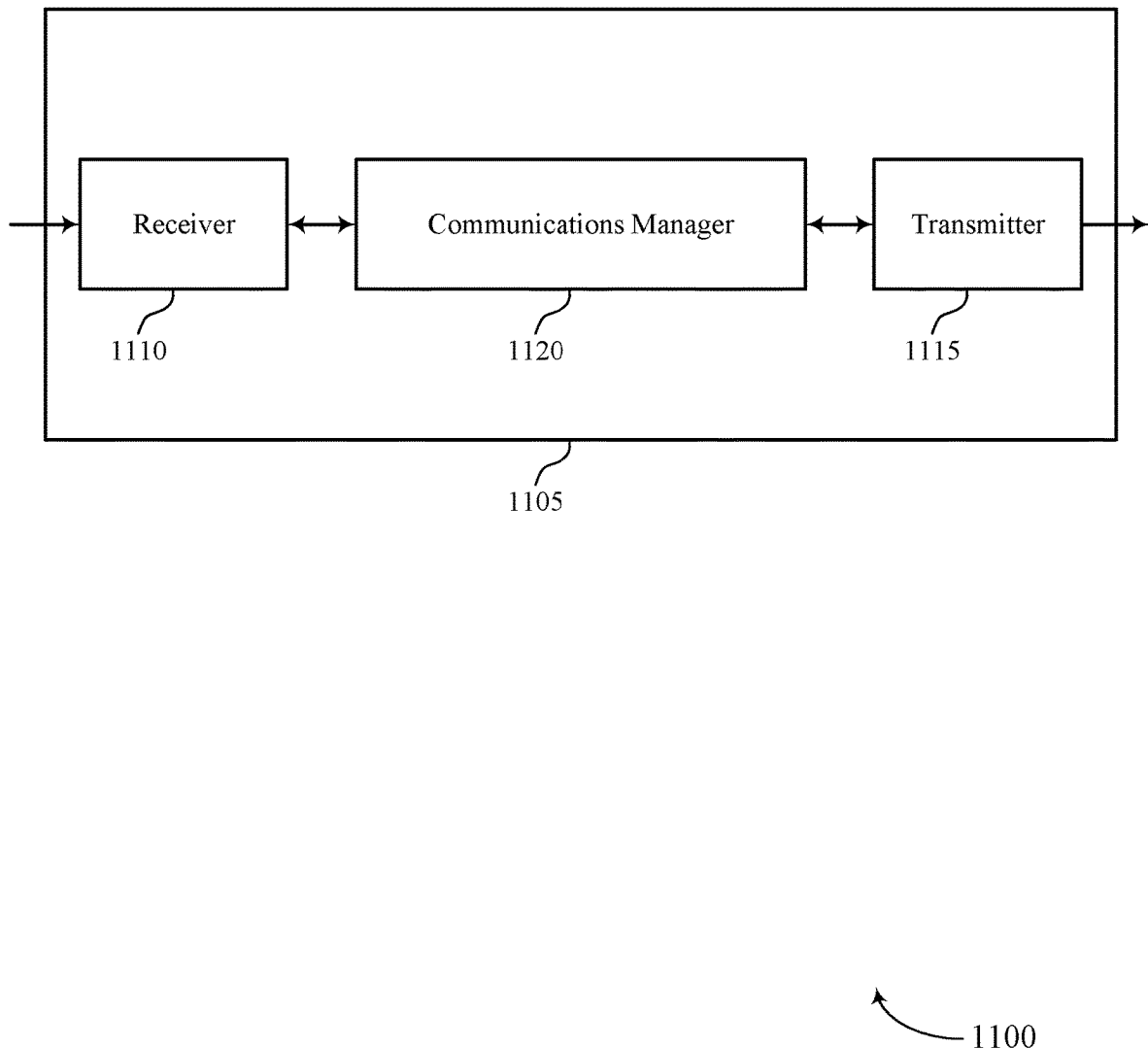
FIGS. 11 and 12 show block diagrams of devices that support techniques for SRS phase coherency in accordance with aspects of the present disclosure.

FIG. 11 shows a block diagram 1100 of a device 1105 that supports techniques for SRS phase coherency in accordance with aspects of the present disclosure. The device 1105 may be an example of aspects of a base station 105 as described herein. The device 1105 may include a receiver 1110, a transmitter 1115, and a communications manager 1120.

The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for SRS phase coherency). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for SRS phase coherency). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for SRS phase coherency as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting, to a UE, an indication of a set of resources for transmitting a set of multiple phase-coherent SRSs. The communications manager 1120 may be configured as or otherwise support a means for transmitting, to the UE, a control message indicating a cancellation of an allocation of a first portion of the set of resources. The communications manager 1120 may be configured as or otherwise support a means for determining a phase coherency configuration associated with a second portion of the set of resources based on transmitting the control message indicating the cancellation. The communications manager 1120 may be configured as or otherwise support a means for receiving, from the UE, one or more SRSs within the second portion of the set of resources in accordance with the determined phase coherency configuration.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for maintaining varying degrees of SRS phase coherency in cases where at least a portion of SRS resources within a bundled set of SRS resources has been canceled or released. By supporting defined phase coherency configurations, techniques described herein may improve phase coherency of SRS signals in cases where at least a subset of SRS resources are canceled or released, thereby enabling more accurate channel estimation. In this regard, by enabling more accurate channel estimation, the efficiency and reliability of wireless communications within a wireless communications system may be improved, thereby reducing a quantity of retransmissions which may be performed, which therefore improves resource utilization, and reduces power consumption at the base station 105.

Figure 12:
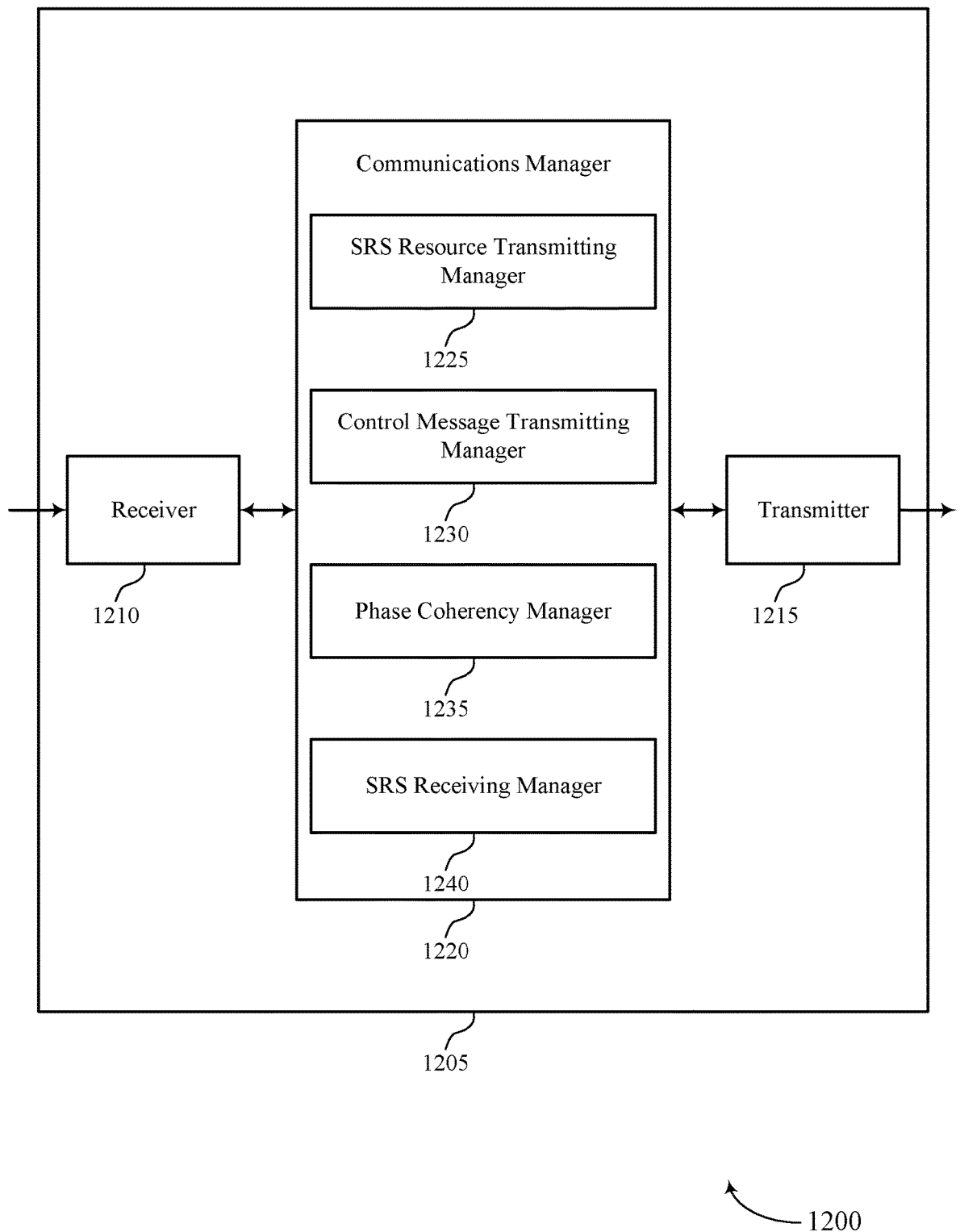

FIG. 12 shows a block diagram 1200 of a device 1205 that supports techniques for SRS phase coherency in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for SRS phase coherency). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for SRS phase coherency). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for SRS phase coherency as described herein. For example, the communications manager 1220 may include an SRS resource transmitting manager 1225, a control message transmitting manager 1230, a phase coherency manager 1235, an SRS receiving manager 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The SRS resource transmitting manager 1225 may be configured as or otherwise support a means for transmitting, to a UE, an indication of a set of resources for transmitting a set of multiple phase-coherent SRSs. The control message transmitting manager 1230 may be configured as or otherwise support a means for transmitting, to the UE, a control message indicating a cancellation of an allocation of a first portion of the set of resources. The phase coherency manager 1235 may be configured as or otherwise support a means for determining a phase coherency configuration associated with a second portion of the set of resources based on transmitting the control message indicating the cancellation. The SRS receiving manager 1240 may be configured as or otherwise support a means for receiving, from the UE, one or more SRSs within the second portion of the set of resources in accordance with the determined phase coherency configuration.

Figure 13:
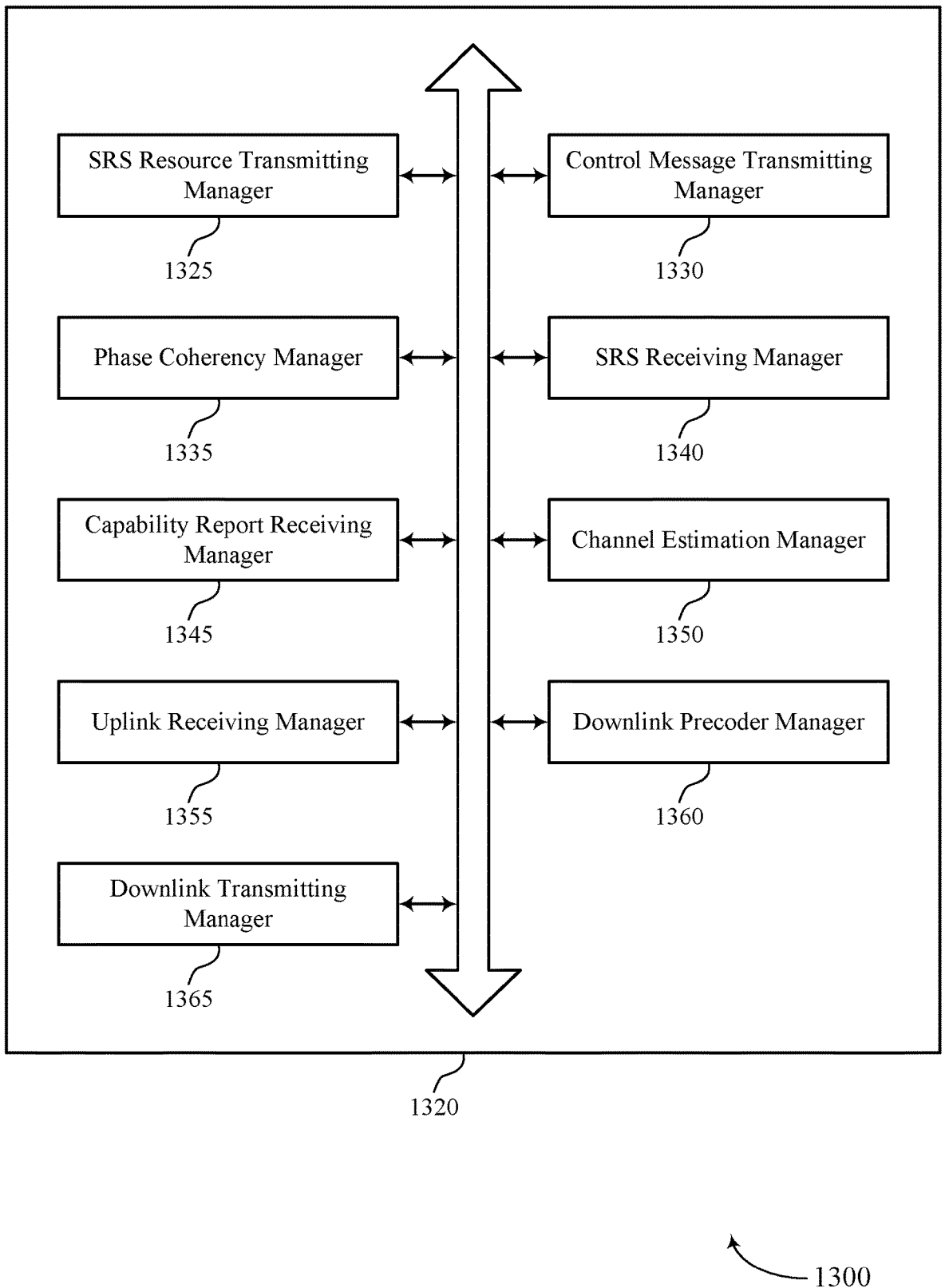
FIG. 13 shows a block diagram of a communications manager that supports techniques for SRS phase coherency in accordance with aspects of the present disclosure.

FIG. 13 shows a block diagram 1300 of a communications manager 1320 that supports techniques for SRS phase coherency in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for SRS phase coherency as described herein. For example, the communications manager 1320 may include an SRS resource transmitting manager 1325, a control message transmitting manager 1330, a phase coherency manager 1335, an SRS receiving manager 1340, a capability report receiving manager 1345, a channel estimation manager 1350, an uplink receiving manager 1355, a downlink precoder manager 1360, a downlink transmitting manager 1365, or any combination thereof. Each of these components may communicate, directly or indirectly, with one another (e.g., via one or more buses).

The communications manager 1320 may support wireless communication at a base station in accordance with examples as disclosed herein. The SRS resource transmitting manager 1325 may be configured as or otherwise support a means for transmitting, to a UE, an indication of a set of resources for transmitting a set of multiple phase-coherent SRSs. The control message transmitting manager 1330 may be configured as or otherwise support a means for transmitting, to the UE, a control message indicating a cancellation of an allocation of a first portion of the set of resources. The phase coherency manager 1335 may be configured as or otherwise support a means for determining a phase coherency configuration associated with a second portion of the set of resources based on transmitting the control message indicating the cancellation. The SRS receiving manager 1340 may be configured as or otherwise support a means for receiving, from the UE, one or more SRSs within the second portion of the set of resources in accordance with the determined phase coherency configuration.

In some examples, to support receiving the one or more SRSs within the second portion of the set of resources, the SRS receiving manager 1340 may be configured as or otherwise support a means for receiving a first set of phase-coherent SRSs. In some examples, to support receiving the one or more SRSs within the second portion of the set of resources, the SRS receiving manager 1340 may be configured as or otherwise support a means for receiving a second set of phase-coherent SRSs different from the first set of phase-coherent SRSs.

In some examples, the SRS receiving manager 1340 may be configured as or otherwise support a means for receiving the first set of phase-coherent SRSs prior to the first portion of the set of resources associated with the cancellation in the time domain. In some examples, the SRS receiving manager 1340 may be configured as or otherwise support a means for receiving the second set of phase-coherent SRSs subsequent to the first portion of the set of resources associated with the cancellation in the time domain.

In some examples, the SRS receiving manager 1340 may be configured as or otherwise support a means for receiving the first set of phase-coherent SRSs associated with a first phase. In some examples, the SRS receiving manager 1340 may be configured as or otherwise support a means for receiving the second set of phase-coherent SRSs associated with a second phase different from the first phase.

In some examples, to support receiving the one or more SRSs within the second portion of the set of resources, the SRS receiving manager 1340 may be configured as or otherwise support a means for receiving a first set of SRSs and a second set of SRSs different from the first set of SRSs with a common phase coherency based on a time interval of the first portion of the set of resources associated with the cancellation satisfying a time interval threshold.

In some examples, the time interval of the first portion of the set of resources associated with the cancellation satisfies the time interval threshold if the time interval is less than the time interval threshold.

In some examples, the control message transmitting manager 1330 may be configured as or otherwise support a means for transmitting, to the UE, a second control message including an indication of the time interval threshold, where receiving the first set of SRSs and the second set of SRSs with the common phase coherency is based on transmitting the second control message.

In some examples, the SRS receiving manager 1340 may be configured as or otherwise support a means for receiving the first set of SRSs and the second set of SRSs different from the first set of SRSs with the common phase coherency based on identifying an absence of an uplink transmission scheduled within the first portion of the set of resources associated with the cancellation.

In some examples, to support receiving the one or more SRSs within the second portion of the set of resources, the SRS receiving manager 1340 may be configured as or otherwise support a means for receiving a first set of SRSs and a second set of SRSs different from the first set of SRSs with a common phase coherency based on identifying an absence of an uplink transmission scheduled within the first portion of the set of resources associated with the cancellation.

In some examples, to support set of multiple phase-coherent SRSs, the SRS receiving manager 1340 may be configured as or otherwise support a means for a first set of SRSs associated with a first component carrier, and a second set of SRSs associated with a second component carrier, where the first set of SRSs and the second set of SRSs are associated with a common phase coherency.

In some examples, to support receiving the one or more SRSs, the SRS receiving manager 1340 may be configured as or otherwise support a means for receiving at least a subset of the first set of SRSs with a first phase and transmitting at least a subset of the second set of SRSs with a second phase different from the first phase based on the first portion of the set of resources associated with the cancellation being positioned within the second set of SRSs.

In some examples, the first component carrier and the second component carrier include a set of frequency-contiguous component carriers.

In some examples, the set of multiple phase-coherent SRSs further include a third set of SRSs associated with a third component carrier. In some examples, the third set of SRSs is associated with the common phase coherency associated with the first set of SRSs and the second set of SRSs.

In some examples, to support receiving the one or more SRSs, the SRS receiving manager 1340 may be configured as or otherwise support a means for receiving at least a subset of the first set of SRSs with a first phase and receiving at least a subset of the third set of SRSs with a second phase different from the first phase based on the first portion of the set of resources associated with the cancellation being positioned within the second set of SRSs.

In some examples, to support receiving the one or more SRSs within the second portion of the set of resources, the SRS receiving manager 1340 may be configured as or otherwise support a means for receiving a first set of phase-coherent SRSs with a first phase. In some examples, to support receiving the one or more SRSs within the second portion of the set of resources, the SRS receiving manager 1340 may be configured as or otherwise support a means for receiving a second set of phase-coherent SRSs with a second phase different from the first phase, where a phase difference between the first phase and the second phase satisfies a phase threshold.

In some examples, the phase difference between the first phase and the second phase satisfies the phase threshold if the phase difference is less than the phase threshold.

In some examples, the capability report receiving manager 1345 may be configured as or otherwise support a means for receiving, from the UE, a UE capability report including an indication of the phase threshold, where receiving the first set of phase-coherent SRSs and the second set of phase-coherent SRSs is based on receiving the UE capability report.

In some examples, the capability report receiving manager 1345 may be configured as or otherwise support a means for receiving, from the UE, a UE capability report including an indication of one or more phase coherency configurations supported by the UE, where receiving the one or more SRSs is based on receiving the UE capability report.

In some examples, the control message includes a ULCI message.

In some examples, to support receiving the one or more SRSs, the SRS receiving manager 1340 may be configured as or otherwise support a means for receiving the one or more SRSs based on the one or more SRSs not being associated with the TD-OCC.

In some examples, None, and the SRS receiving manager 1340 may be configured as or otherwise support a means for refraining from receiving one or more additional SRSs associated with the second portion of the set of resources based on the one or more additional SRSs being associated with the TD-OCC.

In some examples, the set of multiple phase-coherent SRSs include periodic SRSs, semi-periodic SRSs, aperiodic SRSs, or any combination thereof.

In some examples, the control message transmitting manager 1330 may be configured as or otherwise support a means for transmitting, to the UE, a unicast DCI message, a group-common DCI message, or both, where the indication of the set of resources for transmitting the set of multiple phase-coherent SRSs is transmitted via the unicast DCI message, the group-common DCI message, or both.

In some examples, the channel estimation manager 1350 may be configured as or otherwise support a means for determining a channel estimate associated with a channel between the UE and the base station based on receiving the one or more SRSs.

In some examples, to support receiving the one or more SRSs within the second portion of the set of resources, the SRS receiving manager 1340 may be configured as or otherwise support a means for receiving a first set of phase-coherent SRSs. In some examples, to support receiving the one or more SRSs within the second portion of the set of resources, the SRS receiving manager 1340 may be configured as or otherwise support a means for receiving a second set of phase-coherent SRSs different from the first set of phase-coherent SRSs, where determining the channel estimate is based on the first set of phase-coherent SRSs, the second set of phase-coherent SRSs, or both.

In some examples, the uplink receiving manager 1355 may be configured as or otherwise support a means for receiving an uplink transmission from the UE. In some examples, the uplink receiving manager 1355 may be configured as or otherwise support a means for demodulating the uplink transmission based on the determined channel estimate.

In some examples, the downlink precoder manager 1360 may be configured as or otherwise support a means for determining a precoder associated with downlink transmissions based on the determined channel estimate. In some examples, the downlink transmitting manager 1365 may be configured as or otherwise support a means for transmitting, to the UE, a downlink transmission based on the determined precoder.

Figure 14:
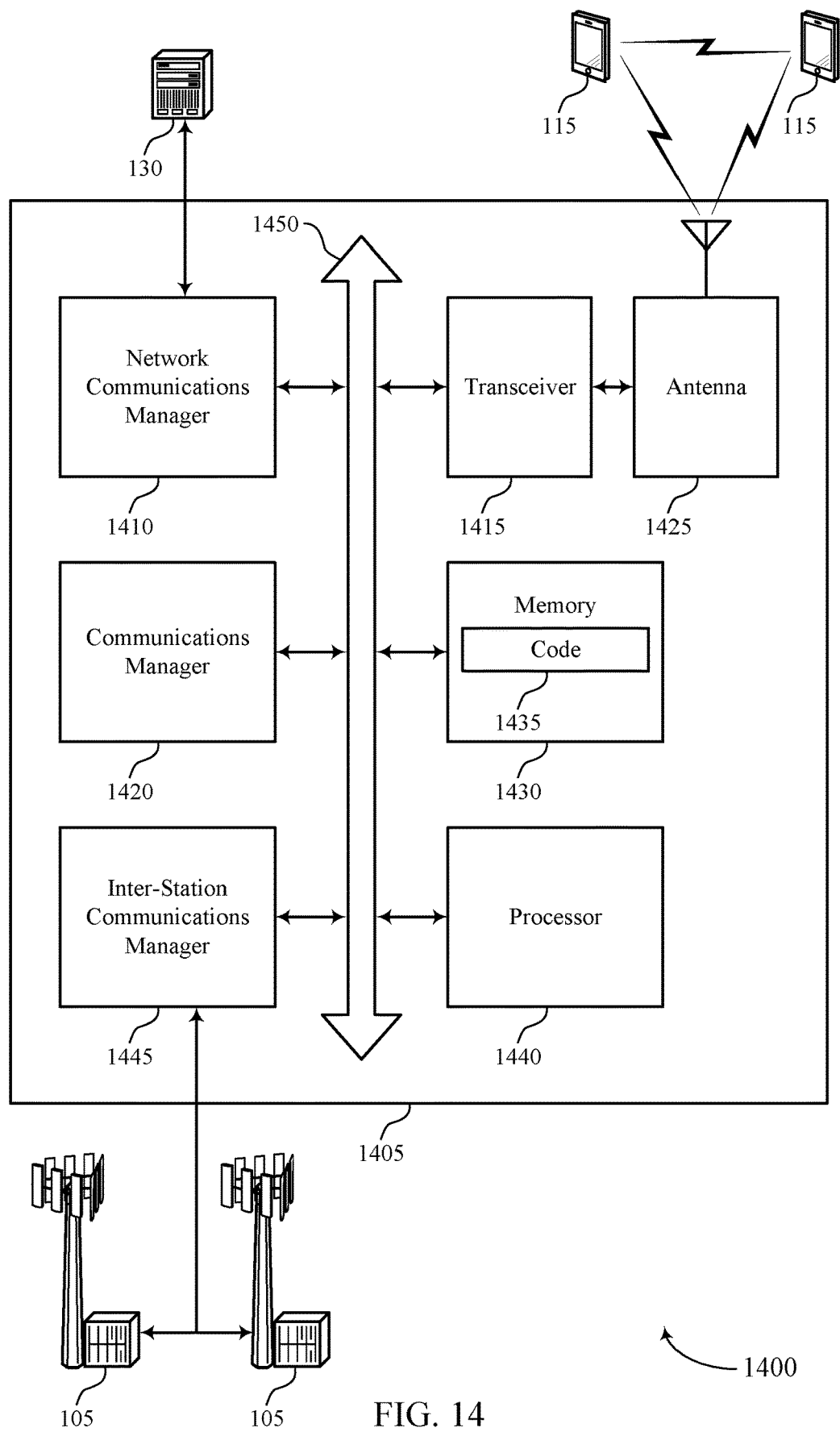
FIG. 14 shows a diagram of a system including a device that supports techniques for SRS phase coherency in accordance with aspects of the present disclosure.

FIG. 14 shows a diagram of a system 1400 including a device 1405 that supports techniques for SRS phase coherency in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for SRS phase coherency). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting, to a UE, an indication of a set of resources for transmitting a set of multiple phase-coherent SRSs. The communications manager 1420 may be configured as or otherwise support a means for transmitting, to the UE, a control message indicating a cancellation of an allocation of a first portion of the set of resources. The communications manager 1420 may be configured as or otherwise support a means for determining a phase coherency configuration associated with a second portion of the set of resources based on transmitting the control message indicating the cancellation. The communications manager 1420 may be configured as or otherwise support a means for receiving, from the UE, one or more SRSs within the second portion of the set of resources in accordance with the determined phase coherency configuration.

By including or configuring the communications manager 1420 in accordance with examples as described herein, the device 1405 may support techniques for maintaining varying degrees of SRS phase coherency in cases where at least a portion of SRS resources within a bundled set of SRS resources has been canceled or released. By supporting defined phase coherency configurations, techniques described herein may improve phase coherency of SRS signals in cases where at least a subset of SRS resources are canceled or released, thereby enabling more accurate channel estimation. In this regard, by enabling more accurate channel estimation, the efficiency and reliability of wireless communications within a wireless communications system may be improved, thereby reducing a quantity of retransmissions which may be performed, which therefore improves resource utilization, and reduces power consumption at the base station 105.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for SRS phase coherency as described herein, or the processor 1440 and the memory 1430 may be otherwise configured to perform or support such operations.

Figure 15:
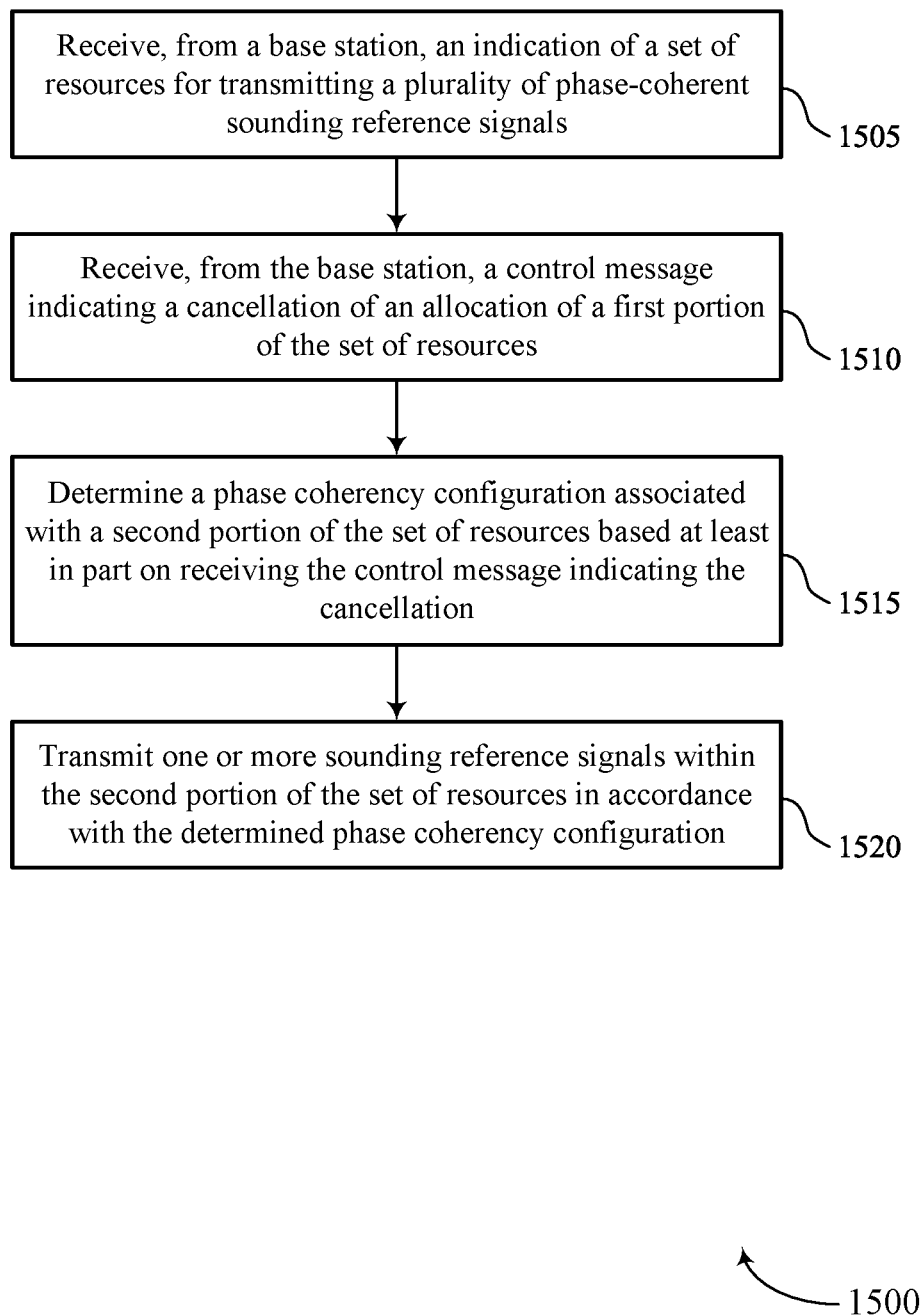
FIGS. 15 through 19 show flowcharts illustrating methods that support techniques for SRS phase coherency in accordance with aspects of the present disclosure.

FIG. 15 shows a flowchart illustrating a method 1500 that supports techniques for SRS phase coherency in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, an indication of a set of resources for transmitting a set of multiple phase-coherent SRSs. The operations of 1505 may be performed in accordance with examples as disclosed herein. In some examples, aspects of the operations of 1505 may be performed by an SRS resource receiving manager 925 as described with reference to FIG. 9.

At 1510, the method may include receiving, from the base station, a control message indicating a cancellation of an allocation of a first portion of the set of resources. The operations of 1510 may be performed in accordance with examples as disclosed herein. In some examples, aspects of the operations of 1510 may be performed by a control message receiving manager 930 as described with reference to FIG. 9.

At 1515, the method may include determining a phase coherency configuration associated with a second portion of the set of resources based on receiving the control message indicating the cancellation. The operations of 1515 may be performed in accordance with examples as disclosed herein. In some examples, aspects of the operations of 1515 may be performed by a phase coherency manager 935 as described with reference to FIG. 9.

At 1520, the method may include transmitting one or more SRSs within the second portion of the set of resources in accordance with the determined phase coherency configuration. The operations of 1520 may be performed in accordance with examples as disclosed herein. In some examples, aspects of the operations of 1520 may be performed by an SRS transmitting manager 940 as described with reference to FIG. 9.

Figure 16:
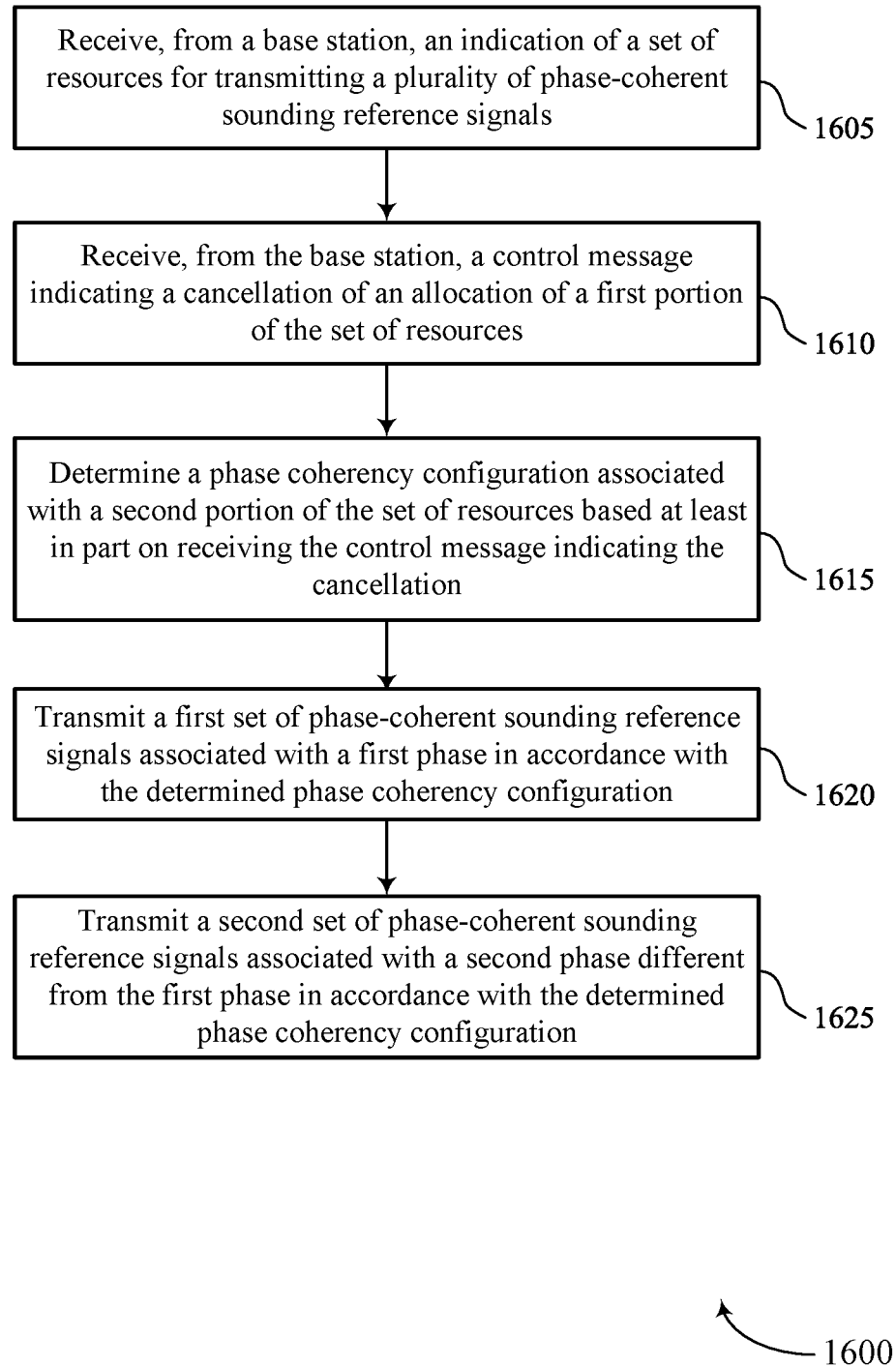

FIG. 16 shows a flowchart illustrating a method 1600 that supports techniques for SRS phase coherency in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, an indication of a set of resources for transmitting a set of multiple phase-coherent SRSs. The operations of 1605 may be performed in accordance with examples as disclosed herein. In some examples, aspects of the operations of 1605 may be performed by an SRS resource receiving manager 925 as described with reference to FIG. 9.

At 1610, the method may include receiving, from the base station, a control message indicating a cancellation of an allocation of a first portion of the set of resources. The operations of 1610 may be performed in accordance with examples as disclosed herein. In some examples, aspects of the operations of 1610 may be performed by a control message receiving manager 930 as described with reference to FIG. 9.

At 1615, the method may include determining a phase coherency configuration associated with a second portion of the set of resources based on receiving the control message indicating the cancellation. The operations of 1615 may be performed in accordance with examples as disclosed herein. In some examples, aspects of the operations of 1615 may be performed by a phase coherency manager 935 as described with reference to FIG. 9.

At 1620, the method may include transmitting the first set of phase-coherent SRSs associated with a first phase in accordance with the determined phase coherency configuration. The operations of 1620 may be performed in accordance with examples as disclosed herein. In some examples, aspects of the operations of 1620 may be performed by an SRS transmitting manager 940 as described with reference to FIG. 9.

At 1625, the method may include transmitting the second set of phase-coherent SRSs associated with a second phase different from the first phase in accordance with the determined phase coherency configuration. The operations of 1625 may be performed in accordance with examples as disclosed herein. In some examples, aspects of the operations of 1625 may be performed by an SRS transmitting manager 940 as described with reference to FIG. 9.

Figure 17:
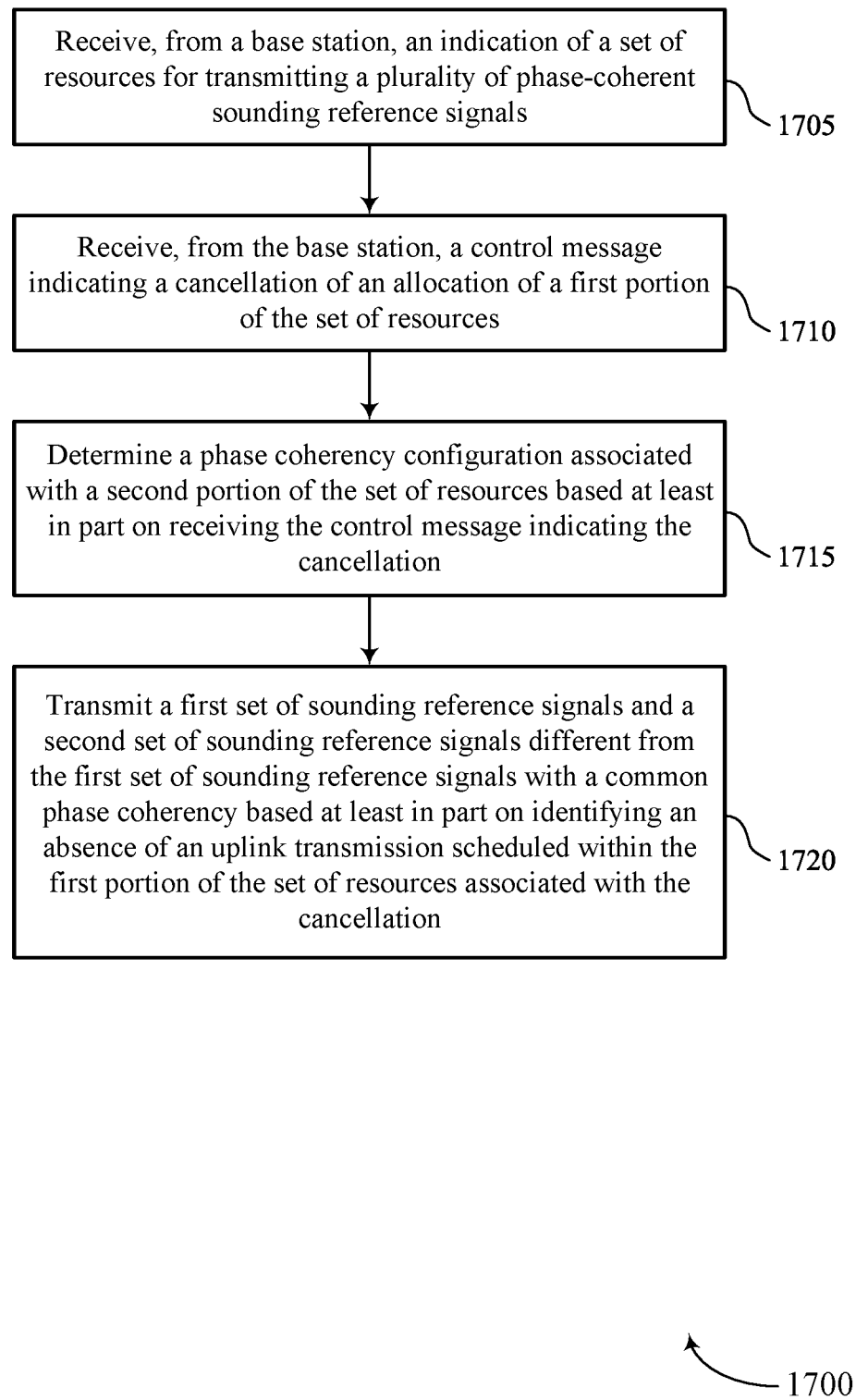

FIG. 17 shows a flowchart illustrating a method 1700 that supports techniques for SRS phase coherency in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, an indication of a set of resources for transmitting a set of multiple phase-coherent SRSs. The operations of 1705 may be performed in accordance with examples as disclosed herein. In some examples, aspects of the operations of 1705 may be performed by an SRS resource receiving manager 925 as described with reference to FIG. 9.

At 1710, the method may include receiving, from the base station, a control message indicating a cancellation of an allocation of a first portion of the set of resources. The operations of 1710 may be performed in accordance with examples as disclosed herein. In some examples, aspects of the operations of 1710 may be performed by a control message receiving manager 930 as described with reference to FIG. 9.

At 1715, the method may include determining a phase coherency configuration associated with a second portion of the set of resources based on receiving the control message indicating the cancellation. The operations of 1715 may be performed in accordance with examples as disclosed herein. In some examples, aspects of the operations of 1715 may be performed by a phase coherency manager 935 as described with reference to FIG. 9.

At 1720, the method may include transmitting a first set of SRSs and a second set of SRSs different from the first set of SRSs with a common phase coherency based on identifying an absence of an uplink transmission scheduled within the first portion of the set of resources associated with the cancellation. The operations of 1720 may be performed in accordance with examples as disclosed herein. In some examples, aspects of the operations of 1720 may be performed by an SRS transmitting manager 940 as described with reference to FIG. 9.

Figure 18:
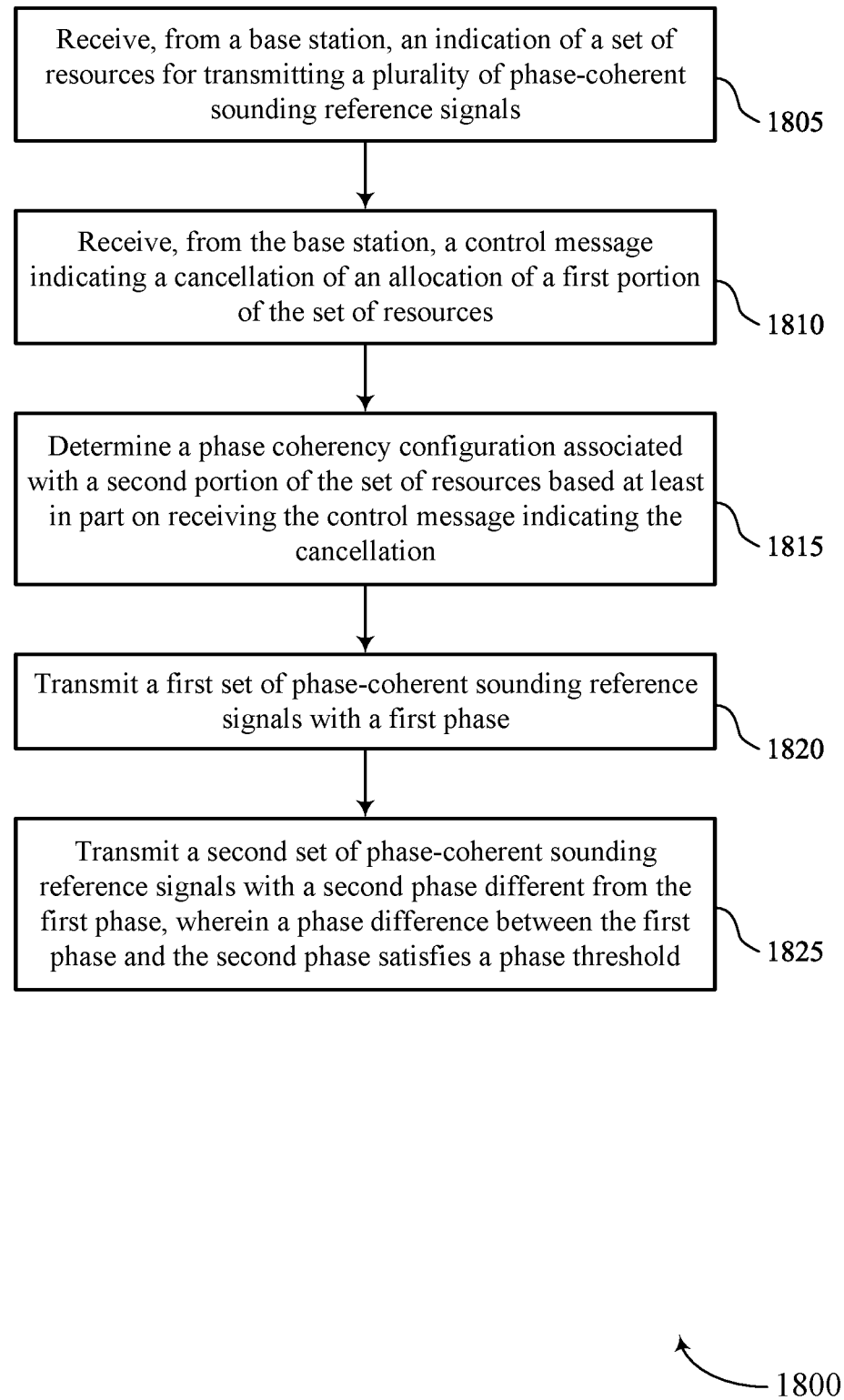

FIG. 18 shows a flowchart illustrating a method 1800 that supports techniques for SRS phase coherency in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, an indication of a set of resources for transmitting a set of multiple phase-coherent SRSs. The operations of 1805 may be performed in accordance with examples as disclosed herein. In some examples, aspects of the operations of 1805 may be performed by an SRS resource receiving manager 925 as described with reference to FIG. 9.

At 1810, the method may include receiving, from the base station, a control message indicating a cancellation of an allocation of a first portion of the set of resources. The operations of 1810 may be performed in accordance with examples as disclosed herein. In some examples, aspects of the operations of 1810 may be performed by a control message receiving manager 930 as described with reference to FIG. 9.

At 1815, the method may include determining a phase coherency configuration associated with a second portion of the set of resources based on receiving the control message indicating the cancellation. The operations of 1815 may be performed in accordance with examples as disclosed herein. In some examples, aspects of the operations of 1815 may be performed by a phase coherency manager 935 as described with reference to FIG. 9.

At 1820, the method may include transmitting a first set of phase-coherent SRSs with a first phase. The operations of 1820 may be performed in accordance with examples as disclosed herein. In some examples, aspects of the operations of 1820 may be performed by an SRS transmitting manager 940 as described with reference to FIG. 9.

At 1825, the method may include transmitting a second set of phase-coherent SRSs with a second phase different from the first phase, where a phase difference between the first phase and the second phase satisfies a phase threshold. The operations of 1825 may be performed in accordance with examples as disclosed herein. In some examples, aspects of the operations of 1825 may be performed by an SRS transmitting manager 940 as described with reference to FIG. 9.

Figure 19:
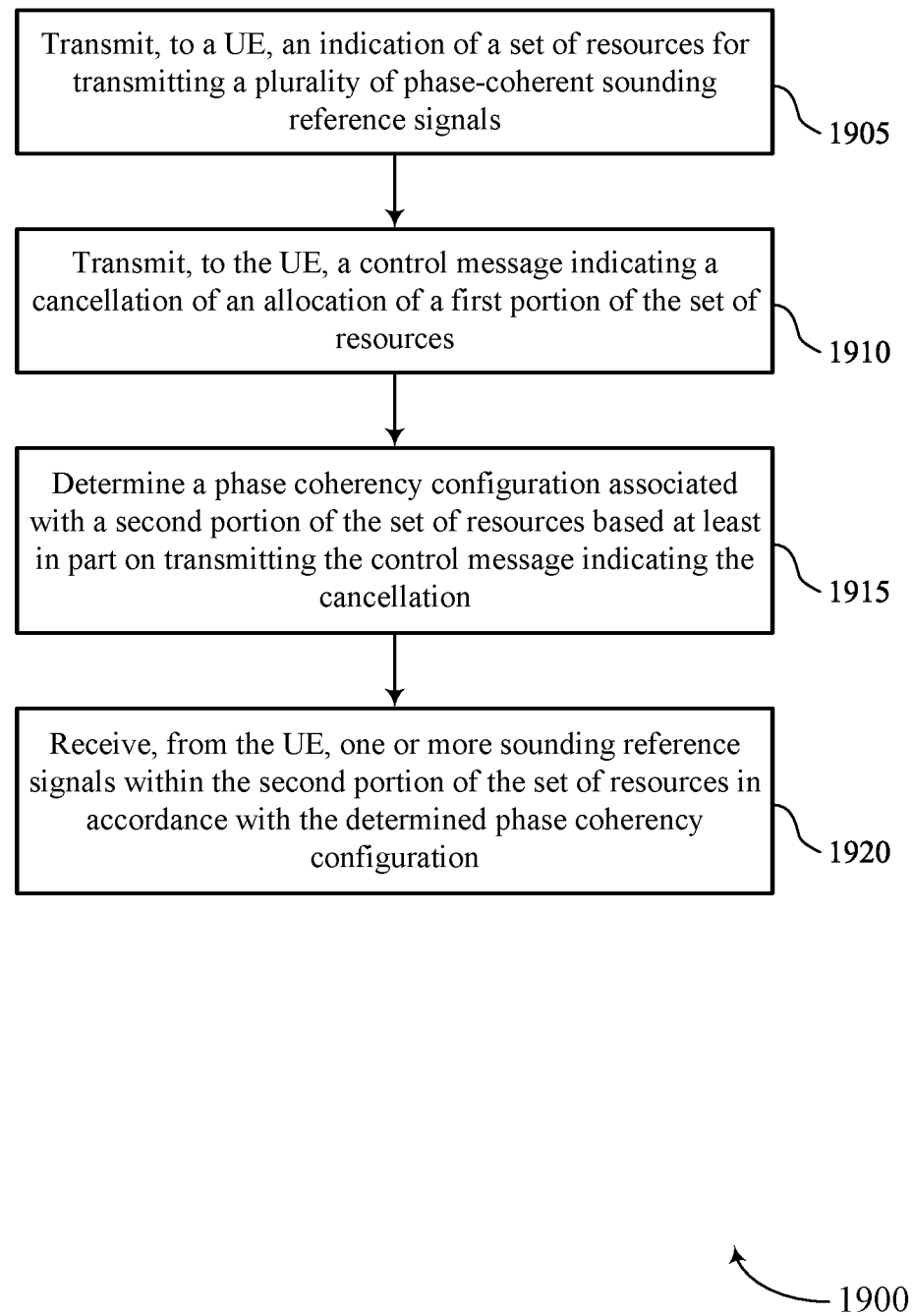

FIG. 19 shows a flowchart illustrating a method 1900 that supports techniques for SRS phase coherency in accordance with aspects of the present disclosure. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, an indication of a set of resources for transmitting a set of multiple phase-coherent SRSs. The operations of 1905 may be performed in accordance with examples as disclosed herein. In some examples, aspects of the operations of 1905 may be performed by an SRS resource transmitting manager 1325 as described with reference to FIG. 13.

At 1910, the method may include transmitting, to the UE, a control message indicating a cancellation of an allocation of a first portion of the set of resources. The operations of 1910 may be performed in accordance with examples as disclosed herein. In some examples, aspects of the operations of 1910 may be performed by a control message transmitting manager 1330 as described with reference to FIG. 13.

At 1915, the method may include determining a phase coherency configuration associated with a second portion of the set of resources based on transmitting the control message indicating the cancellation. The operations of 1915 may be performed in accordance with examples as disclosed herein. In some examples, aspects of the operations of 1915 may be performed by a phase coherency manager 1335 as described with reference to FIG. 13.

At 1920, the method may include receiving, from the UE, one or more SRSs within the second portion of the set of resources in accordance with the determined phase coherency configuration. The operations of 1920 may be performed in accordance with examples as disclosed herein. In some examples, aspects of the operations of 1920 may be performed by an SRS receiving manager 1340 as described with reference to FIG. 13.

The following aspects are given by way of illustration, and provide an overview of aspects of the present disclosure. Examples of the following aspects may be combined with examples or embodiments shown or discussed in relation to the figures or elsewhere herein.

Aspect 1: A method for wireless communication at a UE, comprising: receiving, from a base station, an indication of a set of resources for transmitting a plurality of phase-coherent SRSs; receiving, from the base station, a control message indicating a cancellation of an allocation of a first portion of the set of resources; determining a phase coherency configuration associated with a second portion of the set of resources based at least in part on receiving the control message indicating the cancellation; and transmitting one or more SRSs within the second portion of the set of resources in accordance with the determined phase coherency configuration.

Aspect 2: The method of aspect 1, wherein transmitting the one or more SRSs within the second portion of the set of resources comprises: transmitting a first set of phase-coherent SRSs; and transmitting a second set of phase-coherent SRSs different from the first set of phase-coherent SRSs.

Aspect 3: The method of aspect 2, further comprising: transmitting the first set of phase-coherent SRSs prior to the first portion of the set of resources associated with the cancellation in the time domain; and transmitting the second set of phase-coherent SRSs subsequent to the first portion of the set of resources associated with the cancellation in the time domain.

Aspect 4: The method of any of aspects 2 through 3, further comprising: transmitting the first set of phase-coherent SRSs associated with a first phase; and transmitting the second set of phase-coherent SRSs associated with a second phase different from the first phase.

Aspect 5: The method of any of aspects 1 through 4, wherein transmitting the one or more SRSs within the second portion of the set of resources comprises: transmitting a first set of SRSs and a second set of SRSs different from the first set of SRSs with a common phase coherency based at least in part on a time interval of the first portion of the set of resources associated with the cancellation satisfying a time interval threshold.

Aspect 6: The method of aspect 5, wherein the time interval of the first portion of the set of resources associated with the cancellation satisfies the time interval threshold if the time interval is less than the time interval threshold.

Aspect 7: The method of any of aspects 5 through 6, further comprising: receiving, from the base station, a second control message comprising an indication of the time interval threshold, wherein transmitting the first set of SRSs and the second set of SRSs with the common phase coherency is based at least in part on receiving the second control message.

Aspect 8: The method of any of aspects 5 through 7, further comprising: transmitting the first set of SRSs and the second set of SRSs different from the first set of SRSs with the common phase coherency based at least in part on identifying an absence of an uplink transmission scheduled within the first portion of the set of resources associated with the cancellation.

Aspect 9: The method of any of aspects 1 through 8, wherein transmitting the one or more SRSs within the second portion of the set of resources comprises: transmitting a first set of SRSs and a second set of SRSs different from the first set of SRSs with a common phase coherency based at least in part on identifying an absence of an uplink transmission scheduled within the first portion of the set of resources associated with the cancellation.

Aspect 10: The method of any of aspects 1 through 9, wherein the plurality of phase-coherent SRSs comprises: a first set of SRSs associated with a first component carrier, and a second set of SRSs associated with a second component carrier, wherein the first set of SRSs and the second set of SRSs are associated with a common phase coherency.

Aspect 11: The method of aspect 10, wherein the first portion of the set of resources associated with the cancellation is positioned within the second set of SRSs, wherein transmitting the one or more SRSs comprises: transmitting at least a subset of the first set of SRSs with a first phase and transmitting at least a subset of the second set of SRSs with a second phase different from the first phase based at least in part on the first portion of the set of resources associated with the cancellation being positioned within the second set of SRSs.

Aspect 12: The method of any of aspects 10 through 11, wherein the first component carrier and the second component carrier comprise a set of frequency-contiguous component carriers.

Aspect 13: The method of any of aspects 10 through 12, wherein the plurality of phase-coherent SRSs further comprise a third set of SRSs associated with a third component carrier, the third set of SRSs is associated with the common phase coherency associated with the first set of SRSs and the second set of SRSs.

Aspect 14: The method of aspect 13, wherein the second component carrier is positioned between the first component carrier and the third component carrier in the frequency domain, and wherein transmitting the one or more SRSs comprises: transmitting at least a subset of the first set of SRSs with a first phase and transmitting at least a subset of the third set of SRSs with a second phase different from the first phase based at least in part on the first portion of the set of resources associated with the cancellation being positioned within the second set of SRSs.

Aspect 15: The method of any of aspects 1 through 14, wherein transmitting the one or more SRSs within the second portion of the set of resources comprises: transmitting a first set of phase-coherent SRSs with a first phase; and transmitting a second set of phase-coherent SRSs with a second phase different from the first phase, wherein a phase difference between the first phase and the second phase satisfies a phase threshold.

Aspect 16: The method of aspect 15, wherein the phase difference between the first phase and the second phase satisfies the phase threshold if the phase difference is less than the phase threshold.

Aspect 17: The method of any of aspects 15 through 16, further comprising: transmitting, to the base station, a UE capability report comprising an indication of the phase threshold, wherein transmitting the first set of phase-coherent SRSs and the second set of phase-coherent SRSs is based at least in part on transmitting the UE capability report.

Aspect 18: The method of any of aspects 1 through 17, further comprising: transmitting, to the base station, a UE capability report comprising an indication of one or more phase coherency configurations supported by the UE, wherein transmitting the one or more SRSs is based at least in part on transmitting the UE capability report.

Aspect 19: The method of any of aspects 1 through 18, wherein the control message comprises a ULCI message.

Aspect 20: The method of any of aspects 1 through 19, wherein the first portion of the set of resources associated with the cancellation is associated with a TD-OCC, wherein transmitting the one or more SRSs comprises: transmitting the one or more SRSs based at least in part on the one or more SRSs not being associated with the TD-OCC.

Aspect 21: The method of aspect 20, the method further comprising: refraining from transmitting one or more additional SRSs associated with the second portion of the set of resources based at least in part on the one or more additional SRSs being associated with the TD-OCC.

Aspect 22: The method of any of aspects 1 through 21, wherein the plurality of phase-coherent SRSs comprise periodic SRSs, semi-periodic SRSs, aperiodic SRSs, or any combination thereof.

Aspect 23: The method of any of aspects 1 through 22, further comprising: receiving, from the base station, a unicast DCI message, a group-common DCI message, or both, wherein the indication of the set of resources for transmitting the plurality of phase-coherent SRSs is received via the unicast DCI message, the group-common DCI message, or both.

Aspect 24: A method for wireless communication at a base station, comprising: transmitting, to a UE, an indication of a set of resources for transmitting a plurality of phase-coherent SRSs; transmitting, to the UE, a control message indicating a cancellation of an allocation of a first portion of the set of resources; determining a phase coherency configuration associated with a second portion of the set of resources based at least in part on transmitting the control message indicating the cancellation; and receiving, from the UE, one or more SRSs within the second portion of the set of resources in accordance with the determined phase coherency configuration.

Aspect 25: The method of aspect 24, wherein receiving the one or more SRSs within the second portion of the set of resources comprises: receiving a first set of phase-coherent SRSs; and receiving a second set of phase-coherent SRSs different from the first set of phase-coherent SRSs.

Aspect 26: The method of aspect 25, further comprising: receiving the first set of phase-coherent SRSs prior to the first portion of the set of resources associated with the cancellation in the time domain; and receiving the second set of phase-coherent SRSs subsequent to the first portion of the set of resources associated with the cancellation in the time domain.

Aspect 27: The method of any of aspects 25 through 26, further comprising: receiving the first set of phase-coherent SRSs associated with a first phase; and receiving the second set of phase-coherent SRSs associated with a second phase different from the first phase.

Aspect 28: The method of any of aspects 24 through 27, wherein receiving the one or more SRSs within the second portion of the set of resources comprises: receiving a first set of SRSs and a second set of SRSs different from the first set of SRSs with a common phase coherency based at least in part on a time interval of the first portion of the set of resources associated with the cancellation satisfying a time interval threshold.

Aspect 29: The method of aspect 28, wherein the time interval of the first portion of the set of resources associated with the cancellation satisfies the time interval threshold if the time interval is less than the time interval threshold.

Aspect 30: The method of any of aspects 28 through 29, further comprising: transmitting, to the UE, a second control message comprising an indication of the time interval threshold, wherein receiving the first set of SRSs and the second set of SRSs with the common phase coherency is based at least in part on transmitting the second control message.

Aspect 31: The method of any of aspects 28 through 30, further comprising: receiving the first set of SRSs and the second set of SRSs different from the first set of SRSs with the common phase coherency based at least in part on identifying an absence of an uplink transmission scheduled within the first portion of the set of resources associated with the cancellation.

Aspect 32: The method of any of aspects 24 through 31, wherein receiving the one or more SRSs within the second portion of the set of resources comprises: receiving a first set of SRSs and a second set of SRSs different from the first set of SRSs with a common phase coherency based at least in part on identifying an absence of an uplink transmission scheduled within the first portion of the set of resources associated with the cancellation.

Aspect 33: The method of any of aspects 24 through 32, wherein the plurality of phase-coherent SRSs comprises: a first set of SRSs associated with a first component carrier, and a second set of SRSs associated with a second component carrier, wherein the first set of SRSs and the second set of SRSs are associated with a common phase coherency.

Aspect 34: The method of aspect 33, wherein the first portion of the set of resources associated with the cancellation is positioned within the second set of SRSs, wherein receiving the one or more SRSs comprises: receiving at least a subset of the first set of SRSs with a first phase and transmitting at least a subset of the second set of SRSs with a second phase different from the first phase based at least in part on the first portion of the set of resources associated with the cancellation being positioned within the second set of SRSs.

Aspect 35: The method of any of aspects 33 through 34, wherein the first component carrier and the second component carrier comprise a set of frequency-contiguous component carriers.

Aspect 36: The method of any of aspects 33 through 35, wherein the plurality of phase-coherent SRSs further comprise a third set of SRSs associated with a third component carrier, the third set of SRSs is associated with the common phase coherency associated with the first set of SRSs and the second set of SRSs.

Aspect 37: The method of aspect 36, wherein the second component carrier is positioned between the first component carrier and the third component carrier in the frequency domain, and wherein receiving the one or more SRSs comprises: receiving at least a subset of the first set of SRSs with a first phase and receiving at least a subset of the third set of SRSs with a second phase different from the first phase based at least in part on the first portion of the set of resources associated with the cancellation being positioned within the second set of SRSs.

Aspect 38: The method of any of aspects 24 through 37, wherein receiving the one or more SRSs within the second portion of the set of resources comprises: receiving a first set of phase-coherent SRSs with a first phase; and receiving a second set of phase-coherent SRSs with a second phase different from the first phase, wherein a phase difference between the first phase and the second phase satisfies a phase threshold.

Aspect 39: The method of aspect 38, wherein the phase difference between the first phase and the second phase satisfies the phase threshold if the phase difference is less than the phase threshold.

Aspect 40: The method of any of aspects 38 through 39, further comprising: receiving, from the UE, a UE capability report comprising an indication of the phase threshold, wherein receiving the first set of phase-coherent SRSs and the second set of phase-coherent SRSs is based at least in part on receiving the UE capability report.

Aspect 41: The method of any of aspects 24 through 40, further comprising: receiving, from the UE, a UE capability report comprising an indication of one or more phase coherency configurations supported by the UE, wherein receiving the one or more SRSs is based at least in part on receiving the UE capability report.

Aspect 42: The method of any of aspects 24 through 41, wherein the control message comprises a ULCI message.

Aspect 43: The method of any of aspects 24 through 42, wherein the first portion of the set of resources associated with the cancellation is associated with a TD-OCC, wherein receiving the one or more SRSs comprises: receiving the one or more SRSs based at least in part on the one or more SRSs not being associated with the TD-OCC.

Aspect 44: The method of aspect 43, the method further comprising: refraining from receiving one or more additional SRSs associated with the second portion of the set of resources based at least in part on the one or more additional SRSs being associated with the TD-OCC.

Aspect 45: The method of any of aspects 24 through 44, wherein the plurality of phase-coherent SRSs comprise periodic SRSs, semi-periodic SRSs, aperiodic SRSs, or any combination thereof.

Aspect 46: The method of any of aspects 24 through 45, further comprising: transmitting, to the UE, a unicast DCI message, a group-common DCI message, or both, wherein the indication of the set of resources for transmitting the plurality of phase-coherent SRSs is transmitted via the unicast DCI message, the group-common DCI message, or both.

Aspect 47: The method of any of aspects 24 through 46, further comprising: determining a channel estimate associated with a channel between the UE and the base station based at least in part on receiving the one or more SRSs.

Aspect 48: The method of aspect 47, wherein receiving the one or more SRSs within the second portion of the set of resources comprises: receiving a first set of phase-coherent SRSs; and receiving a second set of phase-coherent SRSs different from the first set of phase-coherent SRSs, wherein determining the channel estimate is based at least in part on the first set of phase-coherent SRSs, the second set of phase-coherent SRSs, or both.

Aspect 49: The method of any of aspects 47 through 48, further comprising: receiving an uplink transmission from the UE; and demodulating the uplink transmission based at least in part on the determined channel estimate.

Aspect 50: The method of any of aspects 47 through 49, further comprising: determining a precoder associated with downlink transmissions based at least in part on the determined channel estimate; and transmitting, to the UE, a downlink transmission based at least in part on the determined precoder.

Aspect 51: An apparatus for wireless communication at a UE, comprising a processor; memory coupled with the processor; and instructions stored in the memory and executable by the processor to cause the apparatus to perform a method of any of aspects 1 through 23.

Aspect 52: An apparatus for wireless communication at a UE, comprising at least one means for performing a method of any of aspects 1 through 23.

Aspect 53: A non-transitory computer-readable medium storing code for wireless communication at a UE, the code comprising instructions executable by a processor to perform a method of any of aspects 1 through 23.

Aspect 54: An apparatus for wireless communication at a base station, comprising a processor; memory coupled with the processor; and instructions stored in the memory and executable by the processor to cause the apparatus to perform a method of any of aspects 24 through 50.

Aspect 55: An apparatus for wireless communication at a base station, comprising at least one means for performing a method of any of aspects 24 through 50.

Aspect 56: A non-transitory computer-readable medium storing code for wireless communication at a base station, the code comprising instructions executable by a processor to perform a method of any of aspects 24 through 50.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e. A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving, from a base station, an indication of a set of resources for transmitting a plurality of phase-coherent sounding reference signals;
    receiving, from the base station, a control message indicating a cancellation of an allocation of a first portion of the set of resources;
    determining a phase coherency configuration associated with a second portion of the set of resources based at least in part on receiving the control message indicating the cancellation; and transmitting one or more sounding reference signals within the second portion of the set of resources in accordance with the determined phase coherency configuration.

2. The method of claim 1, wherein transmitting the one or more sounding reference signals within the second portion of the set of resources comprises:
transmitting a first set of phase-coherent sounding reference signals; and
transmitting a second set of phase-coherent sounding reference signals different from the first set of phase-coherent sounding reference signals.

3. The method of claim 2, further comprising:
transmitting the first set of phase-coherent sounding reference signals prior to the first portion of the set of resources associated with the cancellation in the time domain; and
transmitting the second set of phase-coherent sounding reference signals subsequent to the first portion of the set of resources associated with the cancellation in the time domain.

4. The method of claim 2, further comprising:
transmitting the first set of phase-coherent sounding reference signals associated with a first phase; and
transmitting the second set of phase-coherent sounding reference signals associated with a second phase different from the first phase.

5. The method of claim 1, wherein transmitting the one or more sounding reference signals within the second portion of the set of resources comprises:
transmitting a first set of sounding reference signals and a second set of sounding reference signals different from the first set of sounding reference signals with a common phase coherency based at least in part on a time interval of the first portion of the set of resources associated with the cancellation being less than a time interval threshold.

6. The method of claim 5, further comprising:
receiving, from the base station, a second control message comprising an indication of the time interval threshold, wherein transmitting the first set of sounding reference signals and the second set of sounding reference signals with the common phase coherency is based at least in part on receiving the second control message.

7. The method of claim 1, wherein transmitting the one or more sounding reference signals within the second portion of the set of resources comprises:
transmitting a first set of sounding reference signals and a second set of sounding reference signals different from the first set of sounding reference signals with a common phase coherency based at least in part on identifying an absence of an uplink transmission scheduled within the first portion of the set of resources associated with the cancellation.

8. The method of claim 1, wherein the plurality of phase-coherent sounding reference signals comprises:
a first set of sounding reference signals associated with a first component carrier, and a second set of sounding reference signals associated with a second component carrier, wherein the first set of sounding reference signals and the second set of sounding reference signals are associated with a common phase coherency, and wherein the first component carrier and the second component carrier comprise a set of frequency-contiguous component carriers.

9. The method of claim 8, wherein the first portion of the set of resources associated with the cancellation is positioned within the second set of sounding reference signals, wherein transmitting the one or more sounding reference signals comprises:
transmitting at least a subset of the first set of sounding reference signals with a first phase and transmitting at least a subset of the second set of sounding reference signals with a second phase different from the first phase based at least in part on the first portion of the set of resources associated with the cancellation being positioned within the second set of sounding reference signals.

10. The method of claim 8, wherein the plurality of phase-coherent sounding reference signals further comprise a third set of sounding reference signals associated with a third component carrier, and wherein the third set of sounding reference signals is associated with the common phase coherency associated with the first set of sounding reference signals and the second set of sounding reference signals.

11. The method of claim 10, wherein the second component carrier is positioned between the first component carrier and the third component carrier in the frequency domain, and wherein transmitting the one or more sounding reference signals comprises:
transmitting at least a subset of the first set of sounding reference signals with a first phase and transmitting at least a subset of the third set of sounding reference signals with a second phase different from the first phase based at least in part on the first portion of the set of resources associated with the cancellation being positioned within the second set of sounding reference signals.

12. The method of claim 1, wherein transmitting the one or more sounding reference signals within the second portion of the set of resources comprises:
transmitting a first set of phase-coherent sounding reference signals with a first phase; and
transmitting a second set of phase-coherent sounding reference signals with a second phase different from the first phase, wherein a phase difference between the first phase and the second phase is less than a phase threshold.

13. The method of claim 12, further comprising:
transmitting, to the base station, a UE capability report comprising an indication of the phase threshold, wherein transmitting the first set of phase-coherent sounding reference signals and the second set of phase-coherent sounding reference signals is based at least in part on transmitting the UE capability report.

14. The method of claim 1, further comprising:
transmitting, to the base station, a UE capability report comprising an indication of one or more phase coherency configurations supported by the UE, wherein transmitting the one or more sounding reference signals is based at least in part on transmitting the UE capability report.

15. The method of claim 1, wherein the first portion of the set of resources associated with the cancellation is associated with a time division orthogonal cover code, wherein transmitting the one or more sounding reference signals comprises:
transmitting the one or more sounding reference signals based at least in part on the one or more sounding reference signals not being associated with the time division orthogonal cover code; and
refraining from transmitting one or more additional sounding reference signals associated with the second portion of the set of resources based at least in part on the one or more additional sounding reference signals being associated with the time division orthogonal cover code.

16. The method of claim 1, wherein the set of resources comprises a set of symbol periods.

17. A method for wireless communication at a base station, comprising:
- transmitting, to a user equipment (UE), an indication of a set of resources for transmitting a plurality of phase-coherent sounding reference signals;
- transmitting, to the UE, a control message indicating a cancellation of an allocation of a first portion of the set of resources;
- determining a phase coherency configuration associated with a second portion of the set of resources based at least in part on transmitting the control message indicating the cancellation; and
- receiving, from the UE, one or more sounding reference signals within the second portion of the set of resources in accordance with the determined phase coherency configuration.

18. The method of claim 17, wherein receiving the one or more sounding reference signals within the second portion of the set of resources comprises:
- receiving a first set of phase-coherent sounding reference signals prior to the first portion of the set of resources associated with the cancellation in the time domain, wherein the first set of phase-coherent sounding reference signals are associated with a first phase; and
- receiving a second set of phase-coherent sounding reference signals different from the first set of phase-coherent sounding reference signals and subsequent to the first portion of the set of resources associated with the cancellation in the time domain, wherein the second set of phase-coherent sounding reference signals are associated with a second phase different from the first phase.

19. The method of claim 17, wherein receiving the one or more sounding reference signals within the second portion of the set of resources comprises:
- receiving a first set of sounding reference signals and a second set of sounding reference signals different from the first set of sounding reference signals with a common phase coherency based at least in part on a time interval of the first portion of the set of resources associated with the cancellation being less than a time interval threshold.

20. An apparatus for wireless communication at a user equipment (UE), comprising:
- a processor;
- memory coupled with the processor; and
- instructions stored in the memory and executable by the processor to cause the apparatus to:
  - receive, from a base station, an indication of a set of resources for transmitting a plurality of phase-coherent sounding reference signals;
  - receive, from the base station, a control message indicating a cancellation of an allocation of a first portion of the set of resources;
  - determine a phase coherency configuration associated with a second portion of the set of resources based at least in part on receiving the control message indicating the cancellation; and
  - transmit one or more sounding reference signals within the second portion of the set of resources in accordance with the determined phase coherency configuration.

* * * * *